(12) United States Patent
Kadono

(10) Patent No.: US 6,597,814 B2
(45) Date of Patent: Jul. 22, 2003

(54) IMAGE CODING FOR TRANSMITTING INFORMATION OF SHAPE, PIXEL VALUE, AND CODING MODES

(75) Inventor: Shinya Kadono, Kobe (JP)

(73) Assignee: Matsushita Electric Industrial Co., Ltd. (JP)

( * ) Notice: Subject to any disclaimer, the term of this patent is extended or adjusted under 35 U.S.C. 154(b) by 177 days.

(21) Appl. No.: 09/749,911

(22) Filed: Dec. 29, 2000

(65) Prior Publication Data

US 2001/0001019 A1 May 10, 2001

Related U.S. Application Data

(63) Continuation of application No. 09/000,077, filed on Mar. 9, 1998, now Pat. No. 6,188,796.

(30) Foreign Application Priority Data

| May 17, 1996 | (JP) | ............................................. 8-122972 |
| Jul. 29, 1996 | (JP) | ............................................. 8-198720 |
| Aug. 1, 1996 | (JP) | ............................................. 8-203363 |
| Aug. 9, 1996 | (JP) | ............................................. 8-210955 |

(51) Int. Cl.$^7$ .............................. G06K 9/36; H04N 7/12
(52) U.S. Cl. .................. 382/243; 382/239; 375/240.08; 375/240.1; 375/240.02
(58) Field of Search ................................ 382/243, 239, 382/232, 238, 236, 282; 375/240.01, 240.02, 240.08, 240.09, 240.1, 240.13

(56) References Cited

U.S. PATENT DOCUMENTS

| 4,097,903 A | | 6/1978 | Nakagome et al. ......... 358/261 |
| 5,539,466 A | * | 7/1996 | Igarashi et al. ........ 375/240.15 |
| 5,608,458 A | * | 3/1997 | Chen et al. ............. 375/240.14 |
| 5,638,498 A | * | 6/1997 | Tyler et al. ................. 358/1.18 |
| 5,717,465 A | * | 2/1998 | Kim ...................... 375/240.24 |
| 5,815,601 A | * | 9/1998 | Katata et al. ................ 382/232 |
| 5,886,743 A | * | 3/1999 | Oh et al. ................ 375/240.02 |
| 6,023,301 A | * | 2/2000 | Katata et al. ............... 348/586 |
| 6,052,414 A | | 4/2000 | Lee et al. .................... 375/240 |

FOREIGN PATENT DOCUMENTS

| CA | 2112051 | 6/1994 | ............ H04N/7/12 |

(List continued on next page.)

OTHER PUBLICATIONS

William C. Warner, "Compression Algorithms Reduce Digitized Images to Manageable Size," Electrical Design News, 35 (1990) Jun. 21, No. 13 Newton, MA, USA, pp 203–208, 210, 212.

(List continued on next page.)

Primary Examiner—Wenpeng Chen
(74) Attorney, Agent, or Firm—Parkhurst & Wendel, L.L.P.

(57) ABSTRACT

It is an object to encode an image signal or a shape signal more efficiently than the prior art. As a means to accomplish the object, the change pixel detector 2 receives the input signal 1 as an input signal and detects the pixel which changes the two-valued pixel value. Further, the change pixel predictor 4 also reads out the reference image stored in the memory 3, and predicts the change pixel of the particular input signal. The difference value calculator 5 subtracts the output of the change pixel predictor 4 from the output of the change pixel detector 2. The difference value rounder 7 compares the tolerance value e and the prediction error D, and outputs x which requires the minimum bit number for being encoded in the value $D-e \leq x \leq D+e$. The output of the difference value rounder 7 is encoded by the decoder 8 to become the encoded signal 9. Also, the output of the difference value rounder 7 is added in the difference value adder 11 to the predicted pixel 4 of the predicted pixel predictor 4, whereby the change pixel is calculated, and in the change pixel decoder 10, the respective pixels from the already decoded pixel indicated by the change pixel predictor 4 to the change pixel is decoded to be stored in the memory 3.

2 Claims, 44 Drawing Sheets

FOREIGN PATENT DOCUMENTS

| | | | |
|---|---|---|---|
| DE | 41 36 636 A1 | 7/1993 | ........... G06F/15/66 |
| EP | 0179291 | 4/1986 | ........... H04N/1/411 |
| EP | 0 402 954 A2 | 12/1990 | ............ H04N/7/13 |
| EP | 0 402 954 A3 | 12/1990 | ............ H04N/7/13 |
| EP | 0 514 053 A2 | 11/1992 | .......... H04N/7/137 |
| JP | 61-102872 | 5/1986 | .......... H04N/1/417 |
| JP | 1-209876 | 8/1989 | .......... H04N/1/417 |
| JP | 3-89690 | 4/1991 | ............ H04N/1/41 |
| JP | 4-11460 | 1/1992 | ............ H04N/1/41 |
| JP | 4-68664 | 3/1992 | ............ H04N/1/41 |
| JP | 5-30362 | 2/1993 | ............ H04N/1/41 |
| JP | 6-217296 | 8/1994 | .......... H04N/7/137 |
| JP | 6-245077 | 9/1994 | ............ H04N/1/41 |
| JP | 7-38896 | 2/1995 | ............ H04N/7/32 |
| JP | 7-107462 | 4/1995 | ............ H04N/7/24 |
| JP | 7-212760 | 8/1995 | ............ H04N/7/32 |
| JP | 7-274175 | 10/1995 | ............ H04N/7/32 |
| JP | 8-65680 | 3/1996 | ............ H04N/7/32 |
| JP | 8-96140 | 4/1996 | ............ H04N/1/41 |
| JP | 8-116542 | 5/1996 | ............ H04N/7/32 |

OTHER PUBLICATIONS

Eisuke Nakasu, et al., "Intra/Inter Mode Adaptive DCT Coding System of HDTV Signals," Proceedings of the International Workshop on HDTV and Beyond, Amsterdam, The Netherlands, Workshop 4, Sep. 4, 1991, pp 439–446.

Touradj Ebrahimi, "Mpeg–4 Video Verification Model: A Video Encoding/Decoding Algorithm Based on Content Representation," Signal Processing Image Communication, vol. 9, No. 4, May 1, 1997, pp 367–384.

Ebrahimi, T. et al.: "A Region Based Motion Compensated Video Vodec for Very Low Bitrate Applications", IEEE International Symposium on Circuits ans Systems, May 1–3, New Orleans, 1995, p. 457–461, XP000571125, par. 0004, 0005, Figs.1 and 4.

Etoh, M. et al.: "An Object–Based Image Coding Scheme Using Alpha Channel and Multiple Templates", Proceedings of The European Conference on Multimedia Applications, Services and Techniques, 1996 XP000904988, Pars. 02.2, 0005.

"Munich Meeting of Mpeg–4 Working Group Report ISO/IEC JTCI/SC29/WG11 Mpeg4/N1172", International Organization for Standardization–Organisation Internationale De Normalisation, XX, XX, 1996, pp. 3–49, XP002047798, par. 03.1, Fig. 3.1.2.

"International Organisation for Standaroisation Organisation International De Normalisation ISO/IEC JTC1/SC29/WG11", 1996, pp. 1–49, XP002056540, par. 03.1, Fig. 3.1.2.

Ebrahimi, T: "Mpeg–4 Video Verification Model: A Video Encoding/Decoding Algorithm Based on Content Representation" Signal Processing. Image Communication, Elsevier Science Publishers, Amsterdam, NL, vol. 9, No. 4, May 1, 1997, pp. 367–384, XP000700946, ISSN: 0923–5965, par. 3.1.2.

* cited by examiner

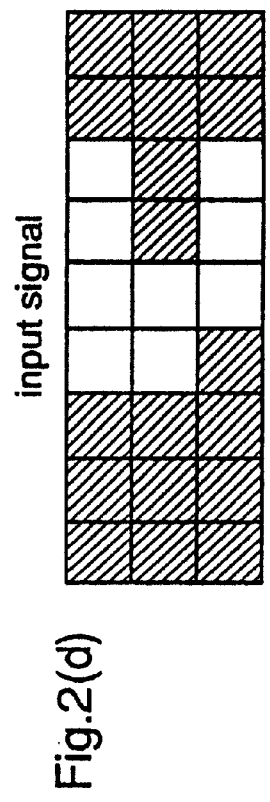
Fig.2(d)
Fig.2(e)
Fig.2(f)
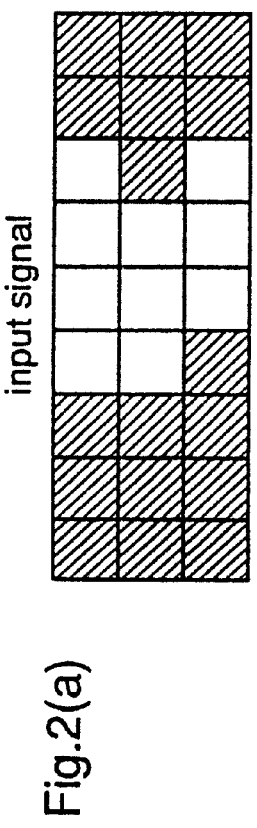
Fig.2(a)
Fig.2(b)
Fig.2(c)

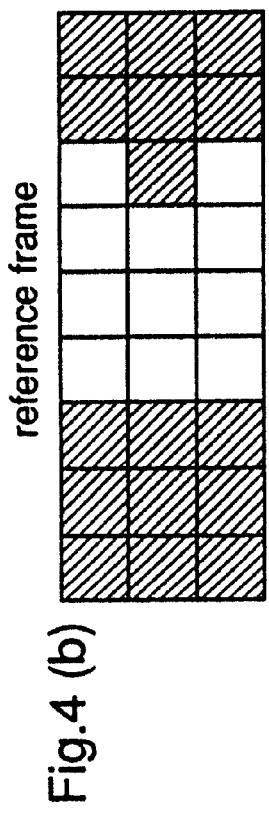
Fig.4 (b) reference frame
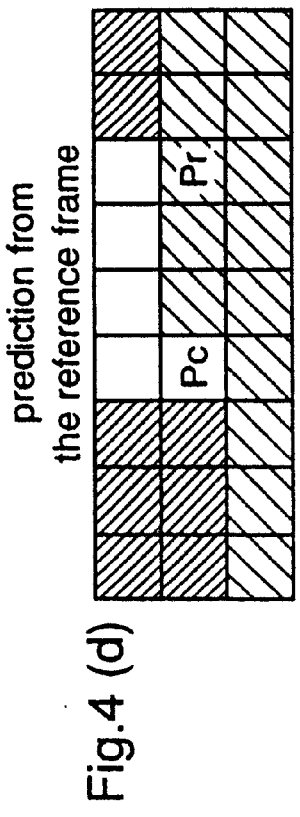
Fig.4 (d) prediction from the reference frame
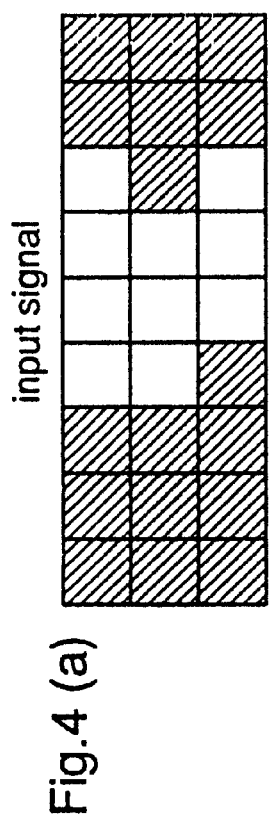
Fig.4 (a) input signal
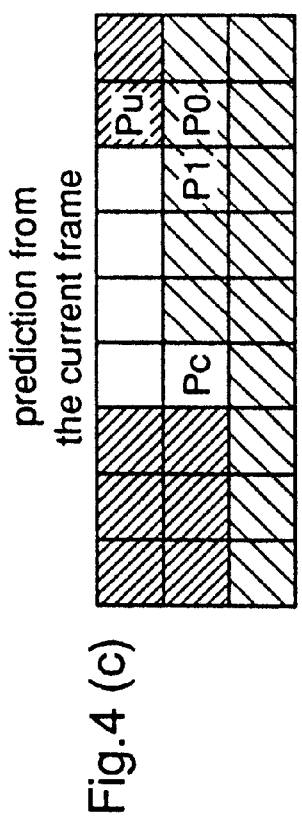
Fig.4 (c) prediction from the current frame
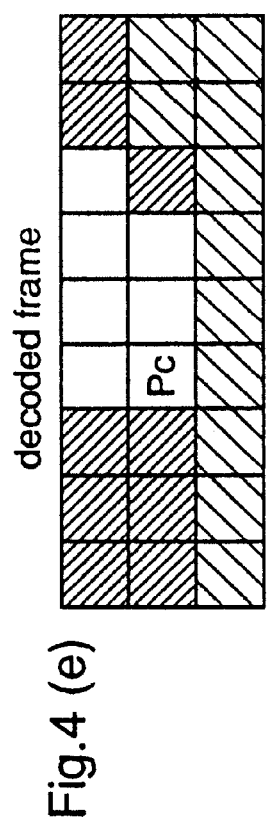
Fig.4 (e) decoded frame

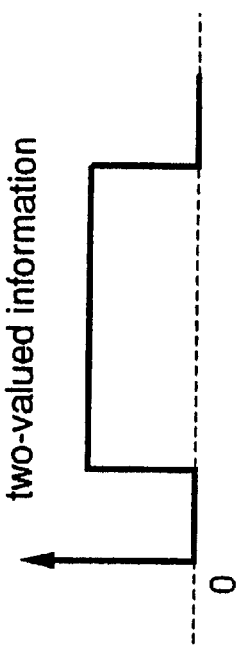
Fig.53 (c)
Prior Art
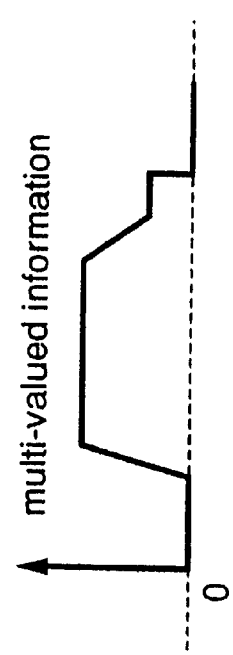
Fig.53 (d)
Prior Art
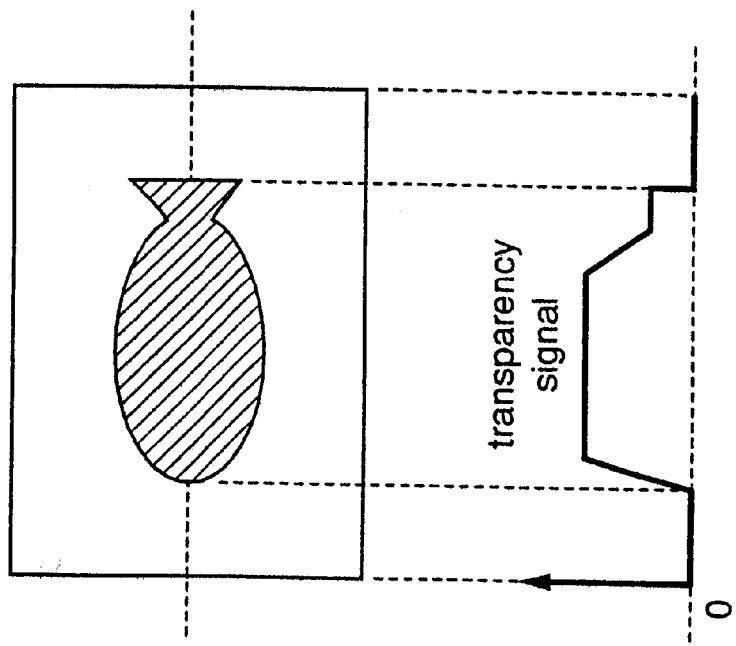
Fig.53 (a)
Prior Art
Fig.53 (b)
Prior Art

IMAGE CODING FOR TRANSMITTING INFORMATION OF SHAPE, PIXEL VALUE, AND CODING MODES

This is a Continuation of application Ser. No. 09/000,077 filed Mar. 9, 1998, now U.S. Pat. No. 6,188,796, issued Feb. 13, 2001.

FIELD OF TECHNOLOGY

This invention relates to an image encoding apparatus, an image decoding apparatus, an image encoding method, an image decoding method, an image encoding program recording medium and an image decoding program recording medium.

PRIOR ART

The image encoding technology has a long history. There has been established excellent standard proposals such as ITU-T H.261, ITU-T H263, ISO MPEG1/2 and so on. Roughly speaking, the image encoding method has two approaches: an encoding method using the orthogonal transform and a prediction encoding method encoding the error of predicted values with the use of the prediction function.

Although the encoding method using the orthogonal transform needs complicated calculation, when encoded signals of small bit numbers are obtained, it is possible to keep better picture quality than the prediction encoding method. The ordinary encoding method using orthogonal transform such as JPEG, MPEG and the like utilizes the DCT (Discrete Cosine Transform). Though it is known that DCT enables encoding by a small number of bits, it has own problems in that it needs high-precision multiplication, resulting in complicated calculation, and in that the reversible encoding is impossible. Accordingly, DCT calculation can not be used in the fields in which the reversibility is required.

As opposed to this, the prediction encoding method needs simple calculations and can do the reversible encoding. MMR (Modified Modified Read) used in facsimiles is famous as an image coding method having reversibility. MMR is used according to CCITT Rec.T6 "Facsimile Coding Schemes and Coding Control Functions for Group 4 Facsimile Apparatus". In this method, the difference value in the horizontal direction between the change points of pixel values on the immediately previous already-coded scanning line and the change points of pixel value on the not-yet-coded scanning line is variable-length encoded. MMMR (Modified MMR) which is a further improved MMR is used as the evaluation model for MPEG4 (ISO/IEC/JTC1/SC29/WG11 N1277, July 1996).

Incidentally, if image signals are separated into the objects and then the objects are processed as arbitrary shapes, image can be operated and synthesized, object by object, which leads to the effective signal-transmission. For applications which restrict bit number, by using such information, it is possible to selectively assign priority to important objects to transmit and record the same. However, the prior art technology has not taken into account the encoding of objects having arbitrary shapes. And the standardization of coding for image signals having arbitrary shapes has been proceeding in the ISO MPEG4. In MPEG4, the evaluation model called VM3.0 (printed in ISO/IEC/JTC1/SC29/WG11 N1277) is created, which is now a unique image encoding method that can encode image signals having arbitrary shapes.

An image signal having arbitrary shapes ordinarily consists of the shape information indicating the shape of an object and the pixel value information (color information) representing pixel values within an object. Concerning the shape information, the two-valued shape information indicating whether each pixel is significant(on the inside of the shape) or insignificant(on the outside of the shape), or the transparency information indicating the ratio(how much the object occludes the background) of respective pixels which is used in synthesizing with other images. When the transparency has only two levels, 0% and 100%, the shape information is identical to the transparency information and thereby the arbitrary-shape-having image signal is represented by the two of the two-valued shape information and the pixel value information.

FIG. 53 is a drawing for explaining these information. The transparency information is an information representing how much ratio of each pixel is used for synthesis when a fish shown in FIG. 53(a) is synthesized with the other image. In FIG. 53(b), there is shown the value of transparency information in the horizontal scanning line indicated by a dotted line in the figure. The outside of the fish is perfectly transparent. Here, the transparency 0 is defined as being perfectly transparent for simplification. Hence, on the outside of the fish the transparency information has a value of 0, while on the inside of the fish it has a value of non-0.

FIG. 53(c) shows the transparency which is made two-valued as having two of 0 and non-0. In FIG. 53(c), the pixels having the non-0 transparency require encoding of the pixel value information, while the pixels having the 0 transparency do not need the pixel value information, so that the two-valued transparency information is very important to the pixel value information encoding. On the other hand, the component of the transparency information which can not be represented by two-valued information, as shown in FIG. 53(d), is multi-valued information which is called gray scale. The shape information represented by multi-valued information as described above can be treated by the waveform encoding similar as that for the pixel value information.

While performing the image encoding, the intra-frame encoding based on the spacial correlation or the temporal correlation is separately used, both of the two are employed. In the inter-frame encoding, the motion in the close frames is detected, and the motion compensation is carried out for the detected motion. The motion vector is generally used for the motion compensation. In the above-mentioned VM3.0, the intra-frame encoding and the inter-frame encoding are adaptively switched each other block by block, and the motion compensation similar as in MPEG1/2 is carried out, whereby the efficiency of encoding is improved.

As described above, when performing encoding to the image consisting of the shape information and the pixel value information, if the motion compensation encoding of a shape information is carried out using the motion vector of the pixel value information for the shape information to be used for the image synthesis, the efficiency of encoding is further improved than when the shape information is directly encoded. This is reported by ISO/IEC/JTC1/SC29/WG11 N1260 March 1996.

Further, when the motion detection and motion compensation are executed, it is considered that it is efficient that the shape information is separated into the two-valued shape information component and the multi-valued information component, and the multi-valued information component as well as the pixel value information are subjected to the same waveform encoding together, which has been actually practiced.

In the above-described prior art image encoding and the image decoding accompanying to this, there exist the following problems.

Though MMR encoding is a representative one of the reversible (loss-less) encoding as described above, because of the reversibility, it is impossible to largely improve the compression rate by allowing the visually less-important picture-quality degradation.

In addition, MMR is an intra-frame encoding method, and does not take into account the improvement of the compression rate by utilizing the inter-frame correlation. In MMR and MMMR which a modified version of MMR; only the difference between the change point of the current scanning line and the change point of the immediately previous scanning line is utilized, and the redundancy by the correlation as a straight line in the vertical direction is not sufficiently removed. Accordingly, the encoding efficiency is good when the change of the pixel value happens along the scanning line, but the encoding efficiency is bad when the change of the pixel value does not happen along the scanning line. MMR and MMMR also includes the horizontal encoding mode which does not utilize the correlation in the vertical direction at all in order to encode the pixels which can not be encoded as the difference of the change point of the immediately previous scanning line. This horizontal encoding mode has a room for further improving the efficiency with the use of the correlation in the vertical direction.

Further, in the prior art MMR and MMMR, the hierarchical image reproduction by decoding part of bit stream is impossible. The other methods in which the hierarchical image reproduction is possible have no good encoding efficiency and have demerit of increasing the encoding bit number. Accordingly, there exists no encoding method which enables the effective hierarchical image reproduction.

Further, when encoding the image consisting of shape information and image information by the motion compensation, the shape information is motion-compensated using the same motion vector as that for the image information in the prior art. However, similarly as that, if a sphere rotates, the figure drawn on the sphere moves, though the shape of the sphere does not change, the motion vector of the image information is not identical to that of the shape information. Therefore, in such a case no good encoding is carried out, which is a problem in the prior art encoding method.

Furthermore, while in VM3.0, there is a method which tries to improve the encoding efficiency by adaptively switching the intra-frame encoding and the inter-frame encoding block by block as described, the judgment against intra-frame/inter-frame encoding is based on the pixel value information similarly as in the adaptive switching in MPEG1/2, so that it is difficult to appropriately and efficiently encode the shape information which is largely different from the pixel value information in its nature.

In the light of the above-described respects, this invention is proposed and an object of this invention is to provide an image encoding apparatus, an image encoding method and an image encoding program recording medium, all of which can encode image signals efficiently. Also, another object of this invention is to provide an image decoding apparatus, an image decoding method and an image decoding program recording medium, all of which can appropriately decode the above-mentioned encoded signal encoded effectively.

DISCLOSURE OF INVENTION

In order to achieve the above-mentioned objects, a 1st aspect of this invention provides an image encoding apparatus which receives two-valued image signals as input signals and encodes pixels of the input signals changing the pixel values, comprising:

change pixel detection means for detecting the pixels changing the pixel values and outputting the result as the detected change pixels;

prediction, means for predicting change pixels of the input signals based on the pixels changing the pixel values of already encoded and decoded pixels and outputting the result as predicted pixels;

difference value calculation means for calculating from the detected change pixels and the predicted change pixels the difference therebetween and outputting the same as difference values D;

rounding means for selecting D' which is in the range determined based on the given tolerance value and the difference value D and which has the minimum code length when it should be encoded and outputting it as modified difference value;

decoding means for decoding the two-valued image signal from the modified difference values D' and the predicted change pixels; and encoding means for encoding the modified difference values D', whereby the image encoding apparatus selects modified difference values which cause the code length of the error (difference value) to become the minimum in the prediction error equal to or smaller than the tolerance value and outputs this, resulting in reducing the bit number which is required for encoding.

A 2nd aspect of this invention provides an image encoding apparatus according to which receives two-valued image signals as input signals and encodes pixels of the input signals changing the pixel values, comprising:

change pixel detection means for detecting the pixels changing the pixel values and outputting the result as the detected change pixels;

1st prediction means for predicting change pixels of the input signals based on the pixels changing the pixel values of already encoded and decoded pixels in the frames and outputting the result as 1st predicted pixels;

1st difference value calculation means for calculating from the detected change pixels and the 1st predicted change pixels the differences therebetween and outputting the same as 1st difference values D;

2nd prediction means for predicting change pixels of the input signals, along with the motion compensation, based on the pixels changing the pixel values of already encoded and decoded pixels in reference frames and outputting the result as 2nd predicted pixels;

2nd difference value calculation means for calculating the differences between the detected change pixels and the 2nd predicted change pixels and outputting the same as 2nd difference values D";

mode selection means for calculating the code lengths of the first and second difference values D' and D" when respectively encoded, selecting the value having the shorter code length by comparing the calculated results, and outputting "the first" or "the second", depending on the selection, as an encoding mode; and encoding means for encoding the selected first or second difference values D' or D", and the encoded mode output by the mode selection means, whereby the image encoding apparatus can select a signal which should have the minimum code-length by comparing the prediction based on the frame and the prediction based on the motion-compensated reference frame to output an encoded signal, resulting in reduced bit number required for encoding by the utilization of the inter-frame pixel correlation.

A 3rd aspect of this invention provides an image encoding apparatus which receives two-dimensional two-valued image signals as input signals and encodes pixels of the input signals changing the pixel values, comprising:

change pixel detection means for detecting the pixels changing the pixel values and outputting the result as the detected change pixels;

1st prediction means for predicting change pixels of the input signals based on the pixels changing the pixel values of already encoded and decoded pixels by horizontally scanning the image signals and outputting the result as 1st predicted pixels;

1st difference value calculation means for calculating the differences between the detected change pixels and the 1st predicted pixels and outputting the same as 1st difference values D;

2nd prediction means for predicting change pixels of the input signals based on the pixels changing the pixel values of already encoded and decoded pixels by scanning the image signals in the vertical direction and outputting the result as 2nd predicted pixels;

2nd difference value calculation means for calculating the differences between the detected change pixels and the 2nd predicted pixels and outputting the same as 2nd difference values mode selection means for calculating the code lengths of the first and second difference values D' and D" when respectively encoded, selecting the value having the shorter code length by comparing the calculated results, and outputting "the first" or "the second" depending on the selection as an encoding mode; and encoding means for encoding the selected first or second difference values D' or D", and the encoded mode output by the mode selection means, whereby the image encoding apparatus can select a signal which should have the minimum code-length by comparing the prediction by the horizontal scanning and the prediction by the vertical scanning to output an encoded signal, resulting in reducing the bit number required for encoding by the utilization of local changes in the horizontal correlation and the vertical correlation of the image.

A 4th aspect of this invention provides an image encoding apparatus which receives multi-valued image signals as input signals and encodes pixels of the input signals-changing the pixel values, comprising:

change pixel detection means for detecting the pixels changing the pixel values to a value above the given value and outputting the result as the detected change pixels;

prediction means for predicting change pixels of the input signals based on the pixels changing the pixel values of already encoded and decoded pixels and outputting the result as predicted pixels;

difference value calculation means for calculating the difference between the detected change pixels and the predicted pixels and outputting the same as a difference value D;

encoding means for encoding the difference values D and the pixel values of the detected change pixel; and decoding means for decoding the multi-valued image signal from the difference values D and the pixel values of the detected change pixel, whereby the image encoding apparatus can judge the position where the change of the pixel values is equal to or larger the threshold as the change position, and enables encoding of not only two-valued image but also multi-valued image.

A 5th aspect of this invention provides an image encoding apparatus, which receives a transparency signal indicating the ratio for the image synthesis and a pixel value signal as input signals, and encodes the input signal referring to a reference image, comprising:

1st motion vector detection means for detecting motion vectors of the pixel value signal by comparing the pixel value signal of the input signal and the pixel value signal of the reference image;

1st motion compensation means for motion-compensating the pixel value signal of the reference image using the motion vectors of the pixel value signal, and outputting a compensated pixel value signal;

1st difference value calculation means for calculating from the pixel value signal of the input signal and the compensated pixel value signal the difference therebetween, and outputting the same as 1st difference values;

1st encoding means for encoding the 1st difference values;

2nd motion vector detection means for detecting motion vectors of the transparency signal by comparing the transparency signal of the input signal and the transparency signal of the reference image;

2nd motion compensation means for motion-compensating the transparency signal of the reference image using the motion vectors of the transparency signal, and outputting the same as a compensated transparency signal;

2nd difference value calculation means for calculating from the transparency signal of the input signal and the compensated transparency signal the difference therebetween, and outputting the same as 2nd difference values;

2nd encoding means for encoding the 2nd difference values; and

3rd encoding means for encoding the motion vectors of the pixel value signal and the motion vectors of the transparency signal, whereby the image coding apparatus motion-compensates the transparency signal using the motion vectors which are detected apart from the motion vectors of the pixel value signal and thereby approximates the input transparency signal with good precision by the motion compensation signal, resulting in reduced motion compensation error and improved encoding efficiency.

A 6th aspect of this invention provides an image encoding apparatus according to aspect 5 wherein the 2nd motion vector detection means detects the motion vectors of the transparency signal by comparing the transparency signal of the input signal and the transparency signal of the reference image in the vicinity of the motion vectors detected by the 1st motion vector detection means, whereby the motion vectors of the transparency signal are detected only in the vicinity of the motion vectors of the pixel value signal, resulting in reduced calculation times required for detecting motion vectors, compared to the case where the calculation is performed independently of the pixel value signal.

A 7th aspect of this invention provides an image encoding apparatus according to aspect 5 wherein the 1st motion vector detection means detects the motion vectors of the pixel value signal by comparing the pixel value signal of-the input signal and the pixel value signal of the reference image in the vicinity of the motion vectors detected by the 2nd motion vector detection means, whereby the motion vectors of the pixel value signal are detected only in the vicinity of the motion vectors of the corresponding signal, resulting in reduced calculation times required for detecting motion vectors, compared to the case that the calculation is independent of the transparency signal.

An 8th aspect of this invention provides an image encoding apparatus according to aspect 5 wherein the 3rd encoding means encodes the motion vectors of the pixel value signal and the differences between the motion vectors of the transparency signal and the motion vectors of the pixel value signal, whereby the difference vector of the motion vectors having correlation is coded and thereby the occurrence frequency of the difference vectors concentrates on in the vicinity of 0 vectors, and therefore the variable-length encoding improves the encoding efficiency and the encoding can be carried out with less bit number.

A 9th aspect of this invention provides an image encoding apparatus according to aspect 5 wherein the 3rd encoding means encodes the motion vectors of the transparency signal and the difference between the motion vectors of the transparency signal and the motion vectors of the pixel value signal, whereby the difference vector of the motion vectors having correlation is coded and thereby the occurrence frequency of the difference vectors concentrates on in the vicinity of 0 vectors, and therefore the variable-length encoding improves the encoding efficiency and the encoding can be carried out with less bit number.

A 10th aspect of this invention provides an image encoding apparatus, which receives image signals with blocked shapes consisting of shape signals indicating the shapes of objects and whether the pixel value of pixels are significant or not and pixel value signals as input signals, and encodes the input signals referring to reference images, comprising:

1st motion vector detection means for detecting motion vectors of the pixel value signal by comparing the pixel value signal of the input signal and the pixel value signal of the reference image;

1st motion compensation means for motion-compensating the pixel value signal of the reference image using the motion vectors of the pixel value signal, and outputting the same as a compensated pixel value signal;

1st difference value calculation means for calculating from the pixel value signal of the input signal and the compensated pixel value signal the difference therebetween, and outputting the same as 1st difference values;

1st encoding means for encoding the 1st difference values;

2nd motion vector detection means for detecting motion vectors of the shape signal by comparing the shape signal of the input signal and the shape signal of the reference image;

2nd motion compensation means for motion-compensating the shape signal of the reference image using the motion vectors of the shape signal, and outputting the same as a compensated shape signal;

2nd difference value calculation means for calculating from the shape signal of the input signal and the compensated shape signal the difference therebetween, and outputting the same as 2nd difference values;

2nd encoding means for encoding the 2nd difference values; and

3rd encoding means for encoding the motion vectors of the pixel value signal and the motion vectors of the shape signal, whereby the encoding efficiency is improved as well as the motion compensation errors are further reduced by using appropriate signals which are encoded and decoded as reference images and to which the motion compensation values are added.

A 11th aspect of this invention provides an image encoding apparatus according to aspect 10 wherein the 2nd motion vector detection means detects the motion vectors of the shape signal by comparing the shape signal of the input signal and the shape signal of the reference image in the vicinity of the motion vectors detected by the 1st motion vector detection means, whereby the calculation times of the motion detection are reduced.

A 12th aspect of this invention provides an image encoding apparatus according to aspect 10 wherein the 1st motion vector detection means detects the motion vectors of the pixel value signal by comparing the pixel value signal of the input signal and the pixel value signal of the reference image in the vicinity of the motion vectors detected by the 2nd motion vector detection means, whereby because of the result of the motion detection in the transparency signal is used in the motion detection of the pixel value signal, the calculation times of the motion detecting are reduced.

A 13th aspect of this invention provides an image encoding apparatus according to aspect 10 wherein the 3rd encoding means encodes the motion vectors of the pixel value signal and the difference values between the motion vectors of the shape signal and the motion vectors of the pixel value signal, whereby because the difference vectors between the motion vectors of the pixel value signal and the motion vectors of the shape signal are encoded instead of the motion vectors of the shape signal being encoded, the variable-length encoding enables further improvement in the encoding efficiency.

A 14th aspect of this invention provides an image encoding apparatus according to aspect 10 wherein the 3rd encoding means encodes the motion vectors of the shape signal and the difference values between the motion vectors of the shape signal and the motion vectors of the pixel value signal, whereby because the difference vectors between the motion vectors of the shape signal and the motion vectors of the pixel value signal are encoded instead of the motion vectors of the pixel value signal being encoded, the variable-length encoding enables further improvement in the encoding efficiency.

A 15th aspect of this invention provides an image encoding apparatus according to aspect 10 wherein, when the shape signal of the input signal indicates that all pixel values are significant, and the compensated shape signal which is motion-compensated for the shape signal of the reference image using the motion vectors of the pixel value signal detected by the 1st motion vector detection means, indicates that all pixel values are significant, or when the shape signal of the input signal indicates that all pixel values are insignificant, and the compensated shape signal which is motion-compensated for the shape signal of the reference image using the motion vectors of the pixel value signal detected by the 1st motion vector detection means, indicates that all pixel values are insignificant, the 2nd vector detection means does not detect the motion vectors of the shape signal, and the motion vectors of the pixel value signal detected by the 1st vector detection means is used as the motion vectors of the shape signal, whereby the motion detection of the shape signal when the necessity is therefore low is not performed, resulting in reduced processing load.

A 16th aspect of this invention provides an image encoding, apparatus according to aspect 10 wherein, when the compensated shape signal which is motion-compensated for the shape signal of the reference image using the motion vectors of the pixel value signal detected by the 1st motion vector detection means is compared to the shape signal of the input signal and the resulting difference is lower than the given tolerance value, the 1st vector detecting means does not detect the motion vector of the pixel value signal but the motion vectors of the shape signal detected by the 2nd vector detection means is used as the motion vectors of the pixel value signal, whereby the motion detection of the shape signal when the necessity is therefore low is not performed, resulting in reduced processing load.

A 17th aspect of this invention provides an image encoding apparatus according to aspect 10 wherein, when the motion vectors of the shape signal have been encoded from the immediately previous encoded input signal, the 3rd encoding means encodes the difference values between the immediately previous encoded motion vectors of the shape signal and the motion vectors of the shape signal detected from the input signal when the motion vector of the shape signal of the input signal is encoded in the immediately previous encoded input signal. That is, when the immediately previous motion vectors of the shape signal have been encoded, the difference vectors between the motion vectors and the detected motion vectors are obtained and encoded, whereby it is possible to improve the encoding efficiency using the motion vectors between shape signals having high correlation.

An 18th aspect of this invention provides an image encoding apparatus according to aspect 10 wherein, when the immediately previous motion vectors of the pixel value signal of the input signal have been encoded, the 3rd encoding means encodes the difference values between the motion vectors of the immediately previous encoded pixel value signal and the motion vectors of the pixel value signal detected from the input signal. That is, when the immediately previous motion vectors of the pixel value signal have been encoded, the difference vectors between the motion vectors and the detected motion vectors are obtained and encoded, whereby it is possible to improve the encoding efficiency using differences of the motion vectors between pixel value signals having high correlation.

A 19th aspect of this invention provides an image encoding apparatus according to any of aspects 10 to 18 wherein, when the input signal consists of the transparency information indicating the synthesis ratio for synthesizing a plurality of images, and the image information, as the transparency information regarded is the shape signal and as the image information regarded is the pixel value signal, whereby it is possible to improve the encoding efficiency for image signal including transparency information.

A 20th aspect of this invention provides an image encoding apparatus according to any of aspects 10 to 18 wherein, when the input signal consists of the transparency information indicating the synthesis ratio for synthesizing a plurality of images and the image information, the transparency information is separated into the two-valued signal representing only the shape and the other remaining signal, and then the two-valued signal is regarded as the above shape signal, and the separated remaining shape signal and the image information are regarded as the pixel value signal, whereby it is possible to improve the encoding efficiency for image signals including transparency information.

A 21st aspect of this invention provides an image encoding apparatus which receives the image signal which consists of at least either the shape information indicating whether pixel values of respective pixels of an object are significant or not, or the transparency information indicating the synthesis ratio for respective pixels of the object, and of the image information, as input image signal, comprising:

blocking means for integrating pixels which spacially and temporally coincide with the input image signal into a group and outputting the group as blocked information;

1st encoding means for selecting an encoding mode from the given set of encoding modes for each piece of shape information formed into blocks by the blocking means, the transparency information and the pixel value information, and encoding each piece of information in each selected encoding mode;

2nd encoding means for collectively encoding all mode-identifying information each of which indicates the selected mode for each piece of shape information, the transparency information and the pixel value information; and the output of the 1st encoding means and the output of the 2nd encoding means being output as coded outputs;

whereby because all the high-correlated shape information, transparency information and pixel value information are collectively encoded, the variable-length encoding which produces codes having short code lengths for the codes being the same modes makes it possible to reduce the bit number of the encoded mode signal.

A 22nd aspect of this invention provides an image encoding apparatus which receives the image signal which consists of at least either the shape information indicating whether or not pixel values of respective pixels of an object are significant, or the transparency information indicating the synthesis ratio for respective pixels of the object, and the pixel value information, as input image signal, comprising:

blocking means for integrating pixels which spacially and temporally coincide with the input image signal into a group and outputting the group as blocked information;

1st encoding means for selecting an encoding mode from the given set of encoding modes for each piece of shape information formed into blocks by the blocking means and the transparency information, and encoding each piece of information in each selected encoding mode;

2nd encoding means for encoding the pixel value information which is blocked by the blocking means in either of the encoding modes selected by the 1st encoding means; and 3rd encoding means for collectively encoding all mode-identifying information each of which indicates the selected mode for each piece of shape information, the transparency information and the pixel value information, whereby the selected modes are likely to become identical each other, the outputs of the 1st, 2nd and 3rd encoding means being output as the encoded output, and the variable-length encoding makes it possible to reduce the bit number of the encoded mode signal to a further extent.

A 23rd aspect of this invention provides an image encoding apparatus which receives the image signal which consists of at least either the shape information indicating whether or not pixel values of respective pixels of an object are significant, or the transparency information indicating the synthesis ratio for respective pixels of the object as the input image information, and the pixel value information, as input image signal, comprising:

blocking means for integrating pixels which spacially and temporally coincide with the input image signal into a group and outputting the group as blocked information;

1st encoding means for selecting an encoding mode from the given set of encoding modes for each piece of pixel value information formed into blocks by the blocking means, and encoding each piece of information in each selected encoding mode;

2nd encoding means for encoding the shape information and the transparency information formed into blocks by the blocking means; and 3rd encoding means for collectively encoding all mode-identifying information each of which indicates the selected mode for the shape information, the transparency information and the pixel value information, whereby because the selected modes are is likely to become identical each other, the outputs of the 1st, 2nd and 3rd encoding means being output as the encoded output, the variable-length encoding makes it possible to further reduce the bit number of the encoded mode signal.

A 24th aspect of this invention provides an image encoding apparatus according to any of aspects 21 to 23 wherein, the given encoding modes are the intra-frame encoding and the inter-frame encoding, whereby the encoding based on the correlation of the image signal is performed, and thereby reduction in the bit number of the encoded mode signal is enabled.

A 25th aspect of this invention provides an image encoding apparatus according to any of aspects 21 to 23 wherein, the 2nd encoding means selects the intra-frame encoding when the selected encoding mode is the intra-frame encoding mode in the 1st encoding means, whereby the encoding based on the correlation of the image signal is performed using the same modes, and the reduction in the bit number of the encoded mode signal is enabled.

A 26th aspect of this invention provides an image encoding apparatus according to any of aspects 21 to 23 wherein, the given encoding modes are the number of motion vectors of each of the blocks, whereby the encoding corresponding to the nature of the image signal is performed, and the reduction in the bit number of the encoded mode signal is enabled.

A 27th aspect of this invention provides an image encoding apparatus according to any of aspects 22 to 23 wherein, the 2nd encoding means selects the number of motion vectors of each of the blocks which is the encoding mode selected in the 1st encoding means as the encoding mode, whereby the encoding corresponding to the nature of the image signal is performed using the same modes, and a further reduction in the bit number of the encoded mode signal is enabled.

A 28th aspect of this invention provides an image encoding apparatus according to any of aspects 21 to 23 wherein, the given encoding modes are the changing of the quantizing step and the non-changing of the quantizing step, whereby the encoding corresponding to the nature of the image signal is performed, and the reduction in the bit number of the encoded mode signal is enabled.

A 29th aspect of this invention provides an image encoding apparatus according to any of aspects 22 to 23 wherein, the 2nd encoding means selects the non-changing of the quantizing step when the 1st encoding means selects the non-changing of the quantizing step, whereby the encoding corresponding to the nature of the image signal is performed, and the reduction in the bit number of the encoded mode signal is enabled.

A 30th aspect of this invention provides an image encoding apparatus which receives two-dimensional image signals consisting of a plurality of pixels as input signals and encodes the image signals, comprising:

1st change pixel detection means for detecting the pixels changing the pixel values by scanning in the given direction on the two-dimensional image signal and outputting the result as the detected 1st change pixels;

2nd change pixel detection means for detecting the pixels changing the pixel values by scanning in the given direction on the already encoded and decoded pixels and outputting the result as the detected 2nd change pixels;

3rd change pixel detection means for detecting the pixels changing the pixel values by scanning in the given direction on the already encoded and decoded pixels and outputting the result as the detected 3rd change pixels;

change pixel prediction means for predicting the 1st change pixels based on the 1st and 2nd change pixels and outputting the result as predicted change pixels;

prediction error calculation means for calculating the differences between the detected 1st change pixels and predicted change pixels, and outputting difference values of change pixels; and prediction error encoding means for encoding the difference values of change pixels, whereby the error concerning the prediction is encoded and the improvement in the encoding efficiency is enabled.

A 31st aspect of this invention provides an image encoding apparatus according to aspect 30 wherein, the 2nd change pixel detection means and the 3rd change pixel detection means makes the pixel values of the 2nd change pixel and the 3rd change pixel equal to that of the 1st change pixel, whereby the above-described encoding. is performed and the above-described effect is obtained.

A 32nd aspect of this invention provides an image encoding apparatus according to aspect 30 wherein, the 2nd change pixel detection means and the 3rd change pixel detection means use the same given scanning direction as the given scanning direction of the 1st change pixel detection means, whereby the above-described encoding is performed and the above-described effect is obtained.

A 33rd aspect of this invention provides an image encoding apparatus according to aspect 30 wherein, the 3rd change pixel is encoded by the difference with the change pixel which is predicted using the 2nd change pixel, whereby the above-described encoding is performed and the above-described effect is obtained.

A 34th aspect of this invention provides an image encoding apparatus according to aspect 30 wherein, it is assumed that the 2nd change pixel, 3rd change pixel and 1st change pixel should be on different scanning lines, whereby the above-described encoding is performed and the above-described effect is obtained.

A 35th aspect of this invention provides an image encoding apparatus according to aspect 30 wherein, when the 2nd change pixel is the x-th pixel on the m-th scanning line and the 3rd change pixel is the y-th pixel on the n-th scanning line, the change pixel prediction means predicts that the 1st change pixel should be the y−(x−y)*(n−k)/(m−n)-th pixel on the k-th scanning line, whereby the above-described encoding is performed and the above-described effect is obtained.

A 36th aspect of this invention provides an image encoding apparatus which receives two-dimensional image signals consisting of a plurality of pixels as input signals and encodes the image signals, comprising:

change pixel detection means for detecting the pixels changing the pixel values by scanning the two-dimensional image signal in the given direction to output the result as the detected change pixels;

change pixel prediction means for predicting change pixels based on encoded and decoded pixels and outputting the result as predicted change pixels;

prediction error calculation means for calculating the differences between the detected change pixels and the predicted change pixels, and outputting difference values of change pixels;

prediction error encoding means for encoding the difference value of change pixels and outputting it as a difference value encoded signal, when the difference value of change pixels is less than the given value; and pixel number encoding means for calculating the number of the pixels which are positioned between the immediately previous encoded change pixel and the detected change pixel and are not positioned at the pixel position which the prediction error encoding means can encode, and encoding the calculated pixel number, and outputting the pixel number encoded signal, when the difference value of changed pixels is equal to or larger than the given value, the prediction error encoding means and the pixel number encoding means performing encodings in which the encoded signal and the pixel number encoded signal are uniquely identifiable thereby to output the prediction error encoded signal when the prediction error is within the given range and to output the pixel number encoded signal when the prediction error is beyond the given range as the output encoded signal, whereby when the prediction error is large, the appropriate encoding is carried out, averting the reduction in the encoding efficiency even when the prediction error is so large that the variation in the number of the change pixels unables the prediction of the change pixel.

A 37th aspect of this invention provides an image encoding apparatus according to aspect 36 wherein, in the prediction error encoding means and the pixel number encoding means, the given value which is to be compared with the difference value of the change pixels is set using the pixel number of the scanning line, whereby the above-described encoding is performed and the above-described effect is obtained.

A 38th aspect of this invention provides an image encoding apparatus which receives two-dimensional shape signals indicating the area where the pixels representing an object exist as input and encodes the shape signals, comprising:

significant area extracting means for extracting the significant area which contains the pixels representing an object from the shape signal to output a significant area range representing the range covering the extracted significant area;

blocking means for dividing the shape signal into blocks having a plurality of pixels;

shape encoding means for judging whether the blocks output by the blocking means contain the significant area each by each, and encoding at least the significant area of the block to output a shape encoded signal when it is judged that the block contains the significant area; and the significant area range and the shape encoded signal being made as encoded signal, thereby the range of the significant area is detected and the block size of the shape signal is changed so that only the inside of the significant area of the shape signal is encoded;

whereby the encoding is not performed beyond the range of the significant area, resulting in improved encoding efficiency of the shape signal.

A 39th aspect of this invention provides an image encoding apparatus according to aspect 38 wherein, the shape encoding means extracts the minimum rectangular area containing the significant area from the blocks produced by the blocking means, and encodes only the inside of the extracted rectangular area, whereby the above-described encoding is performed and the encoding efficiency is obtained.

A 40th aspect of this invention provides an image encoding apparatus which receives two-dimensional image signals consisting of a plurality of pixels as input signals and encodes the two-dimensional image signals, comprising:

image signal separation means for separating the image signal into at least 2 image signals, and outputting the separated image signals as two or more partial image signals;

1st image signal encoding means for selecting at least one of the partial image signals as target partial image signals and encoding the selected target partial image signal and outputting the result as 1st encoded signal;

prediction probability calculating means for predicting the non-target partial image signals which are the partial image signal other than the target partial image signal, and calculating the probability that the prediction comes true, and outputting the calculated prediction probability; and 2nd image signal encoding means for determining the degree of priority of decoding based on the prediction probability calculated by the prediction probability calculation means, and encoding the non-target partial image signal using the encoding method based on the determined degree of priority, whereby the smaller prediction probability pixels are encoded with priority, thereby making it possible to realize a hierarchical encoding having little picture-quality degradation without any additional information.

A 41st aspect of this invention provides an image encoding apparatus according to aspect 40 wherein, the 2nd image signal encoding means determines the degree of priority of decoding so that the small prediction probability pixels are encoded with priority, whereby the above-described encoding is performed and the encoding efficiency is obtained.

A 42nd aspect of this invention provides an image encoding apparatus according to aspect 40 wherein, the prediction probability calculating means makes the coming-true probability be large when the pixel values of the neighbor pixels have the same value, while makes the coming-true probability be small when the pixel values of the neighbor pixels do not have the same value, whereby the above-described encoding is performed and the encoding efficiency is obtained.

A 43rd aspect of this invention provides an image decoding apparatus which, receives the encoded signals and decodes the same, comprising:

decoding means for decoding the encoded signal to obtain the encoded mode and the difference value, and outputting the obtained encoding mode as a mode signal and the obtained difference value as a decoded difference value;

1st prediction means for predicting the change pixel of the input signal based on the pixel changing the pixel value among the already encoded and decoded pixels in the frame, and outputting the predicted pixels as 1st predicted pixels;

2nd prediction means for predicting the change pixel of the input signal, with the motion compensation, based on the pixel changing the pixel value among the already encoded and decoded pixels in the reference frame, and outputting the predicted pixels as 2nd predicted pixels;

addition means for adding the decoded difference value to the 1st predicted pixel when the mode signal indicates the prediction of the particular frame, and adding the decoded difference value to the 2nd predicted pixel when the mode signal indicates the prediction of reference frame; and the output of the addition means being made the change pixel;

whereby the encoded signal obtained by the image encoding apparatus of aspect 2 can be appropriately decoded.

A 44th aspect of this invention provides an image decoding apparatus which receives encoded signals and decodes the same, comprising:

decoding means for decoding the encoded signal to obtain the encoded mode and the difference value, and outputting the obtained encoding mode as a mode signal and the obtained difference value as a decoded difference value;

1st prediction means for predicting the change pixel of the input signal, based on the pixel changing the pixel value among the already encoded and decoded pixels, by horizontally scanning the image signal, and outputting the predicted pixels as 1st predicted pixels;

2nd prediction means for predicting the change pixel of the input signal, with the motion compensation, based on the pixel changing the pixel value among the already encoded and decoded pixels, by scanning the image signal in the vertical direction, and outputting the predicted pixels as 2nd predicted pixels;

addition means for adding the decoded difference value to the 1st predicted pixel when the mode signal indicates the prediction by the horizontal scanning, and adding the decoded difference value to the 2nd predicted pixel when the mode signal indicates the prediction by the vertical scanning; and the output of the addition means being made the change pixel;

whereby the encoded signal obtained by the image encoding apparatus of aspect 3 can be appropriately decoded.

A 45th aspect of this invention provides an image decoding apparatus which receives encoded signals and decodes the same, comprising:

decoding means for decoding the encoded signal, obtaining the difference value and the pixel value of the change pixel, and outputting the obtained difference value as a decoded difference value and the obtained change pixel as decoded pixel;

prediction means for predicting the change pixel of the input encoded signal, based on the pixel changing the pixel value among the already decoded pixels, and outputting the predicted pixels as predicted pixels;

addition means for adding the decoded difference value to the predicted pixel and outputting the calculated result as a modified difference value; and image decoding means for obtaining multi-valued signals by a decoding process from the modified difference values and the decoded pixel values, whereby the encoded signal obtained by the image encoding apparatus of aspect 4 can be appropriately decoded.

A 46th aspect of this invention provides an image decoding apparatus which receives encoded signals and decodes the same, comprising:

1st decoding means for decoding the encoded signal to obtain the difference value of the pixel value signal, and outputting the obtained difference value as a decoded pixel value difference value;

2nd decoding means for decoding the encoded signal to obtain the difference value of the transparency signal, and outputting the obtained difference value as a decoded transparency difference value;

3rd decoding means for decoding the encoded signal to obtain the motion vectors of the pixel value signal and the motion vectors of the transparency signal, and outputting the decoded pixel value motion vectors and the decoded pixel value motion vectors;

1st motion compensation means for compensating the pixel value signal of a reference image described below using the encoded pixel value motion vectors, and outputting the result of the motion compensation as a compensated pixel value signal;

1st addition means for adding the decoded pixel value difference value and the compensated pixel value signal to output the result of the addition as a decoded pixel value signal as well as a pixel value of a reference image;

2nd motion compensation means for compensating the transparency signal of a reference image described-below using the decoded transparency motion vectors, and outputting the result of the motion compensation as a compensated transparency signal; and 2nd addition means for adding the decoded transparency difference value and compensated transparency signal, and outputting the result of the addition as a decoded transparency signal as well as a transparency signal of a reference image;

whereby the encoded signal obtained by the image encoding apparatus of aspect 5 can be appropriately decoded.

A 47th aspect of this invention provides an image decoding apparatus according to aspect 46 wherein, the 3rd decoding means decodes the motion vector of the pixel value signal and the difference value of the motion vectors to obtain the decoded pixel value motion vectors and the decoded motion vector difference values, and adding the decoded pixel value motion vectors and the decoded motion vector difference values, and making the result of the addition be the encoded transparency motion vectors, whereby the encoded signal obtained by the image encoding apparatus of aspect 7 can be appropriately decoded.

A 48th aspect of this invention provides an image decoding apparatus which receives encoded signals and decodes the same, comprising:

1st decoding means for decoding the encoded signal to obtain the difference value of the pixel value signal, and outputting the obtained difference value as a decoded pixel value difference value;

2nd decoding means for decoding the encoded signal to obtain the difference value of the shape signal, and outputting the obtained difference value as a decoded shape difference value;

3rd decoding means for decoding the encoded signal to obtain the motion vectors of the pixel value signal and the motion vectors of the shape signal, and outputting the decoded pixel value motion vectors and the decoded shape motion vectors;

1st motion compensation means for compensating the pixel value signal of a reference image described below using the encoded pixel value motion vectors, and outputting the result of the motion compensation as a compensated pixel value signal;

1st addition means for adding the decoded pixel value difference value and the compensated pixel value signal, and outputting the result of the addition as a decoded pixel value signal as well as a pixel value signal of a reference image;

2nd motion compensation means for compensating the shape signal of a reference image described below using the decoded shape motion vectors, and outputting the result of the motion compensation as a compensated shape signal; and 2nd addition means for adding the decoded shape difference value and the compensated shape signal, and outputting the result of the addition as a decoded shape signal as well as a shape signal of a reference image, whereby the encoded signal obtained by the image encoding apparatus of aspect 10 can be appropriately decoded.

An image decoding apparatus according to a 49th aspect of this invention is an image decoding apparatus according to aspect 48 wherein, the 3rd decoding means decodes the motion vector of the pixel value signal and the difference value of the motion vectors to obtain the decoded pixel value motion vectors and the decoded motion vector difference values, and adding the decoded pixel value motion vectors and the decoded motion vector difference values, and making the result of the addition be the encoded shape motion vectors, whereby the encoded signal obtained by the image encoding apparatus of aspect 13 can be appropriately decoded.

A 50th aspect of this invention provides an image decoding apparatus according to aspect 48 wherein, the 3rd decoding means decodes the motion vector of the shape signal and the difference value of the motion vectors to obtain the decoded shape motion vectors and the decoded motion vector difference values, and adding the decoded shape motion vectors and the decoded motion vector difference values, and making the result of the addition be the encoded pixel value motion vectors, whereby the encoded signal obtained by the image encoding apparatus of aspect 14 can be appropriately obtained.

A 51st aspect of this invention provides an image decoding apparatus according to aspect 48 wherein, when the input signal is one which is obtained by encoding the difference value between the immediately previous encoded motion vectors of the shape signal and the motion vectors of the shape signal detected from the input signal, the 3rd decoding means decodes the difference value, and adds the decoded difference value to the immediately previous decoded motion vector of the shape signal to obtain the shape motion vector, whereby the encoded signal obtained by the image encoding apparatus of aspect 17 can be appropriately obtained.

A 52nd aspect of this invention provides an image decoding apparatus according to aspect 48 wherein, when the input signal is one which is obtained by encoding the difference value between the immediately previous encoded motion vector of the pixel value signal and the motion vector of the pixel value signal detected from the input signal, the 3rd decoding means decodes the difference value, and adds the decoded difference value to the immediately previous decoded motion vector of the pixel value signal to output the decoded pixel value motion vector, whereby the encoded signal obtained by the image encoding apparatus of aspect 18 can be appropriately decoded.

A 53rd aspect of this invention provides an image decoding apparatus according to any of aspects 48 to 52 wherein, when the input signal is one consisting of the transparency information indicating the synthesis ratio for synthesizing a plurality of images, and the image information, the decoded shape signal is made the transparency information and the decoded pixel value signal is made the image information, whereby the encoded signal obtained by the image encoding apparatus of aspect 19 can be appropriately decoded.

A 54th aspect of this invention provides an image decoding apparatus according to any of aspects 48 to 52 wherein, when the input signal is an encoded signal created from an image signal which consists of the transparency information indicating the synthesis ratio for synthesizing a plurality of images, and the image information, the transparency information of which is separated into the two-valued signal representing only the shape and the other remaining shape signal, then, the two-valued signal is made the shape signal, and the separated remaining shape signal and image information are made the pixel value signal to be encoded, the decoded shape signal is made the two-valued signal of the transparency information, and the decoded pixel value signal and the image information are made the remaining shape signal of the transparency information, whereby the encoded signal obtained by the image encoding apparatus of aspect 20 can be appropriately decoded.

A 55th aspect of this invention provides an image decoding apparatus which receives encoded signals and decodes the same, comprising:

1st decoding means for decoding the input encoded signal to obtain the mode identifying information indicating each encoding mode of the shape information, the transparency information and the pixel value information;

2nd decoding means for decoding, according to the obtained mode identifying information, the blocked shape information, transparency information and pixel value information; and reverse blocking means for integrating the blocked shape information, transparency information and pixel value information output by the 2nd decoding means to output the decoded image signals, whereby the encoded signal obtained by the image encoding apparatus of aspect 21 can be appropriately decoded.

A 56th aspect of this invention provides an image decoding apparatus according to aspect 55 wherein, the mode identifying information indicates the intra-frame encoding and the inter-frame encoding as encoding modes, whereby the encoded signal obtained by the image encoding apparatus of aspect 24 can be appropriately decoded.

A 57th aspect of this invention provides an image decoding apparatus according to aspect 55 wherein, the mode identifying information indicates the number of motion vectors of each of the blocks as encoding modes, whereby the encoded signal obtained by the image encoding apparatus of aspect 26 can be appropriately decoded.

A 58th aspect of this invention provides an image decoding apparatus wherein, the mode identifying information indicates the changing and non-changing of the quantizing step as encoding modes, whereby the encoded signal obtained by the image encoding apparatus of aspect 28 can be appropriately decoded.

A 59th aspect of this invention provides an image decoding apparatus which receives the two-dimensional image signals consisting of a plurality of pixels as input encoded signals and decoded the same to output, comprising:

2nd change pixel detection means for detecting the pixels changing the pixel values by scanning the-already decoded pixels in the given direction to output the result as the detected 2nd change pixels;

3rd change pixel detection means for detecting the pixels changing the pixel values by scanning the already decoded pixels in the given direction to output the result as the detected 3rd change pixels;

change pixel prediction means for predicting 1st change pixels described below based on the 2nd and 3rd change pixels to output the result as predicted change pixels;

prediction error decoding means for decoding the input encoded signals to obtain the prediction error and outputting the obtained prediction error;

1st change pixel decoding means for adding the predicted change pixel and the prediction error to output the result of the addition as a 1st change pixel; and pixel value decoding means for decoding the pixel values of the particular pixels, assuming that there should be no pixels changing pixel values between the immediately previous decoded change pixel and the 1st change pixel, whereby the encoded signal obtained by the image encoding apparatus of aspect 30 can be appropriately decoded.

A 60th aspect of this invention provides an image decoding apparatus according to aspect 59 wherein, the 2nd change pixel detection means and the 3rd change pixel detection means use those the same as that of the 1st change pixel, as the pixel values of the 2nd change pixel and the 3rd change pixel respectively, whereby the encoded signal obtained by the image encoding apparatus of aspect 31 can be appropriately decoded.

A 61st aspect of this invention provides an image decoding apparatus according to aspect 59 wherein, the 2nd change pixel detection means and the 3rd change pixel detection means use the same given scanning direction as the given scanning direction of the 1st change pixels detection means, whereby the encoded signal obtained by the image encoding apparatus of aspect 32 can be appropriately decoded.

A 62nd aspect of this invention provides an image decoding apparatus according to aspect 59 wherein, 3rd change pixel is decoded by the difference with the change pixel which is predicted using the 2nd change pixel, whereby the encoded signal obtained by the image encoding apparatus of aspect 33 can be decoded.

A 63rd aspect of this invention provides an image decoding apparatus according to aspect 34 wherein, it is assumed that the 2nd change pixel, the 3rd change pixel and the 1st change pixel should be on different scanning lines, whereby the encoded signal obtained by the image encoding apparatus of aspect 34 can be appropriately decoded.

A 64th aspect of this invention provides an image decoding apparatus according to aspect 59 wherein, when the 2nd change pixel is the x-th pixel on the m-th scanning line and the 3rd change pixel is the y-th pixel on the n-th scanning line, the change pixel prediction means predicts that the 1st change pixel should be the $y-(x-y)*(n-k)/(m-n)$-th pixel on the k-th scanning line, whereby the encoded signal obtained by the image encoding apparatus of aspect 35 can be appropriately decoded.

A 65th aspect of this invention provides an image decoding apparatus which receives the two-dimensional image signals consisting of a plurality of pixels as encoded input signals, and decodes the same to output, comprising:

change pixel detection means for detecting the pixels changing the pixel values by scanning the already decoded two-dimensional image signal in the given direction to output the result as the detected change pixels;

change pixel prediction means for predicting change pixels on the particular scanning line based on the detected change pixels and outputting the result as predicted change pixels;

mode decoding means for decoding the input encoded signals and judging whether the input signal is the difference value encoded signal or pixel number encoded signal, and outputting the identifying signal;

prediction error decoding means for decoding the difference value encoded signal and outputting the decoded prediction error when the identifying signal indicates the difference value encoded signal;

1st change pixel decoding means for adding the predicted change pixel and the encoded prediction error, and outputting the result of the addition as a 1st change pixel, when the identifying signal indicates the difference value encoded signal;

2nd change pixel decoding means for decoding the number of pixels which should be positioned from the immediately previous encoded change pixel to the detected change pixel, from the pixel number encoded signal to obtain the position of the change pixel on the basis of the number of the decoded pixels, and outputting the obtained result as the 2nd decoded change pixel, when the identifying signal indicates the difference value signal;

change pixel selection means for selecting the 1st decoded change signal or the 2nd decoding change pixel according to the identifying signal; and change pixel decoding means for decoding the pixel values, assuming that there should be no pixels changing pixel values between the immediately previous decoded change pixel and the 1st change pixel;

whereby the encoded signal obtained by the image encoding apparatus of aspect 36 is appropriately decoded.

A 66th aspect of this invention provides an image decoding apparatus wherein, the change pixel selection means performs the selection according to the pixel number on the particular scanning line, whereby the encoded signal obtained by the image encoding apparatus of aspect 37 is appropriately obtained.

A 67th aspect of this invention provides an image decoding apparatus which receives encoded signals and decodes the same to output two-dimensional shape signals representing the area where there exist the pixels representing an object, comprising:

significant area decoding means for decoding the encoded signals, obtaining rectangular areas where there exist the pixels representing an object and outputting the obtained areas as significant areas;

shape decoding means for judging whether or not each of blocks consisting of a plurality of pixels contains the significant area, and when judging that the block contains the significant area, encoding at least the significant area of the particular block to output the decoded result as decoded block shape signals; and reverse blocking means for integrating the decoded block shape signals to, constitute a two-dimensional shape signal, and outputting the two-dimensional shape signal as a decoded signal, whereby the encoded signal obtained by the image encoding apparatus of aspect 38 can be decoded.

A 68th aspect of this invention provides an image decoding apparatus according to aspect 67 wherein, the shape decoding means extracts the minimum rectangular area containing the significant area from the block for each block and decoding only the inside of the extracted rectangular area, whereby the encoded signal obtained by the image encoding apparatus of aspect 39 can be appropriately obtained.

A 69th aspect of this invention provides an image decoding apparatus which receives encoded signals, and decodes the same to output two-dimensional image signals consisting of a plurality of pixels, comprising:

1st image signal decoding means for decoding the encoded signals to output 1st decoded signals;

image prediction means for predicting and outputting image signals which have not been decoded by the 1st image signal decoding means, based on the image signals decoded by the 1st image signal decoding means;

prediction probability calculation means for calculating the probability that the predicted image signal comes true to output the same;

2nd image signal decoding means for decoding the encoded signals which are input with the degree of priority according to the prediction probability calculated by the prediction probability calculation means; and decoded signal integration means for integrating the outputs of the 1st image signal decoding means and the 2nd image signal decoding means, and replacing the image signal which is not decoded by any of the 1st image signal decoding means and the 2nd image signal decoding means, with the image signal predicted by the image prediction means, and outputting the result as a decoded image signal, whereby the encoded signal obtained by the image encoding apparatus of aspect 40 can be appropriately decoded.

A 70th aspect of this invention provides an image decoding apparatus according to aspect 69 wherein, the 2nd image signal decoding means gives priority of the decoding of the pixel with the small prediction probability, whereby the encoded signal obtained by the image encoding apparatus of aspect 41 can be appropriately decoded.

A 71st aspect of this invention provides an image decoding apparatus according to aspect 69 wherein, the prediction probability calculating means makes the coming-true probability large when the pixel values of the neighbor pixels have the same value, while makes the coming-true probability small when the pixel values of the neighbor pixels have different values, whereby the encoded signal obtained by the image encoding apparatus of aspect 42 can be appropriately decoded.

A 72nd aspect of this invention provides an image encoding method which receives two-valued image signals as input signals and encodes pixels of the input signals changing the pixel values, comprising:

change pixel detection step for detecting the pixels changing the pixel values and outputting the result as the detected change pixels;

1st prediction step for predicting change pixels of the input signals based on the pixels changing the pixel values of already encoded and decoded pixels in the particular frames and outputting the result as 1st predicted pixels;

1st difference value calculation step for calculating the differences between the detected change pixels and the 1st predicted change pixels to output the calculated difference as 1st difference values D;

2nd prediction step for predicting change pixels of the input signals, along with the motion compensation, based on the pixels changing the pixel values of already encoded and decoded pixels in reference frames to output the predicted result as 2nd predicted pixels;

2nd difference value calculation step for calculating the differences between the detected change pixels and the 2nd predicted change pixels to output the calculated difference as 2nd difference values D";

mode selection step for calculating the code lengths of the first difference value D and the second difference value D" when respectively encoded, and selecting the value having the shorter code length by comparing the calculated results, and outputting either of "the first" or "the second" depending on the selection as an encoding mode; and encoding step for encoding the selected first difference value D or the second difference values D", and the encoded mode output by the mode selection mode, whereby an encoded signal which should have the minimum code length can be selected and output by comparing the prediction based on the particular frame and the prediction based on the motion-compensated reference frame to perform encoding, resulting in reduced bit number required for encoding by utilizing the inter-frame pixel correlation.

A 73rd aspect of this invention provides an image encoding method which receives two-dimensional two-valued image signals as input signals and encodes pixels of the input signals changing the pixel values, comprising:

change pixel detection step for detecting the pixels changing the pixel values and outputting the result as the detected change pixels;

1st prediction step for predicting change pixels of the input signals based on the pixels changing the pixel values of already encoded and decoded pixels by horizontally scanning the image signals and outputting the result as 1st predicted pixels;

1st difference value calculation step for calculating the differences between the detected change pixel and the 1st predicted change pixel and outputting the calculated difference as 1st difference values D;

2nd prediction step for predicting change pixels of the input signals based on the pixels changing the pixel values of already encoded and decoded pixels by vertically scanning the image signals and outputting the predicted pixel as 2nd predicted pixels;

2nd difference value calculation step for calculating the differences between the detected change pixel and 2nd predicted change pixel and outputting the calculated difference as 2nd difference value D";

mode selection step for calculating the code lengths of the first difference value D and the second difference value D" when respectively encoded, selecting one having the shorter code length by comparing the calculated results, and outputting either of "the first" or "the second" as an encoding mode according to the selection; and encoding step for encoding the selected first difference value D or the second difference value D", and the encoded mode output by the mode selection mode, whereby a signal which should have the minimum code length can be selected and output by comparing the prediction by horizontal scanning and the prediction by vertical scanning to perform encoding, resulting in reduced bit number required for encoding utilizing local changes in the horizontal and vertical correlations of the image.

A 74th aspect of this invention provides an image encoding method which receives image signals with blocked shapes consisting of shape signals indicating the shapes of objects and whether the pixel value of pixels are significant or not and the pixel value signals as input signals and encodes the input signals referring to reference images, comprising:

1st motion vector detection step for detecting motion vectors of the pixel value signal by comparing the pixel value signal of the input signal and the pixel value signal of the reference image;

1st motion compensation step for motion-compensating the pixel value signal of the reference image using the motion vector of the pixel value signal, and outputting a compensated pixel value signal;

1st difference value calculation step for calculating the difference between the pixel value signal of the input signal and the compensated pixel value signal, and outputting 1st difference values;

1st encoding step for encoding the 1st difference value;

2nd motion vector detection step for detecting motion vectors the shape signal by comparing the shape signal of the input signal and shape signal of the reference image;

2nd motion compensation step for motion-compensating the shape signal of the reference image using the motion vector of the shape signal, and outputting a compensated shape signal;

2nd difference value calculation step for calculating the difference between the shape signal of the input signal and the compensated shape signal, and outputting 2nd difference value;

2nd encoding step for encoding the 2nd difference value; and

3rd encoding step for encoding the motion vector of the pixel value signal and the motion vector of the shape signal, whereby the encoding efficiency is improved and the motion compensation errors are further reduced using more appropriate signals which are obtained from reference images being subjected to encoding and decoding and the motion compensation value being added thereto.

A 75th aspect of this invention provides an image encoding method which receives the image signal which consists of either of the shape information indicating whether or not pixel values of respective pixels of an object are significant, or the transparency information indicating the synthesis ratio for respective pixels of the object, and the pixel value information, as an input image signal, comprising:

blocking step for integrating pixels which spacially and temporally coincide with the input image signal into a group and outputting the group as blocked information;

1st encoding step for selecting an encoding mode from the given set of encoding modes for each piece of shape information formed into blocks by the blocking step, the transparency information and the pixel value information, and encoding each piece of information with each selected encoding mode;

2nd encoding step for encoding all mode-identifying information, each of which indicates the selected mode for each piece of shape information, transparency information, and pixel value information; and the outputs of the 1st and 2nd encoding step being output as encoded outputs, whereby all the high-correlated shape, transparency and pixel value information are collectively encoded, and the variable-length encoding in which codes having the same modes have short code length can be used, resulting in reduced bit number of the encoded mode signal.

A 76th aspect of this invention provides an image encoding method which receives the image signal which consists of either of the shape information indicating whether pixel values of respective pixels of an object are significant or not, or the transparency information indicating the synthesis ratio for respective pixel of the object, and the pixel value information, as an input image signal, comprising:

blocking step for integrating pixels which spacially and temporally coincide with the input image signal into a group and outputting the group as blocked information;

1st encoding step for selecting an encoding mode from the given set of encoding modes for each piece of shape information formed into blocks by the blocking step and the transparency information, and encoding each piece of information with each selected encoding mode;

2nd encoding step for encoding the pixel value information formed into blocks by the blocking step with either of the encoding modes selected by the 1st encoding step;

3rd encoding step for encoding all mode-identifying information, each of which indicates the selected mode for each piece of shape information, the transparency information and the pixel value information; and the outputs of the 1st encoding step, 2nd encoding step and 3rd encoding step being output as the encoded outputs, whereby the selected modes are is likely to become identical each other, and the variable-length encoding makes it possible to reduce the bit number of the encoded mode signal to a further extent.

A 77th aspect of this invention provides an image encoding method which receives the image signal which consists of either of the shape information indicating whether pixel values of respective pixels of an object are significant or not, or the transparency information indicating the synthesis ratio for respective pixels of the object, and the pixel value information, as an input image signal, comprising:

blocking step for integrating pixels which spacially and temporally coincide with the input image signal into a group and outputting the group as blocked information;

1st encoding step for selecting an encoding mode from the given set of encoding modes for the pixel value information formed into blocks by the blocking step, and encoding the pixel value information with the selected encoding mode;

2nd encoding step for encoding the shape information and the transparency information formed into blocks by the blocking step, and the transparency information with the encoding mode selected in the 1st encoding step;

3rd encoding step for encoding all mode-identifying information, each of which indicates the selected mode for each piece of shape information, the transparency information and the pixel value information; and the outputs of the 1st, 2nd and 3rd encoding steps being output as the encoded output, whereby the selected modes become is likely to become identical each other by outputting , and the variable-length encoding makes it possible to reduce the bit number of the encoded mode signal to a further extent.

A 78th aspect of this invention provides an image encoding method which receives two-dimensional image signals consisting of a plurality of pixels as input signals and encodes the same, comprising:

1st change pixel detection step for detecting the pixels changing the pixel values by scanning the two-dimensional image signal in the given direction and outputting the detected 1st change pixels;

2nd change pixel detection step for detecting the pixels changing the pixel values by scanning the already encoded and decoded pixels in the given direction and outputting the detected 2nd change pixels;

3rd change pixel detection step for detecting the pixels changing the pixel values by scanning the already encoded and decoded pixels in the given direction and outputting the detected 3rd change pixels;

change pixel prediction step for predicting the 1st change pixels based on the 2nd change pixels and the 3rd change pixels and outputting the predicted change pixels;

prediction error calculation step for calculating the differences between the 1st change pixels and the predicted change pixels, and outputting the calculated difference values of change pixels; and prediction error encoding step for encoding the difference values of change pixels to be encoded signals, whereby the error in prediction is encoded, resulting in enhancement in the encoding efficiency.

A 79th aspect of this invention provides an image encoding method which receives two-dimensional image signals consisting of a plurality of pixels as input signals and encodes the same, comprising:

change pixel detection step for detecting the pixels changing the pixel values by scanning the two-dimensional image signal in the given direction and outputting the detected change pixels;

change pixel prediction step for predicting change pixels based on encoded and decoded pixels and outputting the predicted change pixels;

prediction error calculation step for calculating the differences between the detected change pixels and predicted change pixels, and outputting the calculated difference values of change pixels;

prediction error encoding step for encoding the difference value of change pixels and outputting the difference value encoded signal, when the difference value of change pixels is less than the given value;

pixel number encoding step for calculating the number of the pixels which are positioned between the immediately previous encoded pixel and the above-described detected change pixel and are not positioned at the pixel position where the prediction error encoding step can encode, and encoding the calculated pixel number to output an pixel number encoded signal, when the difference value of change pixel is less than the given value; and the prediction error encoding step and the pixel number encoding step performing encodings in which the difference value encoded signal and the pixel number encoded signal are uniquely identifiable thereby to output the prediction error encoded signal when the prediction error is within the given range, and to output the pixel number encoded signal when the prediction error is beyond the given range as the output encoded signal;

whereby when the prediction error is large, the appropriate encoding is carried out, averting the reduction in the encoding efficiency even when the prediction error is so large that the variations of the number of the change pixels unables the prediction of the change pixel.

An 80th aspect of this invention provides an image encoding method which receives two-dimensional shape signals indicating the area where pixels representing an object exist and encodes the shape signals, comprising:

significant area extracting step for extracting the significant area which contains the pixels representing an object from the input shape signal and outputting a significant area range representing the range covering the extracted significant area;

blocking step for dividing the shape signal into blocks having a plurality of pixels;

shape encoding step for judging whether each of the respective blocks output by the blocking step contains the significant area, and encoding the significant area of the block at least when it is judged that the block contains the significant area; and the significant area range and the shape encoded signal being made as encoded signals;

whereby the range of the significant area is detected and the block size of the shape signal is changed so that the shape signal only in the inside of the significant area is encoded, resulting in no encoding being performed beyond the range of the significant area, and improved encoding efficiency for the shape signal.

An 81st aspect of this invention provides an image encoding method which receives two-dimensional image signals consisting of a plurality of pixels as input signals and encodes the same, comprising:

image signal separation step for separating the image signal into at least 2 image signals, and outputting the separated image signals as 2 or more partial image signals;

1st image signal encoding step for selecting at least one of the partial image signals as a target partial image signal and encoding the selected target partial image signal to output a 1st encoded signal;

prediction probability calculating step for predicting the non-target partial image signal which is the partial image signal except the target partial image signal on the basis of the image signal decoded from the 1st encoded signal, and calculating the probability that the prediction comes true, and outputting the calculated prediction probability; and 2nd image signal encoding step for determining the degree of priority of decoding based on the prediction probability calculated by the prediction probability calculation step, and encoding the non-target partial image signal using the encoding method according to the determined degree of priority, whereby the pixels of smaller prediction probability are encoded with priority, resulting in that the hierarchical encoding having less picture-quality degradation can be performed without any additional information.

An 82nd aspect of this invention provides an image decoding method which receives encoded signals and decodes the same, comprising:

decoding step for decoding the encoded signal to obtain the encoded mode and the difference value, and outputting the obtained encoding mode as a mode signal and the obtained difference value as a decoded difference value;

1st prediction step for predicting the change pixel of the input signal based on the pixel changing the value among the already encoded and decoded pixels in the particular frame, and outputting the predicted pixels as 1st-predicted pixels;

2nd prediction step for predicting the change pixel of the input signal, with the motion compensation, based on the pixel changing the value among the already encoded and decoded pixels in the reference frame, and outputting the predicted pixels as 1st predicted pixels;

addition step for adding the decoded difference value to the 1st predicted pixel when the mode signal indicates the frame prediction, and adding the decoded difference value to the 2nd predicted pixel when the mode signal indicates the reference frame prediction; and the output of the addition step being made the change pixel;

whereby the encoded signal obtained by the image encoding apparatus of aspect 72 can be appropriately decoded.

An 83rd aspect of this invention provides an image decoding method which receives encoded signals and decodes the same, comprising:

decoding step for decoding the encoded signal to obtain the encoded mode and the difference value, and outputting the obtained encoding mode as a mode signal and the obtained difference value as a decoded difference value;

1st prediction step for predicting the change pixel of the input signal, based on the pixel changing the pixel value among the already encoded and decoded pixels, by horizontally scanning the image signal, and outputting the predicted pixels as 1st predicted pixels;

2nd prediction step for predicting the change pixel of the input signal, with the motion compensation, based on the pixel changing the pixel value among the already encoded and decoded pixels, by horizontally scanning the image signal, and outputting the predicted pixels as 2nd predicted pixels;

addition step for adding the decoded difference value to the 1st predicted pixel when the mode signal indicates the prediction by the horizontal scanning, and adding the decoded difference value to the 2nd predicted pixel when the mode signal indicates the prediction by the vertical scanning; and the output of the addition step being made the change pixel;

whereby the encoded signal obtained by the image encoding apparatus of aspect 73 can be appropriately decoded.

An 84th aspect of this invention provides an image decoding method which receives encoded signals and decodes the same, comprising:

1st decoding step for decoding the encoded signal to obtain the difference value of the pixel value signal, and outputting the decoded pixel value difference value;

2nd decoding step for decoding the encoded signal to obtain the difference value of the shape signal, and outputting the decoded shape difference value;

3rd decoding step for decoding the encoded signal to obtain the motion vectors of the pixel value signal and the motion vectors of the shape signal, and outputting the decoded pixel value motion vectors and the decoded shape motion vectors;

1st motion compensation step for compensating the pixel value signal of a reference image described below using the decoded pixel value motion vectors, and outputting the result of the motion compensation as a compensated pixel value signal;

1st addition step for adding the decoded pixel value difference value and the compensated pixel value signal, and outputting the result of addition as a decoded pixel value signal as well as a pixel value signal of a reference image;

2nd motion compensation step for compensating the shape signal of a reference image described below using the decoded shape motion vectors, and outputting the result of the motion compensation as a compensated shape signal; and 2nd addition step for adding the decoded shape difference value to the compensated shape signal, and outputting the result of the addition as a decoded shape signal as well as a shape signal of a reference image;

whereby the encoded signal obtained by the image encoding apparatus of aspect 74 can be appropriately decoded.

An 85th aspect of this invention provides an image decoding method which receives encoded signals and decodes the same, comprising:

1st decoding step for decoding the input encoded signal to obtain the mode identifying information indicating each encoding mode of the shape information, transparency information and pixel value information;

2nd decoding step for decoding, according to the obtained mode identifying information, the blocked shape information, transparency information and pixel value information; and reverse blocking step for integrating the blocked shape information, transparency information and pixel value information output by the 2nd decoding step and outputting the decoded image signal, whereby the encoded signal obtained by the image encoding apparatus of aspect 76 can be appropriately decoded.

An 86th aspect of this invention provides an image decoding method which receives encoded signals as input signals and decodes the two-dimensional image signals consisting of a plurality of pixels, comprising:

2nd change pixel detection step for detecting the pixels changing the pixel values by scanning the already decoded pixels in the given direction and outputting the detected 2nd change pixels;

3rd change pixel detection step for detecting the pixels changing the pixel values by scanning the already decoded pixels in the given direction and outputting the detected 3rd change pixels;

change pixel prediction step for predicting 1st change pixels described below based on the 2nd change pixels and the 3rd change pixels and outputting the predicted change pixels;

prediction error decoding step for decoding the input encoded signals to obtain the prediction error and outputting the obtained prediction error;

1st change pixel decoding step for adding the predicted change pixel and prediction error, and outputting the 1st change pixel; and pixel value decoding step for decoding the pixel values, assuming that there should be no pixels changing pixel values between the immediately previous decoded change pixel and 1st change pixel, whereby the encoded signal obtained by the image encoding apparatus of aspect 79 can be appropriately decoded.

An 87th aspect of this invention provides an image decoding method which receives the encoded two-dimensional image signals consisting of a plurality of pixels as input signals, and encodes and outputs the image signals, comprising:

change pixel detection step for detecting the pixels changing the pixel values by scanning the already decoded two-dimensional image signal in the given direction and outputting the detected change pixels;

change pixel prediction step for predicting change pixels on the particular scanning line based on the detected change pixels and outputting the result as predicted change pixels;

mode decoding step for decoding the input encoded signals and judging whether the input signal is the difference value encoded signal or pixel number encoded signal, and outputting the identifying signal;

prediction error decoding step for decoding the difference value encoded signal and outputting the decoded prediction error when the identifying signal indicates the encoded difference value signal;

1st change pixel decoding step for adding the predicted change pixel and the decoded prediction error and outputting the result of the addition as a 1st decoded change pixel, when the identifying signal indicates the encoded difference value signal;

2nd change pixel decoding step for decoding the number of pixels which are not positioned at the pixel positions of the decoded prediction error between the immediately previous decoded change pixel and the detected 1st change pixel from the encoded pixel number signal, and obtaining the positions of change pixels based on the number of the decoded pixels, and outputting the obtained result as 2nd decoded change pixels, when the identifying signal indicates the encoded pixel number value signal;

change pixel selection step for selecting the 1st decoded change pixel or the 2nd decoded change pixel according to the identifying signal to output the same; and change pixel decoding step for decoding the pixel values, assuming that there should be no pixels changing pixel values between the immediately previous decoded change pixel and the 1st change pixel, whereby the encoded signal obtained by the image encoding apparatus of aspect 80 can be appropriately decoded.

An 88th aspect of this invention provides an image decoding method which receives encoded signals and decodes the same to output two-dimensional shape signals representing the area where there exist pixels representing an object, comprising:

significant area decoding step for decoding the encoded signals, obtaining rectangular areas where there exist the pixels representing an object, and outputting the obtained areas as significant areas;

shape decoding step for judging whether each of blocks having a plurality of pixels contains the significant area or not, and when it is judged that the block contains the significant area, encoding at least the significant area of the block, and outputting the decoded result as decoded block shape signals; and reverse blocking step for integrating the decoded block shape signals to constitute a two-dimensional shape signal, and outputting the constituted two-dimensional shape signal, whereby the encoded signal obtained by the image encoding apparatus of aspect 81 can be appropriately decoded.

An 89th aspect of this invention provides an image decoding method which receives encoded signals and decodes two-dimensional image signals consisting of a plurality of pixels to output the same, comprising:

1st image signal decoding step for decoding the encoded signals and outputting 1st decoded signals;

image prediction step for predicting and outputting image signals which have not decoded by the 1st image signal decoding step, based on the image signals decoded by the 1st image signal decoding step;

prediction probability calculation step for calculating and outputting the probability that the predicted image signal comes true;

2nd image signal decoding step for decoding the encoded signals which are input with the degree of priority according to the prediction probability calculated by the prediction probability calculation step; and decoded signal integration step for integrating the outputs of the 1st image signal decoding step and the 2nd image signal decoding step, and replacing the image signal which is neither decoded by the 1st image signal decoding step nor by the 2nd image signal decoding step, with the image signal predicted by the image prediction step, and outputting the decoded image signal, whereby the encoded signal obtained by the image encoding apparatus of aspect 82 can be appropriately decoded.

90th to 99th aspects of this invention provides image encoding program media wherein, programs implementing image encoding methods of the 72nd to 81st aspects are recorded, whereby image encodings of high encoding efficient are performed on computers which are equipped with these media.

100th to 107th aspects of this invention provides image decoding program media wherein, programs implementing image decoding methods of the 82nd to 189th aspects are recorded, whereby decoding of the encoded signals obtained by the image encoding methods of the 72nd to 81st aspects can be appropriately performed on computers which are equipped with these media.

BRIEF DESCRIPTION OF DRAWINGS

FIGS. 2(a)–2(c) are drawings which explain the operation principles of an image encoding apparatus according to a 1st embodiment of this invention.

FIGS. 4(a)–4(e) are drawings which explain the operation principles of encoding apparatus according to a 2nd embodiment of this invention. an image encoding apparatus according to a 2nd embodiment of this invention.

FIGS. 53(*a*)–53(*d*) are drawings which explain the shape information of an image in an image encoding.

BEST EMBODIMENTS OF INVENTION

Embodiment 1

An image encoding apparatus according to a 1st embodiment of this invention performs efficient encoding in prediction encoding by selecting difference values having short code lengths within the given range.

Figure 1:
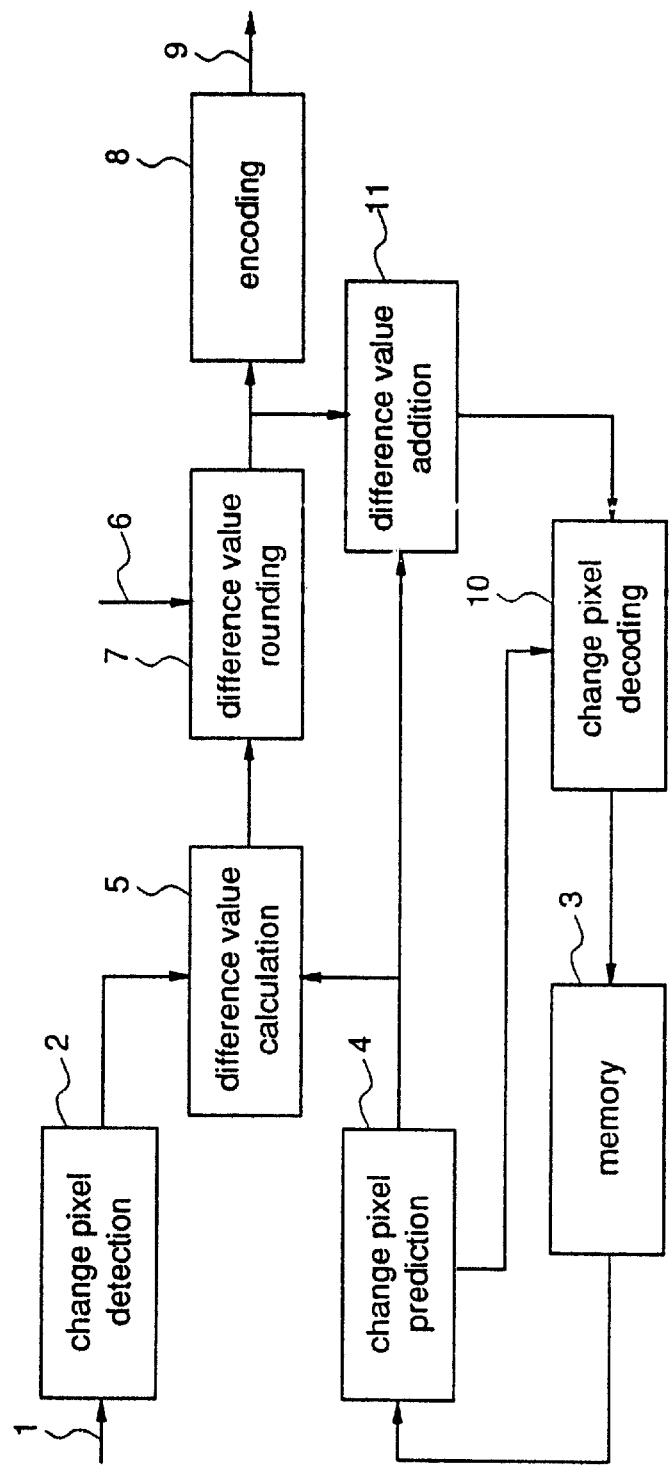
FIG. 1 is a block diagram showing the structure of an image encoding apparatus according to a 1st embodiment of this invention.

FIG. 1 is a block diagram showing the structure of the image encoding apparatus according to the 1st embodiment of this invention. In the figure, 1 indicates an input signal, which is input to the image encoding apparatus as a two-valued image signal. 2 indicates a change pixel detector which detects pixels changing pixel values in the input signal 1 and outputs the detected change pixels. 3 indicates a memory which temporarily stores already encoded and decoded image signals which are to be used as reference images. 4 indicates a change pixel predictor which predicts change pixels output by the change pixel detector 2 based on pixels changing pixel values of the reference image, and outputs predicted change pixels. As a prediction method used by the change pixel predictor 4, for example, there can be used the most typical method that predicts that a change pixel should be on a horizontal position the same as that on the upper-positioned scanning line, based on the strong vertical correlation of the two-dimensional image signal, and so on. 5 indicates a difference value calculator which calculates the difference value D between the change pixel detected by the change pixel detector 2 and the predictor 4. 6 indicates a value e which is a given value as the tolerance value of a rounding error and is input to a difference value rounder. 7 indicates the difference value rounder which modifies the difference value D within the range defined by the tolerance value e, and outputs a modified difference value D'. 8 indicates an encoder which encodes the difference value. 9 indicates the encoded signal which is output by the encoder 8. 11 indicates difference value adder which adds the modified difference value D' and the predicted change pixel output by the change pixel predictor 4. 10 indicates a change pixel decoder which decodes the two-valued pixel using the result of the addition output by the difference value adder 11.

The operation of the image encoding apparatus according to the 1st embodiment as constructed above is described. The input signal 1, i.e. a two-valued signal, is input to the apparatus. The change pixel detector 2 receives the input signal 1 and detects pixels changing the two-valued pixel values. On the other hand, the change pixel predictor 4 reads out the reference image stored in the memory 3 and predicts change pixels in the input signal. The change pixel detector 2 outputs the detected result as detected change pixels to the difference value calculator 5. The change pixel predictor 4 outputs the predicted result as predicted change pixels to the difference value calculator 5. Thereafter, the difference value calculator 5 subtracts the predicted change pixel from the detected change pixel to obtain the difference value D corresponding to the prediction error of the change pixel. The difference value calculator 5 outputs the difference value D to the difference value rounder 7.

The difference value rounder 7 compares the given tolerance value e with the difference value D corresponding to the prediction error output by the difference value calculator 5, and outputs a value x which satisfies $D-e \leq x \leq D+e$ and the bit number of which should be minimum when x is encoded, as the modified difference value D', when the difference value D does not exceed the tolerance value e. As opposed to this, when the difference value D is beyond the tolerance value e, the difference value rounder 7 obtains the modified difference value D' based on the tolerance value e to be output to the encoder 8. Thereafter, the modified difference value D' is encoded by the encoder 8 to become the encoded signal 9.

Also, the modified difference value D' output by the difference value rounder 7 is output to the difference value adder 11. In the difference value adder 11, the modified difference value D' is added to the predicted change pixel output by the change pixel predictor 4 and thereby the pixel value of the change pixel is calculated and is output to the change pixel decoder 10. The change pixel decoder 10 decodes the pixel value of each pixel from the already decoded pixel output by the change pixel predictor 4 to the change pixel input by the difference value adder 1, and stores the decoded result in the memory 3. Subsequently, the stored content in the memory 3 is used as the reference image.

The above-described operation is concretely explained referring to FIG. 2. FIG. 2 shows a model of a two-valued image signal, indicating white and black(fine slant lines) as pixels. For the simplicity of description, the processing procedure is explained, assuming that the processing is carried out pixel by pixel.

FIG. 2(*a*) shows the input signal. The scanning goes from top left in the right direction. The process proceeds toward the bottom right. The change pixel is a pixel which changes the pixel value (white→black or black→white) on a line (the scanning line). Pc in FIG. 2(*b*) indicates an already encoded final pixel. Pu indicates the change pixel of the upper-positioned scanning line. Parts having rough slant lines indicate pixels not encoded yet. The change pixel detector 2 checks change pixels changing pixel values in part not encoded yet shown FIG. 2(*b*) of the input signal shown in FIG. 2(*a*), and detects a change pixel P1 and outputs the result as a detected change pixel.

On the other hand, the change pixel predictor 4 predicts the change pixel by the above-described method, obtains pixel P0 by assuming that the change pixel should exist on the same horizontal position as that of the change pixel Pu of the upper-positioned scanning line, and outputs the result as a predicted change pixel to the difference value calculator 5. The difference value calculator 5 outputs D=1 as the difference value between the detected change pixel P1 and the predicted change pixel P0 to the difference value rounder 7.

In this case, for the image encoding apparatus according to the 1st embodiment, it is assumed that such an encoding would be performed so that the difference value different from P0 by the smaller value is assigned the code having the shorter code length. And the tolerance value of the round error would be given 1. Because the difference between P1 and P0 calculated by the difference value calculator is equal to or smaller than e, the difference value rounder 7 outputs D"=0 as the value satisfying the above-described condition. As a result, the change pixel is rounded and is subjected to the encoding process, whereby the encoded and decoded pixel value becomes what is shown in FIG. 2(c).

As opposed to this, when the input signal is what is shown in FIG. 2(d), as shown in FIG. 2(e), the difference value indicated by the difference between the predicted change pixel P0 and the detected change pixel P1 becomes 2 so that in this case the difference value D exceeds the tolerance value e. Therefore, the difference value rounder 7 modifies the prediction error(the difference value), based on the tolerance value e, not exceeding the tolerable range, and outputs the difference value−1 corresponding to the change pixel P2. As a result, the encoded and decoded pixel value becomes what is shown in FIG. 2(f).

As described above, the image encoding apparatus according to the 1st embodiment has the difference value rounder 7, and selects the modified difference value which is to have the maximum code length of the error (difference value) in the range of the prediction error equal to or smaller than the tolerance value, using the difference value between the detected change pixel and the predicted change pixel and the given tolerance value 6, and outputs the modified difference value. As a result, though there exists a little degradation of picture quality, the required bit number is reduced to a large extent. In addition, the encoded signal 9 obtained in the image encoding apparatus according to the 1st embodiment can be decoded by an ordinary image decoding apparatus.

Embodiment 2

An image encoding apparatus according to a 2nd embodiment of this invention performs processes, adaptively switching an encoding based on prediction from a particular frame and an encoding based on prediction from a reference frame with motion compensation.

Figure 3:
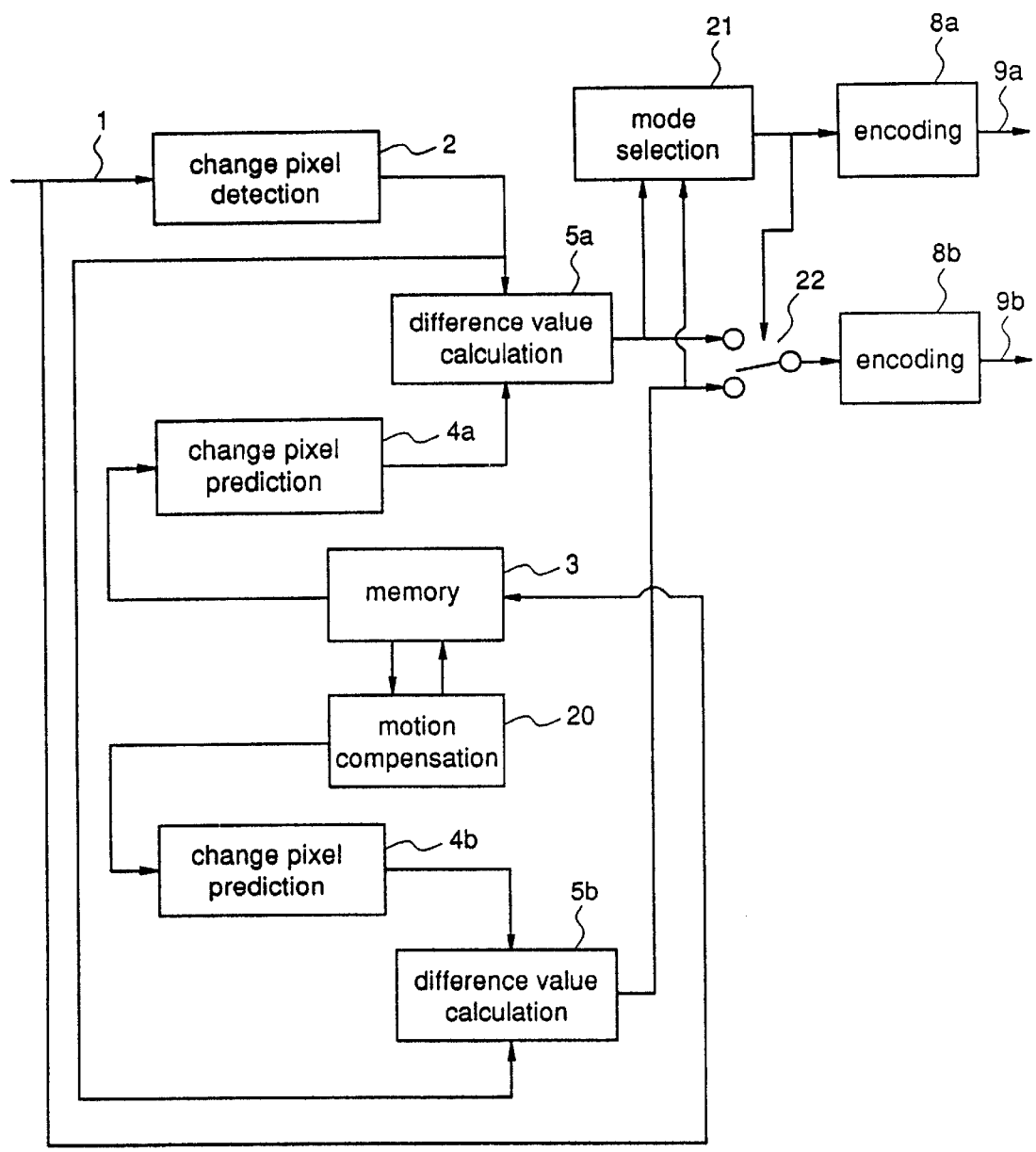
FIG. 3 is a block diagram showing the structure of an image

FIG. 3 is a block diagram showing the structure of the image encoding apparatus according to the 2nd embodiment. In the figure, 20 indicates a motion compensation unit which generates reference pixel values for the already encoded and decoded image signal of a reference frame by performing motion compensation. 21 indicates a mode selector which compares the difference value when prediction is carried out based on the image signal of the particular frame, with the difference value when prediction is carried out based on the image signal of the reference frame, and then selects one of the two values which has the smaller bit number required for encoding. 22 indicates a switching unit which selects the difference value corresponding to the encoding mode selected by the mode selector 21. 1 to 9 indicate the same as those of FIG. 1 and the description is also the same and omitted here.

A description is given of the image encoding apparatus according to the 2nd embodiment having the above-described structure. When an input signal 1 which is a two-valued image signal is input to the apparatus, the input signal 1 is input to the change pixel detector 2 and then input to the memory 3 and stored in the memory 3. The stored input signal is used as an already encoded and decoded reference image. The change pixel detector 2 receives the input signal 1 and detects the pixel which changes the two-valued pixel value. The change pixel detector 2 outputs the detected result as a detected change pixel to the difference value calculators 5a and 5b. On the other hand, the change pixel predictor 4a reads out the already encoded and decoded reference image of the particular frame stored in the memory 3, and predicts a change pixel based on. the particular input signal to be output as a predicted change pixel to the difference value calculator 5a. Following this, the difference value calculator 5a subtracts the predicted change pixel from the detected change pixel to obtain a difference value D. The difference value D which is the output of the difference value calculator 5a corresponds to the prediction error of the predicted change pixel based on the already encoded and decoded pixel of the particular frame. The difference value calculator 5a outputs the difference value D to the mode selector 21 and the switching unit 22.

The motion compensation unit 20 subjects the already encoded and decoded image of the reference frame stored in the memory 3 to the motion compensation. The change pixel predictor 4b predicts the change pixel of the particular input signal based on the motion-compensated pixel to be output as a predicted change pixel to the difference value calculator 5b. The difference value calculator 5b subtracts the predicted change pixel from the detected change pixel and obtains a difference value D". The difference value D" which is the output of the difference value calculator 5b corresponds to the prediction error of the predicted change pixel based on the already encoded and decoded pixel of the particular frame. The difference value calculator 5b outputs the difference value D to the mode selector 21 and the switching unit 22.

The mode selector 21 compares the code lengths (the required bit number for encoding) of the difference value D and the difference value D" input from the difference value calculators 5a and 5b when respectively encoded, and selects the prediction method which needs a smaller bit number for encoding, and outputs the identifying signal as an encoding mode. The mode selector 21 outputs the encoding mode "particular frame" if the code length is short when the difference value D is encoded, or outputs the encoding mode "reference frame" if the code length is short when the difference value D" is encoded, to the switching unit 22 and the encoder 8a.

The switching unit 22, responding to the output of the mode selector 21, outputs the difference value D output by the difference value calculator 5a if the encoding mode is "particular frame", or outputs the difference value D" output by the difference value calculator 5b if the encoding mode is "reference frame". The encoder 8a encodes the encoding mode selected by the mode selector 21 and outputs an encoded signal 9a. The encoder 8b encodes the output difference value and outputs an encoded signal 9b.

The image encoding apparatus according to the 2nd embodiment performs encoding without any rounding error and stores the input image signal 1 as the encoded and decoded pixel values up to the change pixel as described above, in the memory 3.

The above-described operation is concretely explained, referring to FIG. 4. FIG. 4 shows a model of a two-valued image signal, indicating white and black pixels as pixels, similarly to FIG. 2 used for explaining the 1st embodiment. For the simplicity of description, the processing procedure is explained, assuming that the processing is carried out pixel by pixel.

In the figure, FIG. 4(a) shows the input signal, FIG. 4(b) shows the image signal of the reference frame and FIG. 4(c) is a drawing for explaining the prediction based on the particular frame. P1 indicates the change pixel detected by the change pixel detector 2 similarly to the 1st embodiment. Pc indicates an already encoded final pixel. Pu indicates the change pixel of the upper-positioned scanning line. Parts having rough slant lines indicate pixels which are not encoded yet. The change pixel predictor 4a, using the similar way of prediction of change pixels in the 1st embodiment, makes a prediction based on the change pixel Pu on the upper-positioned scanning line by utilizing the correlation and makes P0 which is positioned on the same horizontal position as that of Pu the predicted change pixel based on the particular frame.

FIG. 4(b) shows the reference frame after the performance of the motion compensation unit 20. The change pixel predictor 4b obtains the predicted change pixel Pr. Accordingly, the difference value D in the difference value calculator 5a becomes 1, the difference P1 and P0. The difference value D" in the difference value calculator 5b becomes 0, the difference P1 and Pr. In the image encoding apparatus according to the 2nd embodiment as well as that of the 1st embodiment, if the encoding is such that a code having a shorter code length is assigned to a difference value as the difference from P0 is smaller, the code for the difference P1 and P0 has a shorter code length than that for the difference Pr and P1. Accordingly, the mode selector 21 selects "reference frame" which outputs the difference D", so that the encoding mode "reference frame" and the difference value D" are encoded and become the encoded signal output by the image encoding apparatus according to the 2nd embodiment. FIG. 4(e) shows the result which is obtained by decoding the encoded signal.

As described above, the image encoding apparatus according to the 2nd embodiment, by the memory 3, the change pixel predictors 4a and 4b, the difference value calculators 5a and 5b and the motion compensation unit 20, makes the prediction based on the particular frame, and the prediction based on the reference frame, and obtains the difference value between each predicted value and the detected result; and by the mode selector 21, switching unit 22 and encoders 8a and 8b, compares the difference values from the prediction based on the particular frame and from the prediction based on the reference frame, and selects the difference value which has the minimum code length, and encodes the difference value, where, by utilizing the correlation between frames, the bit number required for encoding is reduced to a large extent.

Note that the image encoding apparatus according to the 2nd embodiment receives the input signal 1 block by block and the encoding mode is selected for respective blocks, that is, the encoding based on the prediction with the particular frame and the encoding based on the prediction with the reference frame using the motion compensation are, block by block, switched, whereby obtaining the above-described result.

Also, in the image encoding apparatus according to the 2nd embodiment, the change pixel detector 2, and the change pixel predictors 4a and 4b output the distance (pixel number) to the change pixel. However, it is also possible to output a two-valued signal, for example, '0' or '1' representing "the next pixel is a change pixel" or "the next pixel is not a change pixel", respectively, and the difference calculators 5a and 5b calculate the two-valued signal. However, in this case, it is not that the distance is encoded as described above, but that the outputs of the difference calculators 5a and 5b are encoded for the respective pixels of the input signal 1. As described above, the outputs of the change pixel detector 2 and the change pixel predictors 4a and 4b have two values, which results in a simplification of the encoding process.

Embodiment 3

An image decoding apparatus according to a 3rd embodiment of this invention which performs appropriate decoding for encoded signals encoded by the image encoding apparatus according to the 2nd embodiment.

Figure 5:
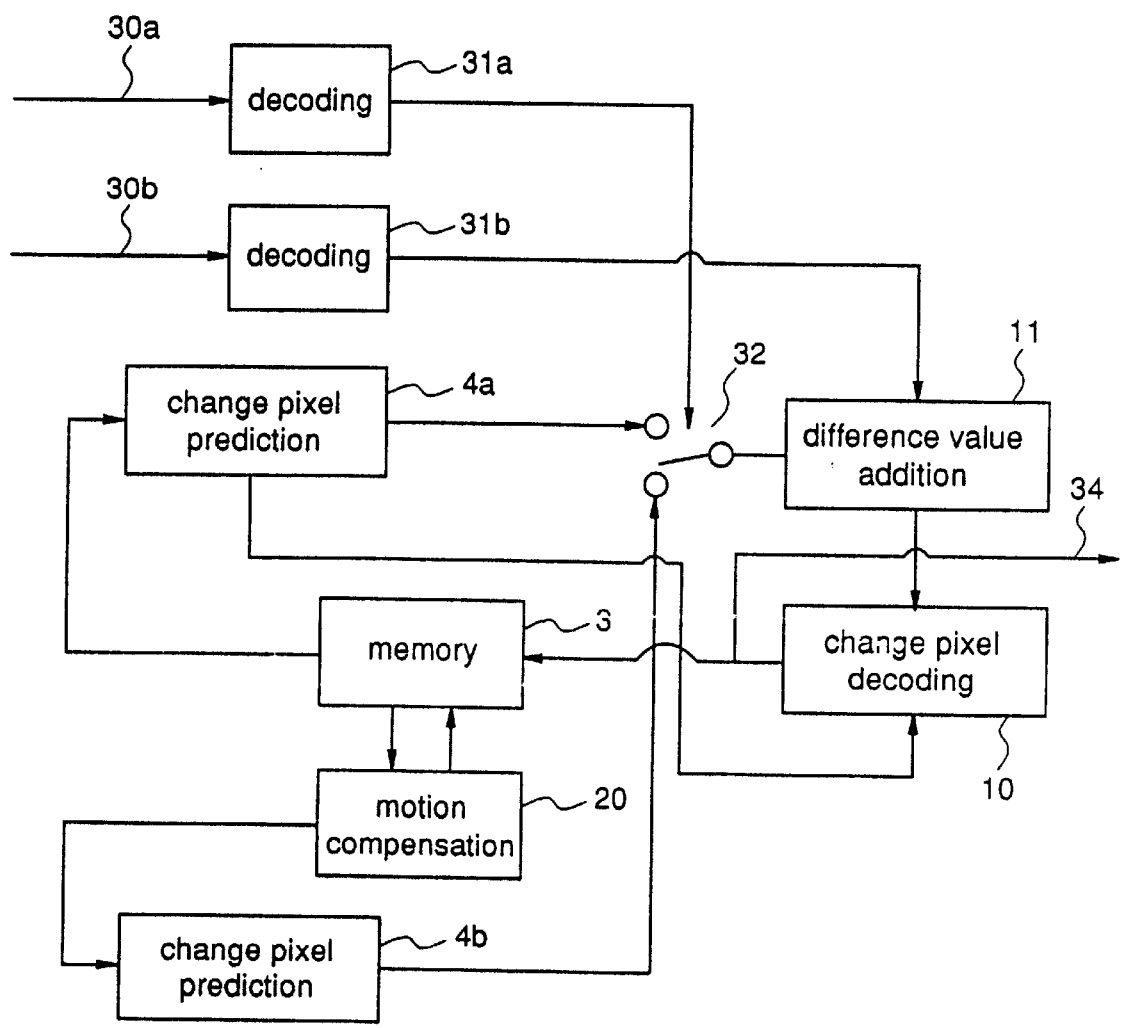
FIG. 5 is a block diagram showing the structure of an image decoding apparatus according to a 3rd embodiment of this invention.

FIG. 5 is a block diagram showing the structure of the image decoding apparatus according to the 3rd embodiment. In the figure, 30a and 30b correspond to the encoded signals 9a and 9b of FIG. 3, respectively. 30a indicates a signal into which the encoding mode is encoded, and 30b indicates a signal into which the difference value is encoded. 31a indicates a decoder which decodes the signal into which the encoding mode is encoded and obtains a predicted mode signal. 31b indicates a decoder which decodes the signal into which the difference value is encoded and obtains a decoded difference value signal. 32 indicates a switching unit which switches the predicted values of change pixels in response to the predicted mode signal obtained by the decoder 31a. 34 indicates a decoded image signal. The apparatus has the same memory 3, the change pixel decoder 10, and the difference value adder 11 as those in FIG. 1 and the same motion compensation unit 20 as that in FIG. 3. Their descriptions is the same as those in the 1st and 2nd embodiments, and is therefore omitted here.

A description is given of the image decoding apparatus according to the 3rd embodiment shown in FIG. 5 as constructed above. The image decoding apparatus according to the 3rd embodiment receives the input signal 30a which is the signal 9a into which the selected encoded mode has been encoded in the image encoding apparatus according to the 2nd embodiment, and the input signal 30a is decoded in the decoder 31a, and the predicted mode signal indicating "particular frame" or "reference frame" is obtained. The decoder 31a outputs the predicted mode into the switching unit 32.

Also, the image decoding apparatus according to the 3rd embodiment receives the input signal 30b which is the signal 9b into which the selected difference value has been encoded in the image encoding apparatus according to the 2nd embodiment, and the input signal 30b is decoded in the decoder 31b, and the decoded difference value is obtained. The decoder 31b outputs the decoded difference value into the difference value addition means 11.

On the other hand, the change pixel predictor 4a reads out an already decoded reference image of the particular frame stored in the memory 3, and predicts a change pixel based on the particular image signal, and outputs the result as a predicted change pixel based on the particular frame into the switching unit 32.

Also, the motion compensation unit 20 subjects an already decoded image of a reference frame stored in the memory 3 to the motion compensation. The change pixel predictor 4b predicts the change pixel of the particular input signal based the motion-compensated pixel, and outputs the result as a predicted change pixel based on the reference frame into the switching unit 32.

The switching unit 32 into which the change pixel predictors 4a and 4b output the predicted pixels, performs switching according to the input predicted mode signal. Accordingly, the switching unit 22 selects the predicted change pixel based on the particular frame output by the change pixel predictor 4a if the input predicted mode signal indicates "particular frame", or selects the predicted change pixel based on the reference frame output by the change pixel predictor 4b if the input predicted mode signal indicates "reference frame", and outputs the predicted change pixel to the difference value addition means 11.

The difference value addition means 11 calculates a change pixel by adding the predicted change pixel obtained by the switching unit 22 with the decoded difference value obtained from the decoder 31b, and outputs the result to the change pixel decoder 10. The change pixel decoder 10, based on the predicted change pixel of the change pixel prediction means 4a and the change pixel obtained by the difference value addition means 11, encodes the pixel value therebetween. The result of this decoding is stored in the memory 3, and is output as a decoded image signal 34 from the image decoding apparatus according to the 3rd embodiment. For example, when the input signal is an encoded signal in such a way as what is described using FIG. 4 in the 2nd embodiment, the result of decoding shown in FIG. 4(*e*) is obtained.

Figure 6:
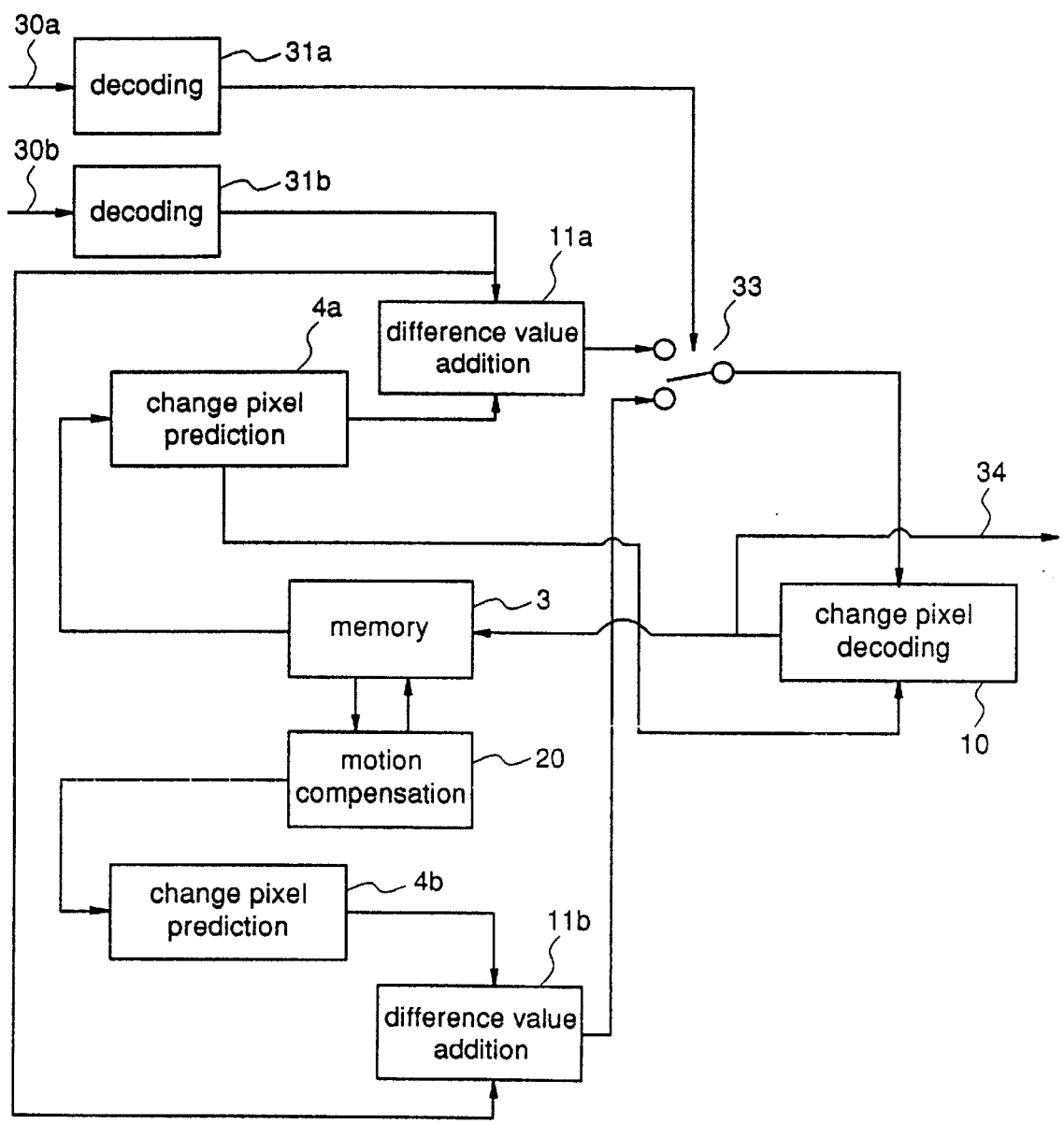
FIG. 6 is a block diagram showing the structure of another image decoding apparatus according to a 3rd embodiment of this invention.

FIG. 6 is a block diagram showing the structure of an application of the image decoding apparatus according to the 3rd embodiment. The difference from the image decoding apparatus shown in FIG. 5 is that there are two difference value addition means 11*a* and 11*b*, and the switching unit 33 switches not the outputs of the change pixel prediction means 4*a* and 4*b*, but the outputs of the difference value addition means 11*a* and 11*b*. In this case, the encoded signal output by the image encoding apparatus according to the 2nd embodiment can be appropriately decoded, corresponding to the encoding mode used in the encoding. Further, when the apparatus has a plurality of the change pixel decoders 10 and the switching unit is positioned to receive the outputs of a plurality of the change pixel decoders 10, the same effect is obtained.

As described above, the image decoding apparatus according to the 3rd embodiment has the decoder 31*a* which decodes the encoding mode of the encoded signal, the decoder 31*b* which decodes the encoded signal of the difference value, the change pixel prediction means 4*a* which predicts the change pixel based on the particular frame, the change pixel prediction means 4*b* which predicts the change pixel based on the reference frame using the motion compensation, the difference value addition means 11 which performs decoding based on the predicted change pixel, and the change pixel decoder 10, whereby the switching unit performs switching according to the predicted mode obtained by the decoder 31*a*, namely the switching unit adaptively switches the decoding based on the particular frame and the decoding based on the reference frame, according to the predicted mode corresponding to the encoding mode which has been used in encoding. Therefore, the encoded signal efficiently encoded in the 2nd embodiment can be appropriately decoded.

Note that in the 2nd and 3rd embodiments there can be prepared a plurality of reference frames and three or more predicted modes can be used.

Also, in the 3rd embodiment, when the encoded signal is such a signal that is, block by block, encoded with the respective selected encoding modes, the apparatus receives input signals block by block, and obtains the respective predicted modes, and performs processes block by block according to each encoding mode, whereby the encoded signal can be appropriately decoded.

Embodiment 4

An image encoding apparatus according to a 4th embodiment of this invention which adaptively switches the encoding based on the prediction by the horizontal scanning and the encoding based on the prediction by the vertical scanning.

Figure 7:
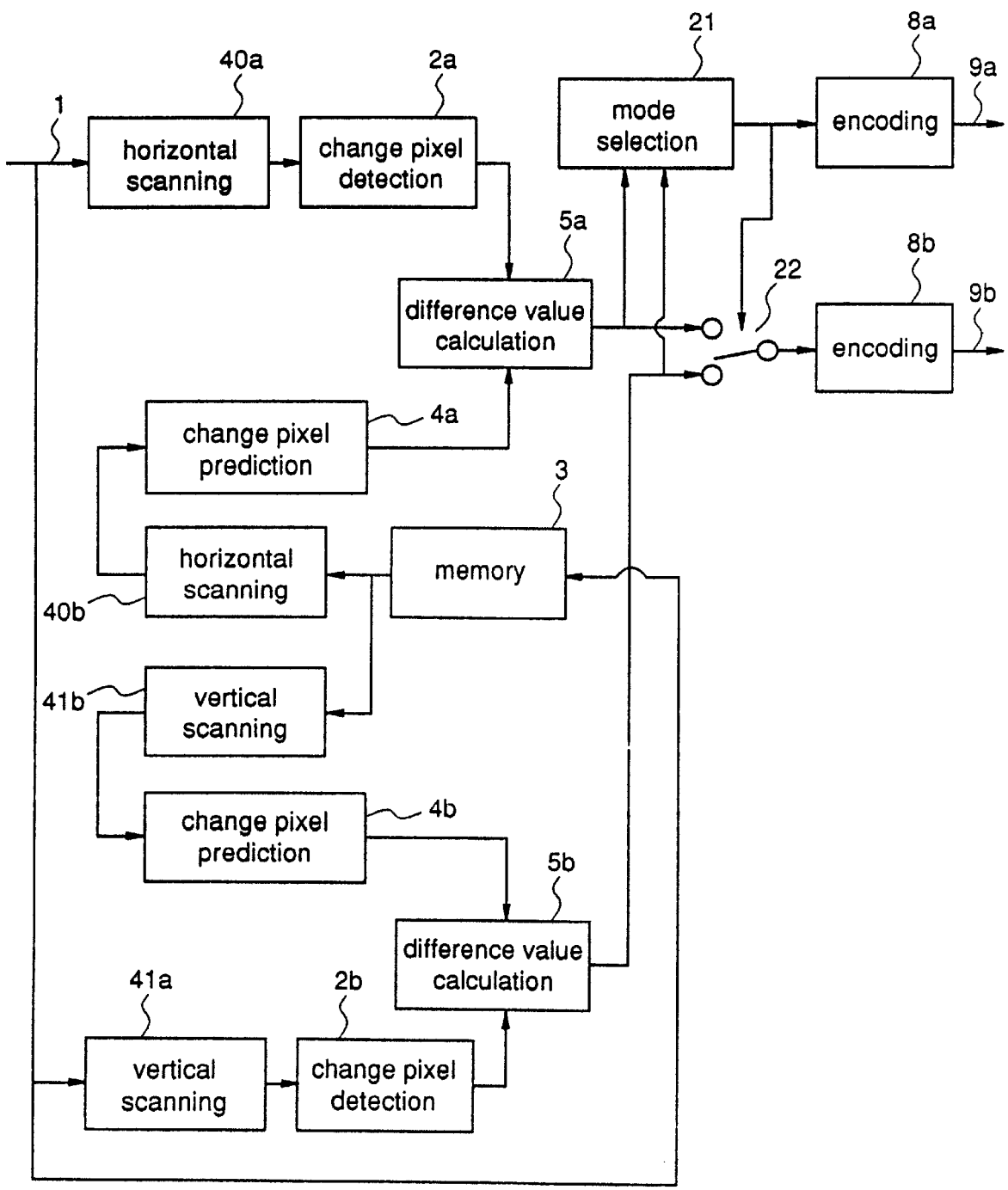
FIG. 7 is a block diagram showing the structure of an image encoding apparatus according to a 4th embodiment of this invention.

FIG. 7 is a block diagram showing the structure of the image encoding apparatus according to the 4th embodiment. In the figure, 40*a* and 40*b* indicate horizontal scanners, and 41*a* and 41*b* indicate vertical scanners. The other numerals indicate the same as those of the FIG. 3, and the description of the other numerals is the same as that in the 2nd embodiment, and is therefore omitted here.

A description is given of the operation of the image encoding apparatus according to the 4th embodiment. When two-valued signals as input signals are input to the apparatus, the input signal 1 is input to the change pixel detector 2*a* by being horizontally scanned with the horizontal scanner 40*a*. The input signal 1 is also input to the change pixel detector 2*b* by being vertically scanned by the vertical scanner 40*a*. Further, the input signal 1 is input to the memory 3 and stored therein to be used as an already encoded and decoded reference image of the particular frame. The change pixel detector 2*a* receives the horizontally scanned input signal 1 and detects pixels changing two-valued pixel values. The change pixel detector 2*b* receives the vertically scanned input signal 1 and detects pixels changing two-valued pixel values. The change pixel detectors 2*a* and 2*b* output the result of the detection as detected change pixels to the difference value calculators 5*a* and 5*b*, respectively.

On the other hand, the horizontal scanner 40*b* reads out the already encoded and decoded reference image of the particular frame stored in the memory 3, horizontally scans the reference image to the change pixel predictor 4*a* to output the same. The predictor 4*a* predicts change pixels to output the predicted change pixels to the difference value calculator 5*a*. Following this, the difference value calculator 5*a* subtracts the predicted change pixel from the detected change pixel and obtains a difference value Dh by the horizontal scanning. The output Dh of the difference value calculator 5*a* corresponds to the prediction error predicted by the horizontal scanning. The difference value calculator 5*a* outputs the difference value Dh to the mode selector 21 and the switching unit 22.

On the other hand, the vertical scanner 41*b* reads out the already encoded and decoded reference image of the particular frame stored in the memory 3, vertically scans the reference image to the change pixel predictor 4*b* to output the same. The predictor 4*b* predicts change pixels and outputs the predicted change pixels to the difference value calculator 5*b*. Following this, the difference value calculator 5*b* subtracts the predicted change pixel from the detected change pixel and obtains a difference value Dv by the vertical scanning. The output Dv of the difference value calculator 5*b* corresponds to the prediction error predicted by the vertical scanning. The difference value calculator 5*b* outputs the difference value Dv to the mode selector 21 and the switching unit 22.

The mode selector 21 compares the code lengths(the required bit number for encoding) of the difference values Dh and Dv input from the difference value calculators 5*a* and 5*b* when respectively encoded, and select the prediction method which requires a smaller bit number for encoding, and outputs the identifying signal as an encoding mode. The mode selector 21 outputs the encoding mode "horizontal direction" if the code length is short when the difference value Dh is encoded, or outputs the encoding mode "vertical" if the code length is short when the difference value Dv is encoded, to the switching unit 22 and the encoder 8*a*.

The switching unit 22, responding to the output of the mode selector 21, outputs the difference value Dh output by the difference value calculator 5*a* if the encoding mode is "horizontal direction", or outputs the difference value Dv output by the difference value calculator 5*b* if the encoding mode is "vertical direction". The encoder 8*a* encodes the encoding mode selected by the mode selector 21 and outputs an encoded signal 9*a*. The encoder 8*b* encodes the output difference value and outputs an encoded signal 9*b*.

The image encoding apparatus according to the 4th embodiment performs loss-less encoding without rounding the error and stores the input image signal 1 as the encoded and decoded pixel values up to the change pixel as described above, in the memory 3.

Figure 8:
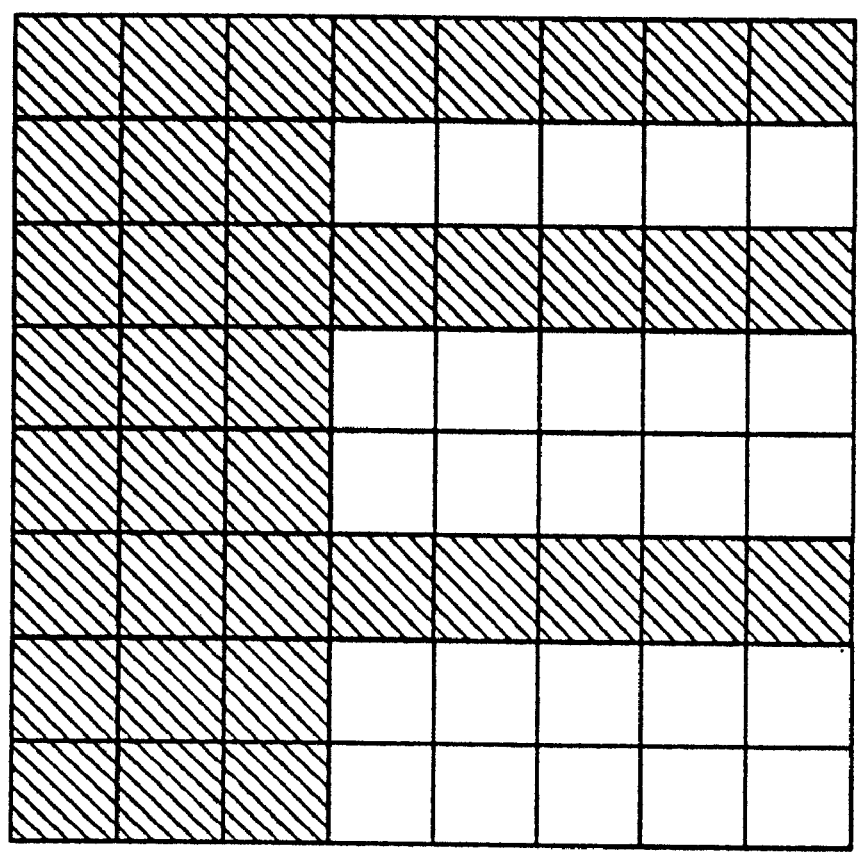
FIG. 8 is a drawing for explaining the operating principle of an image encoding apparatus according to a 4th embodiment of this invention.

FIG. 8 is a drawing for explaining how the scanning directions are switched by the image encoding apparatus according to the 4th embodiment. The image signal has correlations in the horizontal and vertical directions. The prior art image encoding method utilizes these correlations for compression. Concerning the application of the correlation in the prior art technology, as can be seen in, for example, MMR, the encoding is carried out based on only a correlation in either the horizontal direction or the vertical direction. However, if the image is observed locally, either of the correlations in the horizontal or vertical direction is sometimes the strongest. For example, as shown in FIG. 8, if the correlation in the horizontal direction is stronger than that in the vertical direction, the prediction error of the change pixel at the pixel position becomes smaller based on the prediction in the vertical direction rather than based on the prediction in the horizontal direction, whereby enabling the encoding efficiency to be improved. Accordingly, switching the vertical-direction prediction and the horizontal-direction prediction according to the nature of the image largely contributes to the improvement of the encoding efficiency.

As described above, in the image encoding apparatus according to the 4th embodiment, by including the horizontal scanners 40a and 40b, the vertical scanners 41a and 41b, the change pixel detectors 2a and 2b, the memory 3, the change pixel predictors 4a and 4b, and the difference value calculators 5a and 5b, the prediction is performed in the horizontal and vertical directions, and the difference value between the predicted value and the detected result is then obtained for both the directions; and by including the mode selector 21, the switching unit 22, and the encoders 8a and 8b, the difference from the prediction by the horizontal scanning and the difference from the prediction by the vertical scanning are compared and the difference value which has the minimum code length is selected and encoded, whereby the bit number required for encoding by utilizing the local change of the horizontal and vertical correlations can be reduced to a large extent.

Note that, also in the image encoding apparatus according to the 4th embodiment, the input signal 1 is input block by block and the encoding mode is also selected for respective blocks. That is, the apparatus performs adaptively switching the encoding based on the prediction by the horizontal scanning and the encoding based on the prediction by the horizontal scanning, block by block, whereby the above-mentioned effect is obtained.

Further, also in the image encoding apparatus according to the 4th embodiment as well as the 2nd embodiment, it is possible that the change pixel detector 2 and the change pixel. predictors 4a and 4b output not the distance (pixel number) to a change pixel, but a two-valued signal representing the state of the change of the pixel, whereby the process load can be reduced.

Embodiment 5

An image decoding apparatus according to a fifth embodiment of this invention appropriately decodes the encoded signal which is efficiently encoded by the image encoding apparatus according to the 4th embodiment.

Figure 9:
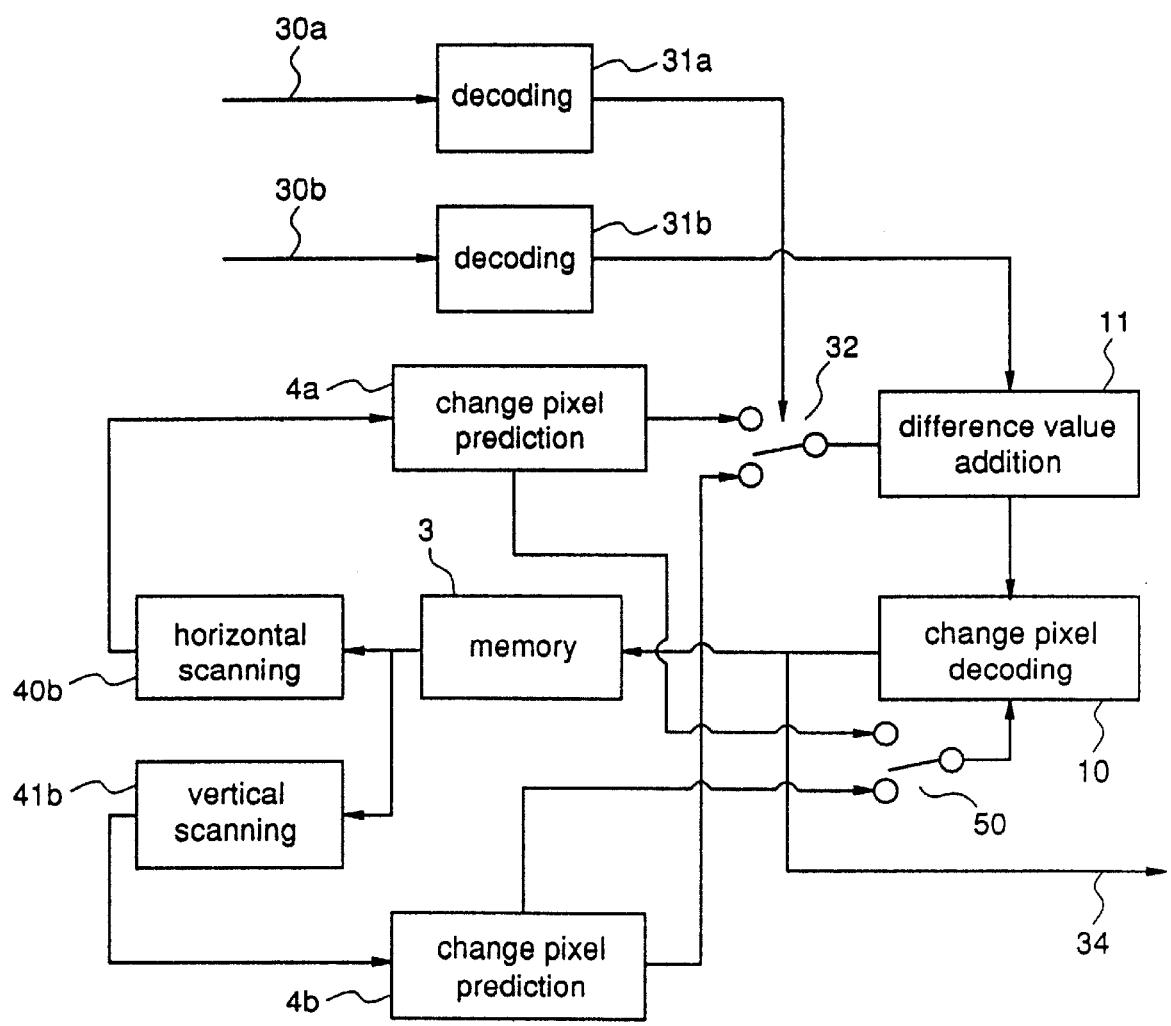
FIG. 9 is a block diagram showing the structure of an image decoding apparatus according to a 5th embodiment of this invention.

FIG. 9 is a block diagram showing the structure of the image decoding apparatus according to the 5th embodiment of this invention. In the figure, 40b and 41b are similar to those of FIG. 7, and the other numerals are similar to those of the 3rd embodiment, and their description is similar to those of the 3rd and 4th embodiments, so therefore is omitted.

The operation of the image decoding apparatus according to the 5th embodiment as constructed above is explained. The image decoding apparatus according to the 5th embodiment receives the input signal 30a which is the signal 9a into which the selected encoded mode has been encoded in the image encoding apparatus according to the 4th embodiment, and the input signal 30a is decoded in the decoder 31a, and the predicted mode signal indicating "horizontal direction" or "vertical direction" is obtained. The decoder 31a outputs the predicted mode into the switching unit 32.

Also, the image decoding apparatus according to the 5th embodiment receives the input signal 30b which is the signal 9b into which the selected difference value has been encoded in the image encoding apparatus according to the 4th embodiment, and the input signal 30b is decoded in the decoder 31b, and the decoded difference value is obtained. The decoder 31b outputs the decoded difference value into the difference value addition means 11.

On the other hand, the horizontal scanner 40b reads out the already encoded and decoded reference image of the particular frame stored in the memory 3, horizontally scans and outputs the reference image to the change pixel predictor 4a. The predictor 4a predicts change pixels and outputs the result as predicted change pixels to the switching unit 22.

On the other hand, the vertical scanner 41b reads out the already encoded and decoded reference image of the particular frame stored in the memory 3, vertically scans the reference image to the change pixel predictor 4b and outputs the same. The predictor 4b predicts change pixels and outputs the predicted change pixels to the switching unit 22.

The switching unit 22 into which the change pixel predictors 4a and 4b output the predicted pixels, performs switching according to the input predicted mode signal. Accordingly, the switching unit 22 selects the predicted change pixel based on the horizontal scanning output by the change pixel predictor 4a if the input predicted mode signal indicates "horizontal direction", or selects the predicted change pixel based on the vertical scanning output by the change pixel predictor 4b if the input predicted mode signal indicates "vertical direction", and outputs the predicted change pixel to the difference value addition means 11.

The difference value addition means 11 calculates a change pixel by adding the predicted change pixel obtained by the switching unit 22 to the decoded difference value obtained from the decoder 31b, and outputs the result to the change pixel decoder 10. The change pixel decoder 10, based on the predicted change pixel of the change pixel prediction means 4a and the change pixel obtained by the difference value addition means 11, encodes the pixel value therebetween. The result of this decoding is stored in the memory 3, and is output as a decoded image signal 34 from the image decoding apparatus according to the 5th embodiment.

As described above, the image decoding apparatus according to the 5th embodiment has the decoder 31a which decodes the encoding mode of the encoded signal, the decoder 31b which decodes the encoded signal of the difference value, the change pixel prediction means 4a which predicts the change pixel based on the horizontal-direction scanning, the change pixel prediction means 4b which predicts the change pixel based on the vertical-direction scanning, the difference value addition means 11 which performs decoding based on the predicted change pixel, and the change pixel decoder 10, whereby the switching unit performs switching according to the predicted mode obtained by the decoder 31a, namely the switching unit adaptively switches the decoding based on the horizontal-direction scanning and the decoding based on the vertical-direction scanning, according to the predicted mode corresponding to the encoding mode which has been used in encoding, and therefore the encoded signal efficiently encoded in the 4th embodiment can be appropriately decoded.

Note that in the 5th embodiment there is described the image decoding apparatus which is constructed based on the structure shown in FIG. 5 of the 3rd embodiment, however, the apparatus can be constructed based on the structure shown in FIG. 6 of the 3rd embodiment, or as described in the 3rd embodiment the switching unit can receive the output of the change pixel decoder in the 5th embodiment, and it is also possible to perform appropriate decoding.

Also, in the 5th embodiment, when the encoded signal is such a signal that is, block by block, encoded with the encoding modes selected for respective blocks, the apparatus receives input signals block by block, and obtains the predicted modes for respective blocks, and performs processes block by block according to respective encoding modes, whereby the encoded signal can be appropriately decoded.

Embodiment 6

An image encoding apparatus according to a 6th embodiment of this invention with greater efficiency encodes multi-valued image signals.

Figure 10:
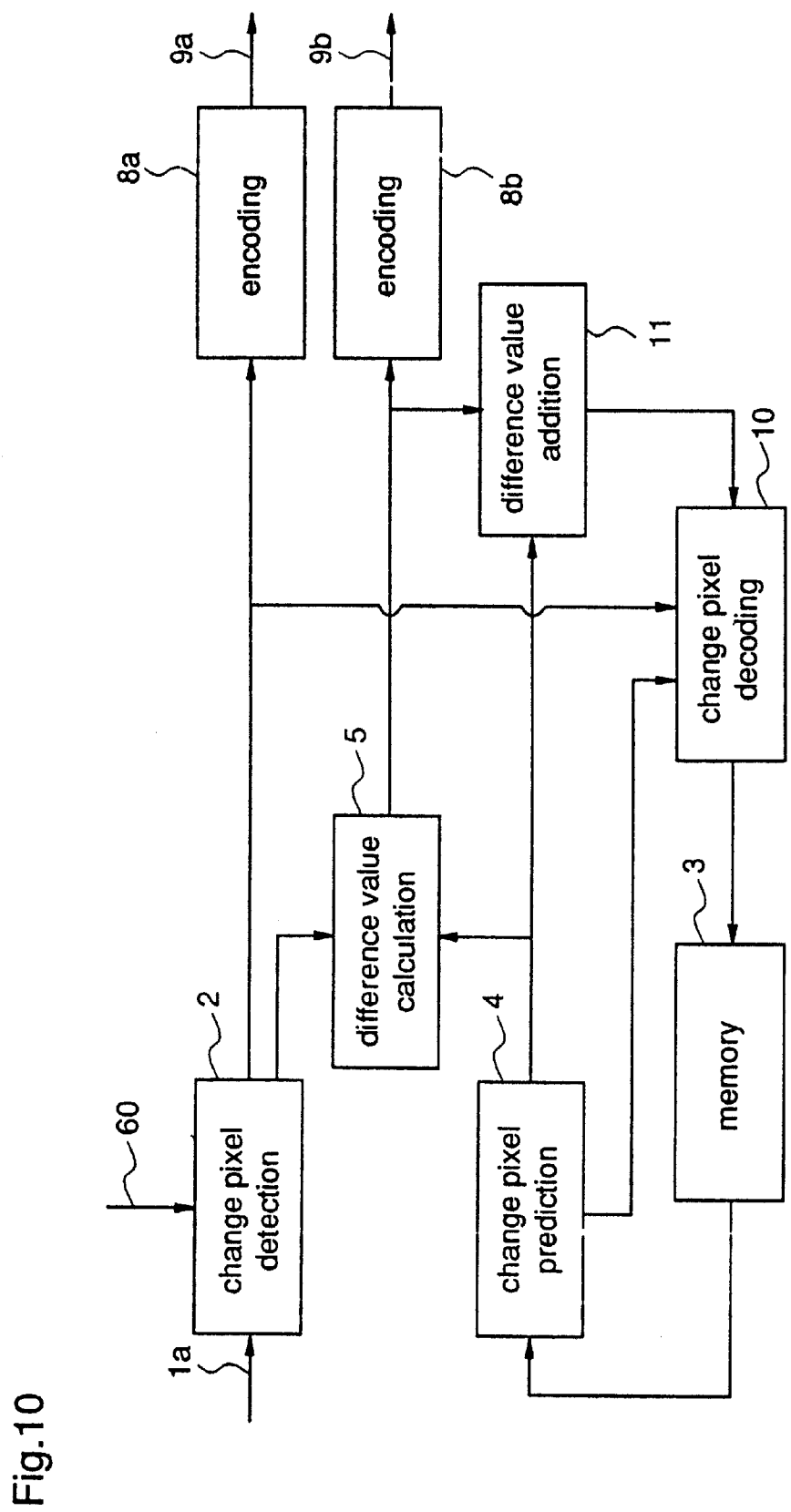
FIG. 10 is a block diagram showing the structure of an image encoding apparatus according to a 6th embodiment of this invention.

FIG. 10 is a block diagram showing the structure of the image encoding apparatus according to the 6th embodiment. In the figure, an input signal 1a is input to the image encoding apparatus according to the 6th embodiment as a multi-valued signal. Thus, what is different from the 1st embodiment is that the multi-valued signal is input and processed and that there is included two encoders. The other points are similar to those of the 1st embodiment. The description of these is similar to the 1st embodiment, and is therefore omitted.

A description is given of the image encoding apparatus according to the 6th embodiment as constructed above. When the input signal 1a is input, the change pixel detector 2, for this multi-valued input signal, compares the pixel value at the final encoding and the decoding position with the pixel value at the next position, and judges whether each pixel corresponds to "change" or to "non-change". Thereafter, a change pixel number, the number of pixels which is judged as "change", is calculated, and compared with the given value. Here, the given value is assumed to be 60. The pixel which is judged as "change" and of which the change pixel number is beyond 60 is defined as a change pixel, and the pixel value and position of the change pixel are output as a detected change pixel to the difference value calculator 5, the change pixel decoder 10 and the encoder 8a.

On the other hand, the change pixel predictor 4 reads out the already encoded and decoded reference image of the particular frame stored in the memory 3, and predicts a change pixel based on the particular input signal, and outputs the result as a predicted change pixel to the difference value calculator 5, the difference value adder 11 and the change pixel decoding means. The difference value calculator 5 subtracts the predicted change pixel from the detected change pixel and obtains the difference value and outputs the difference value to the encoder 8b and difference adder 11. The difference value adder 11 adds the input predicted change pixel and the difference value, and outputs the result to the change pixel decoder 10. The change pixel decoder 10 decodes the pixel values of pixels up to the change pixel and the pixel value of the change pixel based on the input, and stores the result in the memory 3.

The encoders 8a and 8b encode the pixel values of the input change pixels and the difference values, and output the encoded signals 9a and 9b, respectively.

As described above, in the image encoding apparatus according to the 6th embodiment having a structure similar to that of the 1st embodiment, whether there exists the change or not is judged pixel by pixel, the number of pixels which are judged as "change" is calculated, and if the number of pixels judged as "change" is equal to or greater than the threshold, they are defined as the change pixel, whereby not only is it possible to perform the similar encoding for only two-valued images, but also for multi-valued images.

Embodiment 7

An image decoding apparatus according to a 7th embodiment of this invention decodes the encoded signal encoded by the image encoded apparatus according to the 6th embodiment and obtains a multi-valued signal.

Figure 11:
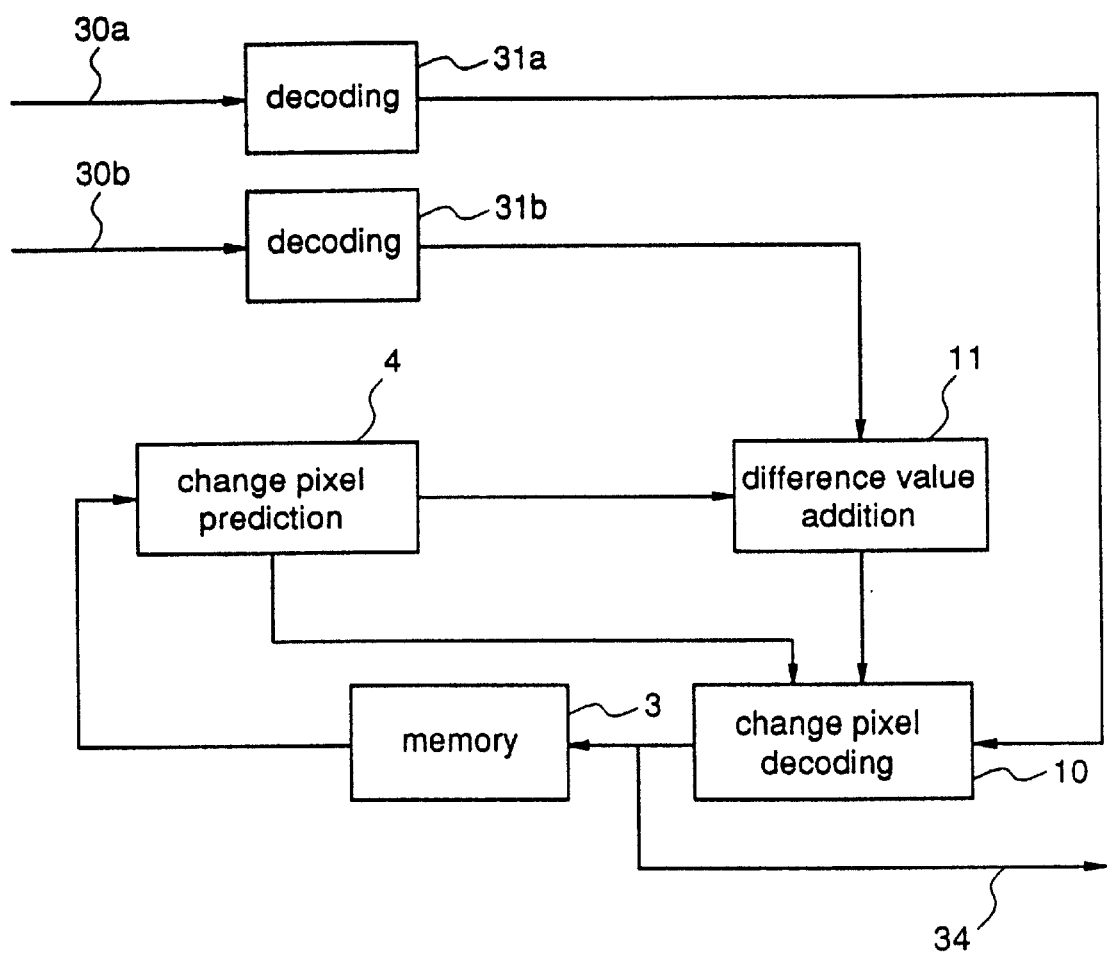
FIG. 11 is a block diagram showing the structure of an image decoding apparatus according to a 7th embodiment of this invention.

FIG. 11 is a block diagram showing the structure of the image decoding apparatus according to the 7th embodiment. In the figure, a decoder 31a decodes the encoded signal into which the pixel values of change pixels are encoded. The decoder 31b decodes the encoded signal into which the predicted difference values are encoded. The other points are similar to those of FIG. 5. The description of these points is similar to those of the 3rd embodiment, and is therefore omitted.

A description is given of the image decoding apparatus according to the 7th embodiment as constructed above. The image decoding apparatus according to the 7th embodiment receives the input signal 30a which is the signal 9a into which the pixel values of change pixels have been encoded in the image encoding apparatus according to the 6th embodiment, and the input signal 30a is decoded in the decoder 31a, and decoded pixel values are obtained and the decoded pixel values are output to the change pixel decoder 10.

On the other hand, the image decoding apparatus according to the 7th embodiment receives the input signal 30b which is the signal 9b into which the predicted difference values have been encoded in the image encoding apparatus according to the 6th embodiment, and the input signal 30b is decoded in the decoder 31b, and decoded difference values are obtained and the decoded difference values are output to the change pixel decoder 10.

On the other hand, the change pixel predictor 4 reads out the already encoded and decoded reference image stored in the memory 3, and predicts a change pixel based on the particular image signal to output the predicted change pixel to the change pixel decoder 10 and difference value adder 11. The difference value adder 11 adds the input predicted change pixel and the difference value, and outputs the result to the change pixel decoder 10. The change pixel decoder 10 decodes the pixel values of pixels up to the change pixel and the pixel value of the change pixel based on the input, and stores the result in the memory 3.

As described above, the image decoding apparatus according to the 7th embodiment has the decoder 31a which decodes the encoded signal into which the pixel values of change pixels are encoded and the decoder 31b which decodes the encoded signal into which the predicted difference values are encoded, whereby the encoded signal encoded by the image encoding apparatus according to the 6th embodiment can be appropriately decoded to obtain a multi-valued image signal.

Embodiment 8

An image encoding apparatus according to an 8th embodiment of this invention receives an image signal consisting of a transparency signal indicating the ratio for synthesizing an image and a pixel value signal, as an input signal, and encodes the input signal with reference to a reference image.

Figure 12:
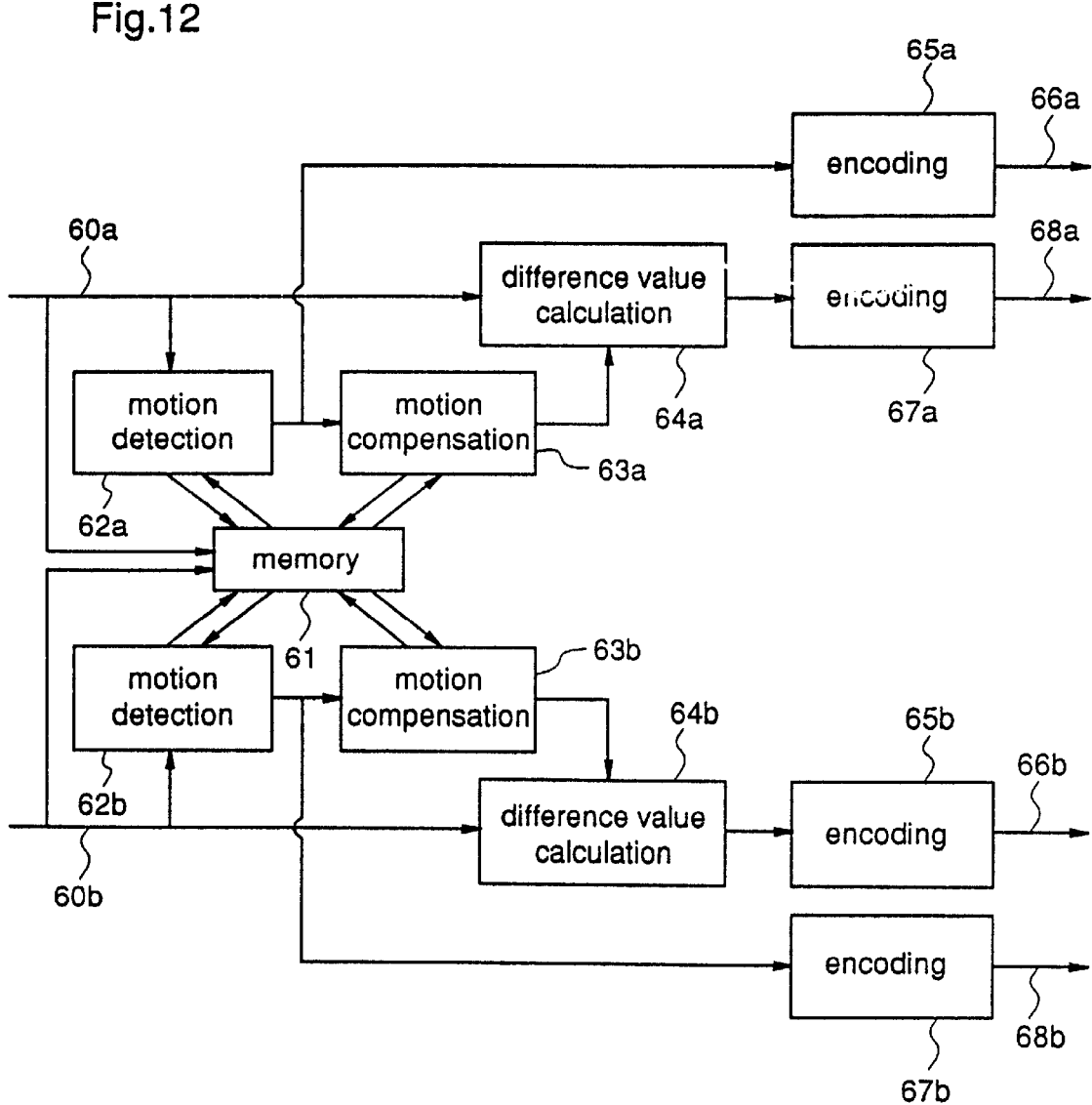
FIG. 12 is a block diagram showing the structure of an image encoding apparatus according to an 8th embodiment of this invention.

FIG. 12 is a block diagram showing the structure of the image decoding apparatus according to the 8th embodiment. In the figure, 60*a* indicates a pixel value signal. 60*b* indicates a transparency signal. The pixel value signal and the transparency signal constitute a image signal and are input to the image encoding apparatus according to the 8th embodiment as input signals. 61 indicates a memory which temporarily stores data such as previously encoded and decoded image signals used as reference images. 62*a* and 62*b* indicate motion detectors which detect motion with the reference images to output motion vectors. 63*a* and 63*b* indicate motion compensation units which perform motion compensation with the image signal of the already encoded and decoded reference. frame to generate reference pixel values. 64*a* and 64*b* indicate difference value calculators which calculate the difference value between the input signal and the motion-compensated signal, and output the difference value. 65*a* and 67*b* indicate encoders which encode the motion vectors. 67*a* and 65*b* indicate encoders which encode the difference values. 66*a* and 68*b* indicate encoded signals into which the motion vectors are encoded. 67*a* and 65*b* indicate encoded signals into which the difference values are encoded.

A description is given of the image encoding apparatus according to the 8th embodiment as constructed above. The image encoding apparatus according to the 8th embodiment receives image signals, as the pixel value signal 60*a* and the transparency signal 60*b*. Here, the transparency signal is such a signal as shown in FIG. 53(*b*) used for explaining the prior art, and indicates what ratio is used for synthesizing each pixel when it is combined with the other image. The pixel value signal 60*a* is input to the memory 61, the motion detector 62*a* and the difference value calculation means 64*a*. The transparency signal 60*b* is input to the memory 61, the motion detector 62*b* and the difference value calculation means 64*b*.

The motion detectors 62*a* and 62*b* perform detecting motions by comparing the input signals with the already encoded and decoded pixel values contained by the reference image read out from the memory 61, and obtain motion vectors of each input signal.

The motion vectors of the pixel value signals obtained by the motion detector 62*a* are output to the encoder 65*a*, the motion compensation unit 63*a* and the memory 61. The motion compensation unit 63*a* reads out the pixel value indicated by the motion vector of the pixel value signal from the memory 61, and outputs the motion-compensated value of the pixel value signal into the difference calculator 64*a*.

The difference calculator 64*a* calculates the difference value between the input pixel value signal and motion-compensated value and obtains the same, and outputs the difference value to the encoder 67*a*. The motion vector of the pixel value signal is encoded in the encoder 65*a* to become encoded signal 66*a*, while the difference value is encoded in the encoder 67*a* to become encoded signal 68*a*.

Similarly, the motion vector of the transparency signal obtained from the motion detector 62*b* is output to the encoder 67*b*, the motion compensation unit 63*b* and the memory 61. The motion compensation unit 63*b* performs motion compensation for the transparency signal, and outputs the obtained motion compensated value to the difference value calculator 64*a*. On the other hand, the difference value calculator 64*b* outputs the obtained difference value to the encoder 67*a* similarly to the 64*a*. Similar to the pixel value signal, the motion vector of the transparency signal is encoded in the encoder 67*b* to become the encoded signal 68*b*, and the difference value is encoded in the encoder 65*b* to become the encoded signal 66*b*. The 8th embodiment is an example of a reversible encoding, so that the encoded input signal is stored in the memory 61 and is used for encoding subsequent image signals(not shown).

As described above, the image encoding apparatus according to the 8th embodiment has the motion detector 62*a*, motion compensation unit 63*a*, difference value calculator 64*a*, encoder 65*a* and encoder 67*a*, all of which process the pixel value signal 60*a*, and has the motion detector 62*b*, the motion compensation unit 63*b*, the difference value calculator 64*b*, the encoder 65*b* and the encoder 67*b*, all of which process the transparency signal 60*b*, whereby the pixel value signal and the transparency signal are separately subjected to the motion detection to obtain the motion vectors and are also subjected to the motion compensation.

As described in the Prior Art section, in the prior art image encoding, when the image consisting of the shape information and pixel value information is encoded, concerning the shape information used for the image synthesis, in order to improve the encoding efficiency, the motion compensation for the shape information is carried out using the motion vector of the pixel value information. Accordingly, when encoding such a signal as the input image signal of the 8th embodiment, the motion compensation encoding for the transparency signal is performed using the motion vector of the pixel value signal. However, although the transparency signal is a signal representing the shape of the object, the motion vector does not always agree with the motion vector of the pixel value signal. For example, although the shape of a rotating disc is invariable, the drawings on the disc move. Hence, in this case, as the motion vector of the pixel value signal is much different from that of the transparency signal, when the motion compensation is performed for the transparency signal using the motion vector of the pixel value signal, the motion error becomes large and the code length of the difference value increases, resulting in the reduction of the encoding efficiency.

As opposed to this, the image encoding apparatus according to the 8th embodiment performs motion compensation using another detected motion vectors rather than the motion vector of the pixel value signal and thereby obtains a more precise approximation to the input transparency signal by the motion compensated signal and improves the encoding efficiency as a result of the reduction of the motion compensation error.

Also, in the image encoding apparatus according to the 8th embodiment, the input signal can be input block by block, and the motion compensation and the encoding can be performed for respective blocks, whereby the above-mentioned effect is obtained.

Embodiment 9

An image encoding apparatus according to a 9th embodiment of this invention, similarly to the 8th embodiment, receives an image signal consisting of a transparency signal and a pixel value signal, as input signals, and encodes the input signal with reference to a reference image.

Figure 13:
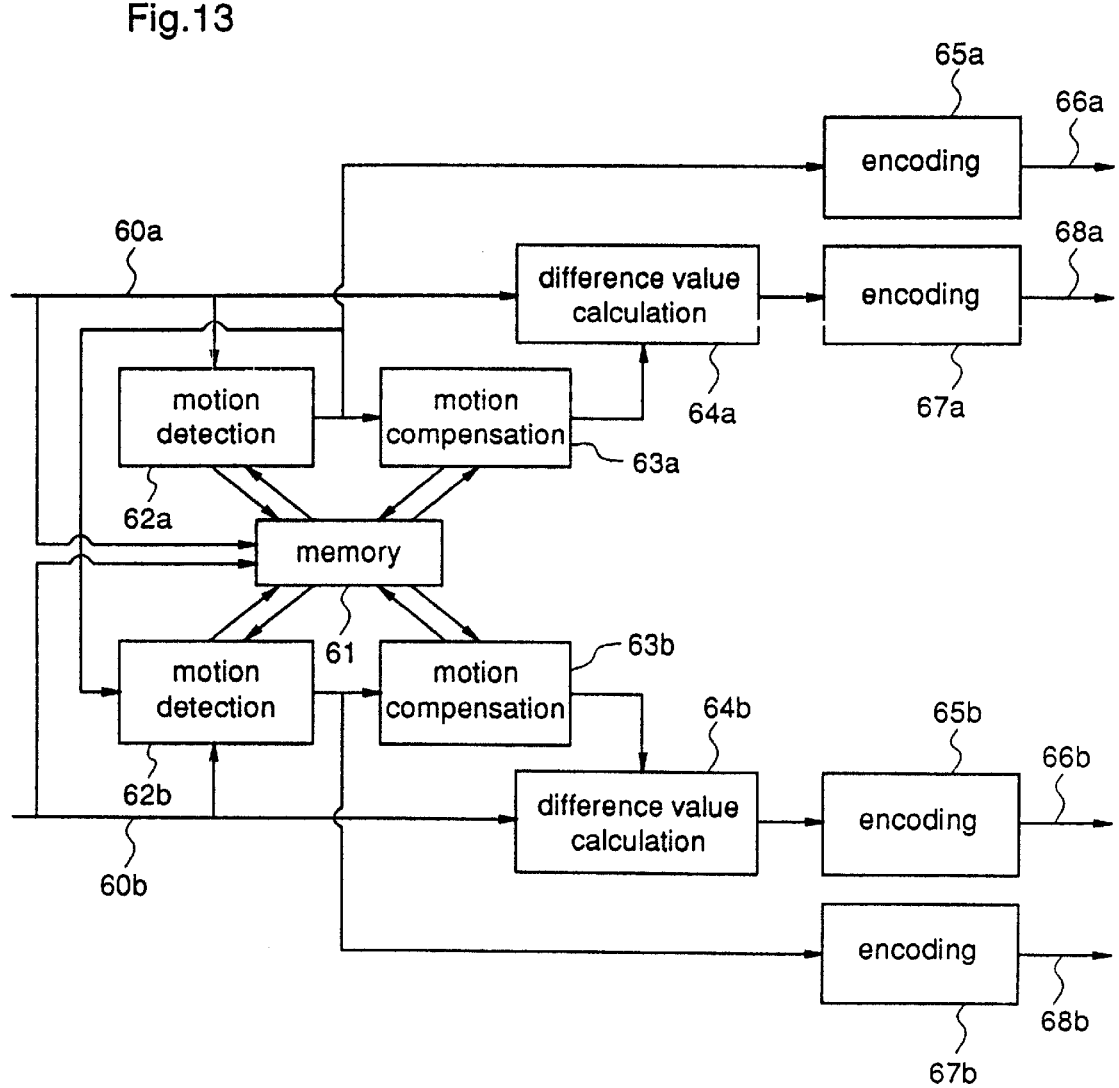
FIG. 13 is a block diagram showing the structure of an image encoding apparatus according to a 9th embodiment of this invention.

FIG. 13 is a block diagram showing the structure of the image encoding apparatus according to the 8th embodiment. In the figure, the numerals indicate the same as those in FIG. 12, and the description is similar to that for the embodiment 8. The difference from the structure of the image encoding apparatus according to the 8th embodiment is that, in the image encoding apparatus according to the 9th embodiment, the motion detector 62*a* obtains the motion vector from the pixel value signal 60*a* and outputs the motion vector to the motion detector 62*b* for the transparency signal 60*b,* and the motion detector 62*b* detects the motion from in the vicinity of the motion vector of the input pixel value signal.

Also, the operation of the image encoding apparatus according to the 9th embodiment is similar to that of the 8th embodiment except the motion detector 62*a* performs the above-mentioned output and the motion detector 62*b* performs the above-mentioned detection.

As described above, in the image encoding apparatus according to the 9th embodiment, based on the structure of the 8th embodiment, the motion detector 62*a* obtains the motion vector from the pixel value signal 60*a* and outputs the motion vector to the motion detector 62*b* for the transparency signal 60*b,* and the motion detector 62*b* detects the motion of the transparency from in the vicinity of the motion vector of the input pixel value signal. That is, it is possible that when the motion of the transparency signal is detected, the result of the motion detection of the pixel value signal is used.

Although the motion vectors of the pixel value signal and the transparency signal are sometimes largely different from each other as shown in the 8th embodiment, they are almost the same in most images. Therefore, when the motion vector of the transparency signal is detected, if the motion vector of the transparency signal is detected only in the vicinity of the motion vector of the pixel value signal, compared to the case of detecting independently of the pixel value signal, the calculation times required for the motion detection is reduced. Note that, compared to the case of the motion detection independent of the pixel value signal the number of motion vectors which can be selected is restricted, so that the motion compensation error of the transparency signal is more or less increased, but the ratio is slight. Accordingly, the image encoding apparatus according to the 9th embodiment as well as the 8th embodiment performs the appropriate motion compensation for each signal, resulting in improving the encoding efficiency and reducing the calculation times of the motion detection.

Note that, in the image encoding apparatus according to the 9th embodiment, although the motion vector of the pixel value signal is used for the motion detection of the transparency signal, it is possible that based on the structure of the 8th embodiment, the motion detector 62*b* obtains the motion vector from the transparency signal 60*b* and outputs the motion vector to the motion detector 62*a* for the pixel value signal 60*a,* and the motion detector 62*a* detects the motion of the pixel value signal from in the vicinity of the motion vector of the input transparency signal. That is, it is possible that when the motion of the pixel value signal is detected, the result of the motion detection of the transparency signal is used. Also, the calculation times of the motion detection can be reduced.

Also, similarly to the 8th embodiment, the block-by-block encoding is possible.

Embodiment 10

An image encoding apparatus according to a 10th embodiment of this invention, similarly to the 8th and 9th embodiments, receives an image signal consisting of a transparency signal and a pixel value signal, as an input signal, and encodes the input signal with reference to a reference image.

Figure 14:
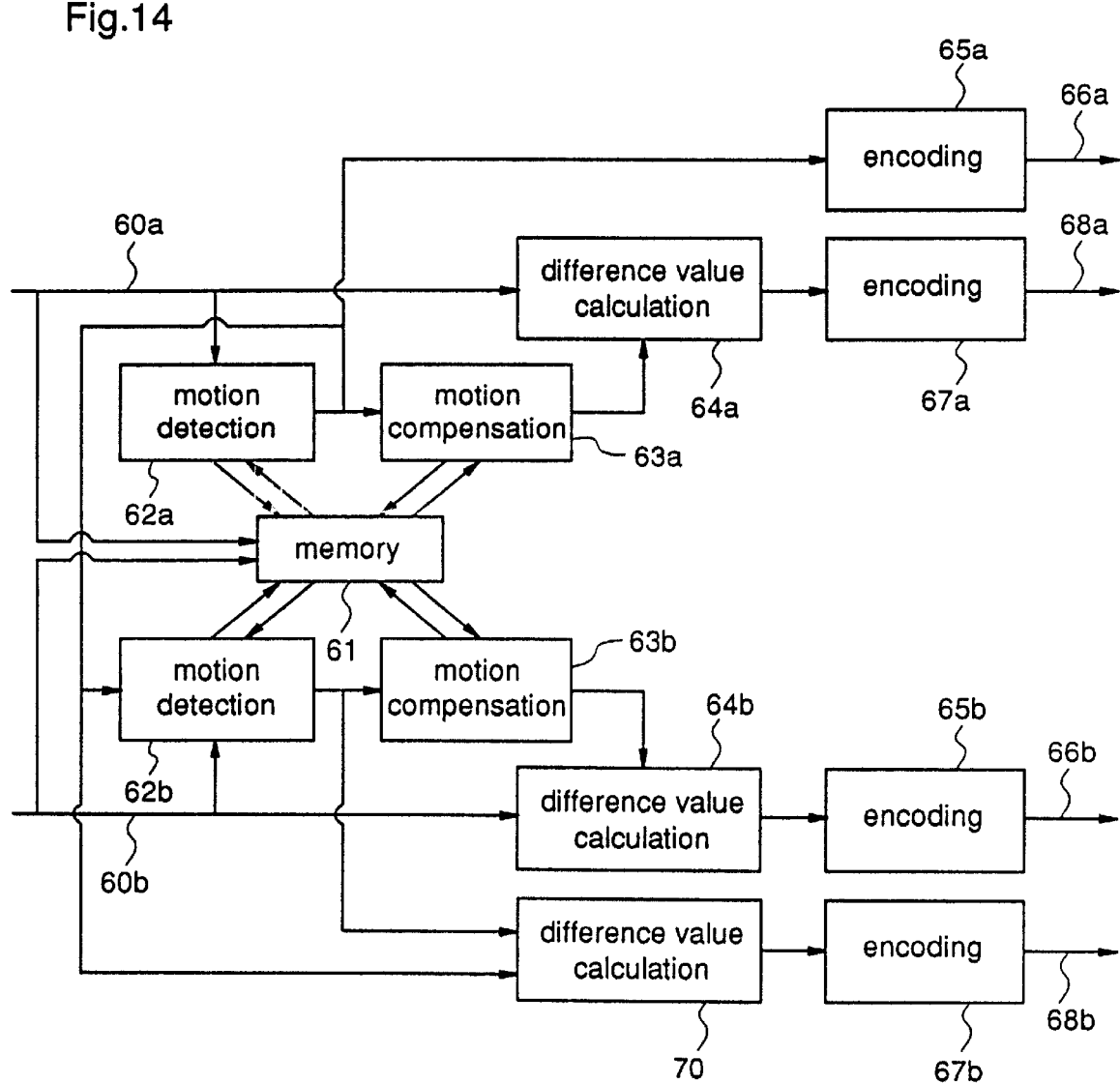
FIG. 14 is a block diagram showing the structure of an image encoding apparatus according to a 10th embodiment of this invention.

FIG. 14 is a block diagram showing the structure of the image encoding apparatus according to the 8th embodiment. In the figure, 70 indicates a difference calculator for motion vectors which obtains the difference vector between the motion vector of the pixel value signal obtained from the motion detector 62*a* and the motion vector of the transparency signal obtained from the motion detector 62*b.* Though the encoder 67*b* encodes the motion vector of the transparency signal. in the 8th embodiment, the encoder 67*b* encodes the difference vector of the motion vector obtained by the difference value calculator 70 in the 10th embodiment. The other numerals indicate the same as those in FIG. 12, and the description is similar to that in the 8th embodiment.

The operation of the image encoding apparatus according to the 10th embodiment is similar to that of the 8th embodiment except that the motion detectors 62*a* and 62*b* output motion vectors to the difference value calculator 70, and the difference value calculator 70 obtains the above-mentioned difference vector to the encoder 67*b* and outputs the same, and the encoder 67*b* encodes the difference vector of the motion vector.

As described above, in the image encoding apparatus according to the 10th embodiment, based on the structure of the image encoding apparatus according to the 8th embodiment, the difference value calculator 70 for motion vectors is added to the structure, and thereby, instead of encoding the motion vector of the transparency signal, the difference vector between the motion vectors of the pixel value and the transparency vectors is encoded. As described in the 9th embodiment, since the motion vectors of both the signals often correlate, if the difference vector between the motion vectors of both the signals is encoded, the frequency of occurrence of the difference vector is concentrated in the neighborhood of 0 vector, whereby, performing the variable-length encoding which gives a code of a short code length to the difference vector in the neighborhood of 0 vector, the encoding efficiency is improved and the encoding can be performed with a smaller bit number.

Note that, in the image encoding apparatus according to the 10th embodiment, although the difference vector of the motion vectors of both the signals are encoded instead of the motion vectors of the transparency signal, there can be provided the structure in which, the difference vector obtained by the difference value calculator 70 is output to the encoder 65*a* instead of 67*b.* If the difference vector of the motion vectors of both the signals is encoded instead of encoding the motion vector of the pixel value signal, the same result can be obtained.

Also, similar to the 8th embodiment, the block-by-block encoding is possible.

Embodiment 11

An image decoding apparatus according to a 11th embodiment of this invention appropriately decodes the encoded signal efficiently encoded by the image encoding apparatus according to the 8th embodiment.

Figure 15:
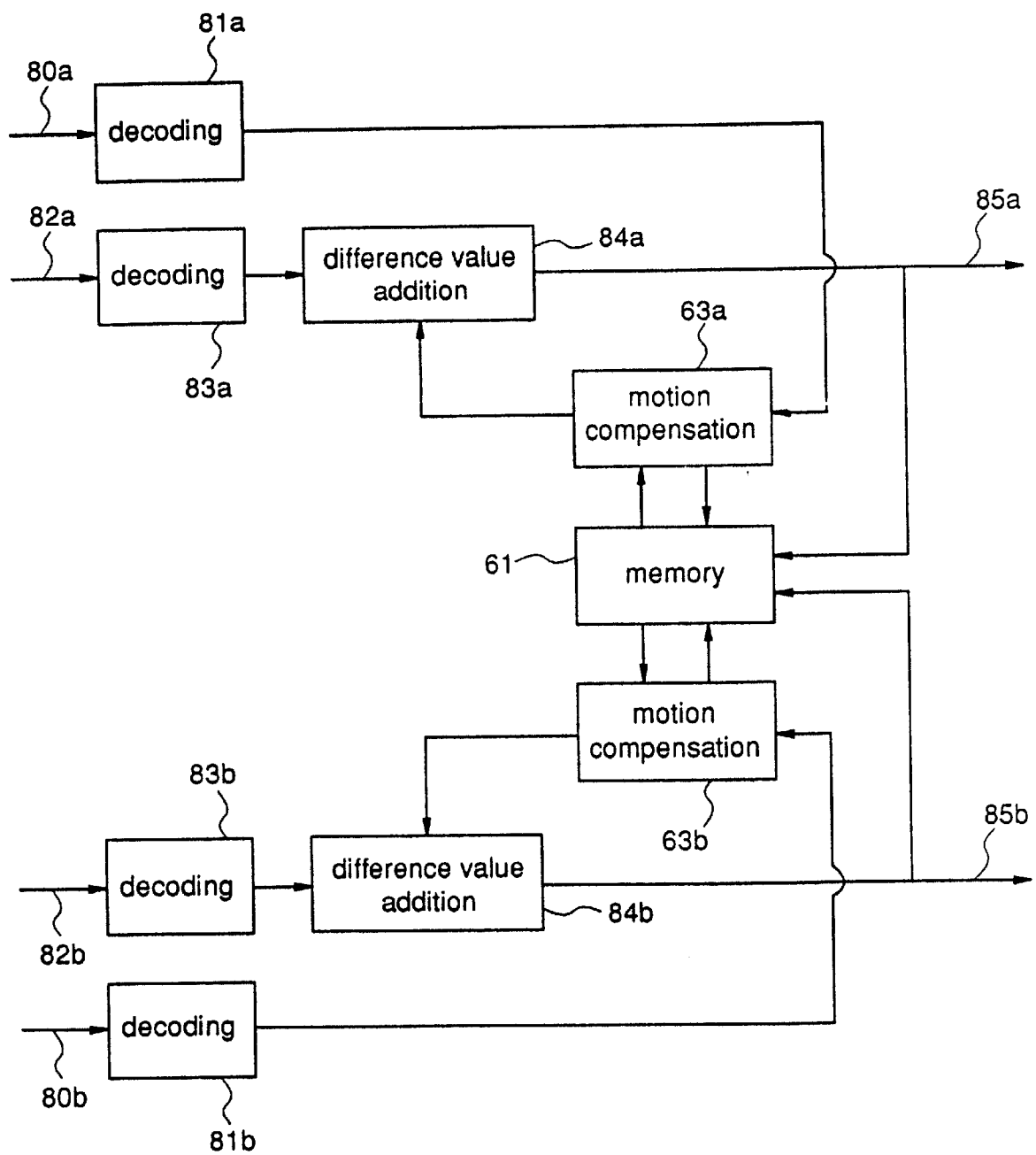
FIG. 15 is a block diagram showing the structure of an image decoding apparatus according to a 11th embodiment of this invention.

FIG. 15 is a block diagram showing the structure of the image decoding apparatus according to the 11th embodiment. In the figure, 82*a* and 82*b* indicate encoded signals corresponding to the encoded signals 68*a* and 66*b* in FIG. 12, respectively, into which the difference values in the pixel value signal and in the transparency signal are encoded respectively. 80*a* and 80*b* indicate encoded signals corresponding to the encoded signals 66*a* and 68*b* in FIG. 12, respectively, into which the motion vectors in the pixel value signal and in the transparency signal are encoded respectively. 83*a* and 83*b* indicate encoders which encode the difference values in the pixel value signal and in the transparency signal, and output the encoded difference values in the pixel value signal and in the transparency signal, respectively. 81*a* and 81*b* indicate encoders which encode the motion vectors of the pixel value signal and of the transparency signal, and output the encoded motion vectors of the pixel value signal and of the transparency signal, respectively. 61 indicates a memory which temporarily stores data such as the already encoded and decoded image signal used as a reference image. 63a and 63b indicate motion compensation units which perform the motion compensation using the encoded motion vectors. 84a and 84b indicate difference value adders which perform the addition processing using the encoded difference values. 85a and 85b indicate encoded image signals.

The operation of the image decoding apparatus according to the 11th embodiment as constructed above is explained. The signals 68a and 66b into which the difference values of the pixel value signal and of the transparency signal are encoded by the image encoding apparatus according to the 8th embodiment respectively, are input to the image decoding apparatus according to the 11th embodiment as the input signals 82a and 82b, and are decoded by the decoders 83a and 83b, and are output to the difference value calculators 84a and 84b as the difference values of the pixel value signal and the transparency signal, respectively. The signals 66a and 68b into which the motion vectors of the pixel value signal and of the transparency signal are encoded by the image encoding apparatus according to the 8th embodiment respectively, are input to the image decoding apparatus according to the 11th embodiment as the input signals 80a and 80b, and are decoded by the decoders 81a and 81b, and are output to the motion compensation units 63a and 63b as the motion vectors of the pixel value signal and the transparency signal, respectively.

The motion compensation units 63a and 63b read out pixel values indicating the respective input motion vectors from the memory 61, and perform the motion compensation, and output the motion compensated values into the difference value adder 84a and 84b, respectively. The difference value adders 84a and 84b add the respectively input encoded difference value and motion compensated value, and output the decoded image signals 85a and 85b, respectively, which are stored in the memory 61.

As described above, the image decoding apparatus according to the 11th embodiment has the decoder 81a, the decoder 83a, the motion compensation unit 63a, and the difference value calculator 84a, all of which perform the process of the encoded signal of the pixel value signal, and has the decoder 81b, the decoder 83b, the motion compensation unit 63b, and the difference value calculator 84b, all of which perform the process of the encoded signal of the transparency signal, whereby the encoded signals 80a and 82a of the pixel value signal, and the encoded signals 80b and 82b of the transparency signal can be separately subjected to the decoding process, whereby decoding can be appropriately performed to obtain the image signal.

Note that, in the image decoding apparatus according to the 11th embodiment, although the encoded signal encoded by the image encoding apparatus according to the 8th embodiment is encoded, the encoded signal obtained by the image encoding apparatus according to the 9th embodiment can be appropriately decoded.

Also, the signals which have been input block by block and encoded for respective blocks in the 8th and 9th embodiment can be received block by block to be appropriately decoded.

Embodiment 12

An image decoding apparatus according to a 12th embodiment of this invention appropriately decodes the encoded signal efficiently encoded by the image encoding apparatus according to the 10th embodiment.

Figure 16:
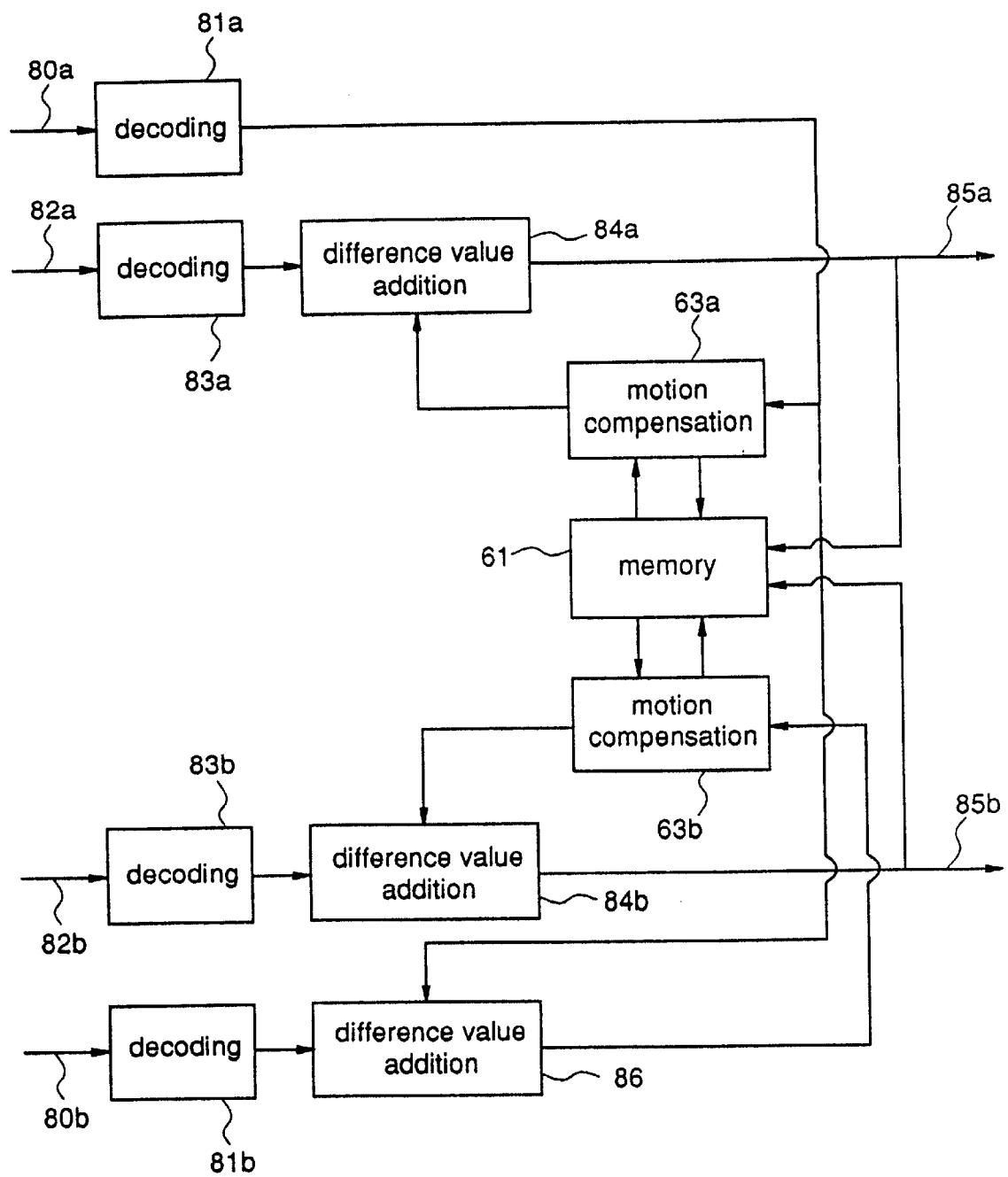
FIG. 16 is a block diagram showing the structure of an image decoding apparatus according to a 12th embodiment of this invention.

FIG. 16 is a block diagram showing the structure of the image decoding apparatus according to the 12th embodiment. In the figure, 86 indicates a difference value adder for motion vectors which adds a decoded motion vector and a decoded difference motion vector. The other numerals are similar to those in FIG. 15, and the description is similar to that in the 11th embodiment and is therefore omitted here.

The operation of the image decoding apparatus according to the 12 the embodiment as constructed above is described. The decoder 81a outputs the decoded motion vector of the pixel value signal obtained by decoding the input signal 80a, to the motion compensation unit 63a and the difference adder 86 for motion vectors. The decoder 80b receives, not the encoded signal of the motion vector of the transparency signal in the 11th embodiment, but the encoded signal 68b of the difference motion vector in the 10th embodiment. The decoder 80b obtains, not the motion vector of the transparency signal by decoding in the 11th embodiment, but the difference vector, and outputs the decoded difference motion vector to the difference adder 86 for motion vectors. The output decoded difference motion vector is the difference vector between the motion vectors of the pixel value signal and the transparency signal. Therefore, by adding the difference vector with the decoded motion vector of the pixel value signal in the difference value adder 86, the motion vector of the transparency signal is obtained. The decoded motion vector of the transparency signal is output to the motion compensation unit 63b.

The other part of the operation is the same as the process of the image decoding apparatus according to the 11th embodiment. The decoded signal 85a of the pixel value signal and decoded signal 85b of the transparency signal are the outputs of the apparatus.

As described above, the image decoding apparatus according to the 12th embodiment has the structure which is based on the structure of the image decoding apparatus according to the 11th embodiment and which is added to the difference value adder 86 for motion vectors, and thereby performs addition of the decoded motion vector and the decoded difference vector, whereby the encoded signal output by the 10th embodiment which outputs the encoded signal of the difference vector as an encoded signal can be appropriately decoded.

Also, it is possible to respond in the situation whereby the encoding is performed block by block as in the 10th embodiment, similar to in the 11th embodiment.

Embodiment 13

An image encoding apparatus according to a 13th embodiment of this invention receives an image, signal with blocked shapes which consists of the shape signal indicating the shape of the object and whether the pixel value of pixels is significant or not, and the pixel value signal, as an input signal, and encodes the input signal with reference to a reference image.

Figure 17:
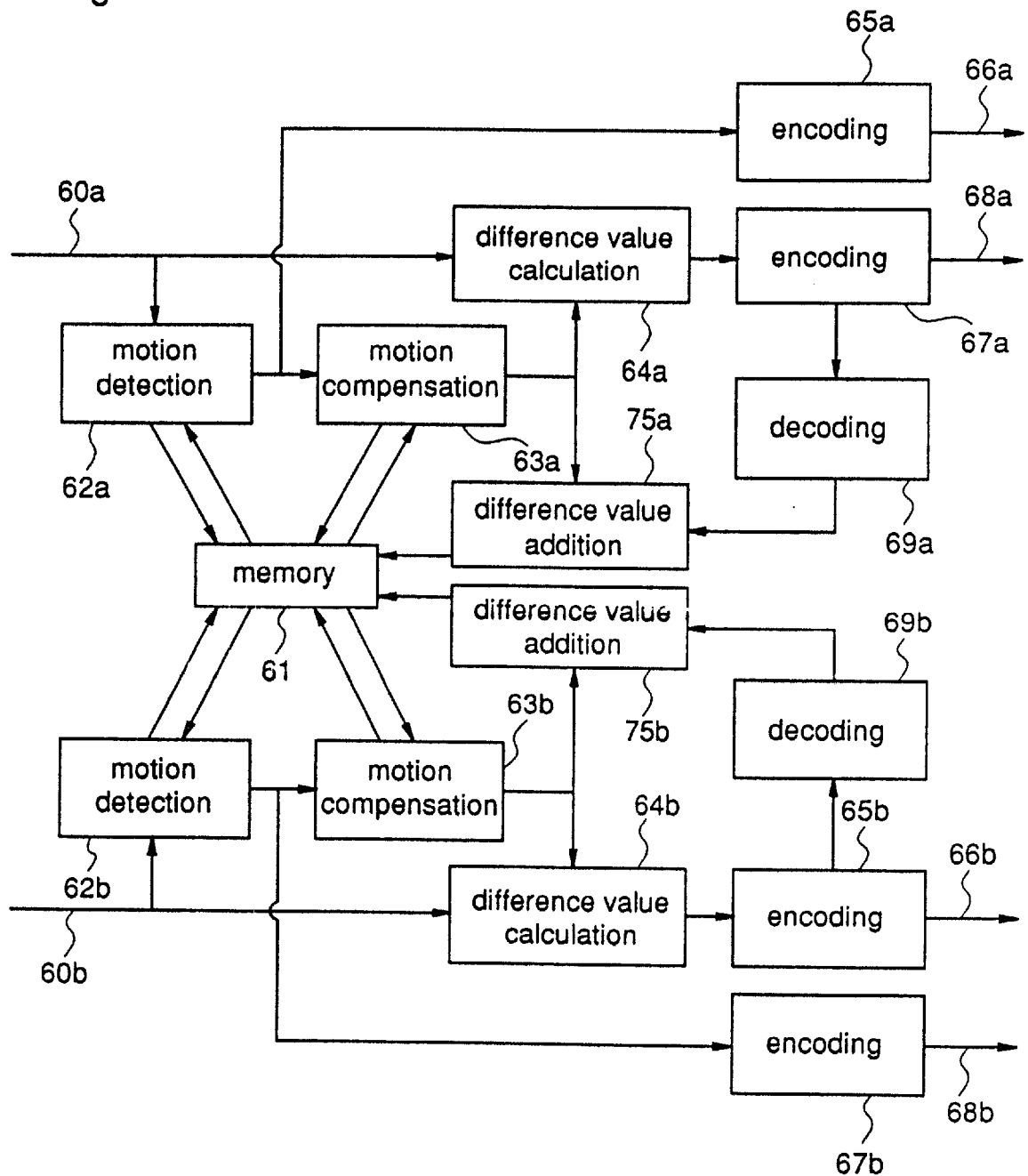
FIG. 17 is a block diagram showing the structure of an image encoding apparatus according to a 13th embodiment of this invention.

FIG. 17 is a block diagram showing the structure of the image encoding apparatus according to the 13 embodiment. In the figure, 60a indicates a pixel value signal. 60b indicates a shape signal. 60a and 60b constitute the image signal and are input to the image encoding apparatus according to the 8th embodiment as input signals. 69a and 69b indicate decoders which decode the encoded signals of the difference values output by the encoders 67a and 65b. 75a and 75b indicate difference value adders which add the decoded difference value and the motion compensated value, and the result is stored in the memory 61. The other numerals are similar to those in FIG. 12, and the description is similar to that in the 8th embodiment and is therefore omitted here.

A description is given of the operation of the image encoding apparatus according to the 13th embodiment as constructed above. The image signal with blocked shapes, the input signal, is input to the image encoding apparatus according to the 13th embodiment as the pixel value signal 60a and the shape signal 60b. Here, the shape signal is the one shown in FIG. 53 used in the Prior Art section, consisting of the two-valued information shown in FIG. 53(c) or multi-valued information shown in FIG. 53(d). In the case of the multi-valued information, it is similar to the transparency signal in the 8th embodiment.

In the image encoding apparatus according to the 13th embodiment, by the process similar to that in the 8th embodiment, the pixel value signal and the shape signal are encoded, and thereby the encoded signal 66a of the motion vector of the pixel value signal, the encoded signal 68a of the difference value of the pixel value signal, the encoded signal 66b of the motion vector of the shape signal and the encoded signal 68b of the difference value of the shape signal are obtained.

Although the encoded signal is input to the memory 61 in the apparatus according to the 8th embodiment, in the 13 embodiment the encoded difference values are respectively decoded in the decoders 69a and 69b, and are output to the difference value adders 75a and 75b, and are added to the motion compensated values output by the motion compensation units 63a and 63b in the difference value adders 75a and 75b, and are input to the memory 61. Accordingly, the reference image used for the encoding is encoded and decoded, and is added to the motion compensated value, which is the difference from the 8th embodiment.

As described above, the image encoding apparatus according to the 13th embodiment has the structure which is based on the structure of the image encoding apparatus according to the 8th embodiment and which is added to the decoders 69a and 69b and the difference value adders 75a and 75b, and therefore, similarly to the 8th embodiment, by reducing the motion compensation error the improvement of the encoding efficiency is realized, and moreover, though there accompanies a slight increase in the processing load, with the use of the more appropriate signal which is encoded and decoded as a reference image, and is added to the motion compensated value, a further reduction of the motion compensation error can be realized.

Note that, the encoded signal output by the image encoding apparatus according to the 13th embodiment, similarly to the 8th embodiment, in the image decoding apparatus according to the 11th embodiment, is appropriately encoded.

Embodiment 14

An image encoding apparatus according to a 14th embodiment of this invention, similar to the 13th embodiment, receives an image signal consisting of a shape signal and a pixel value signal as an input signal, and referring to a reference image, encodes this input signal.

Figure 18:
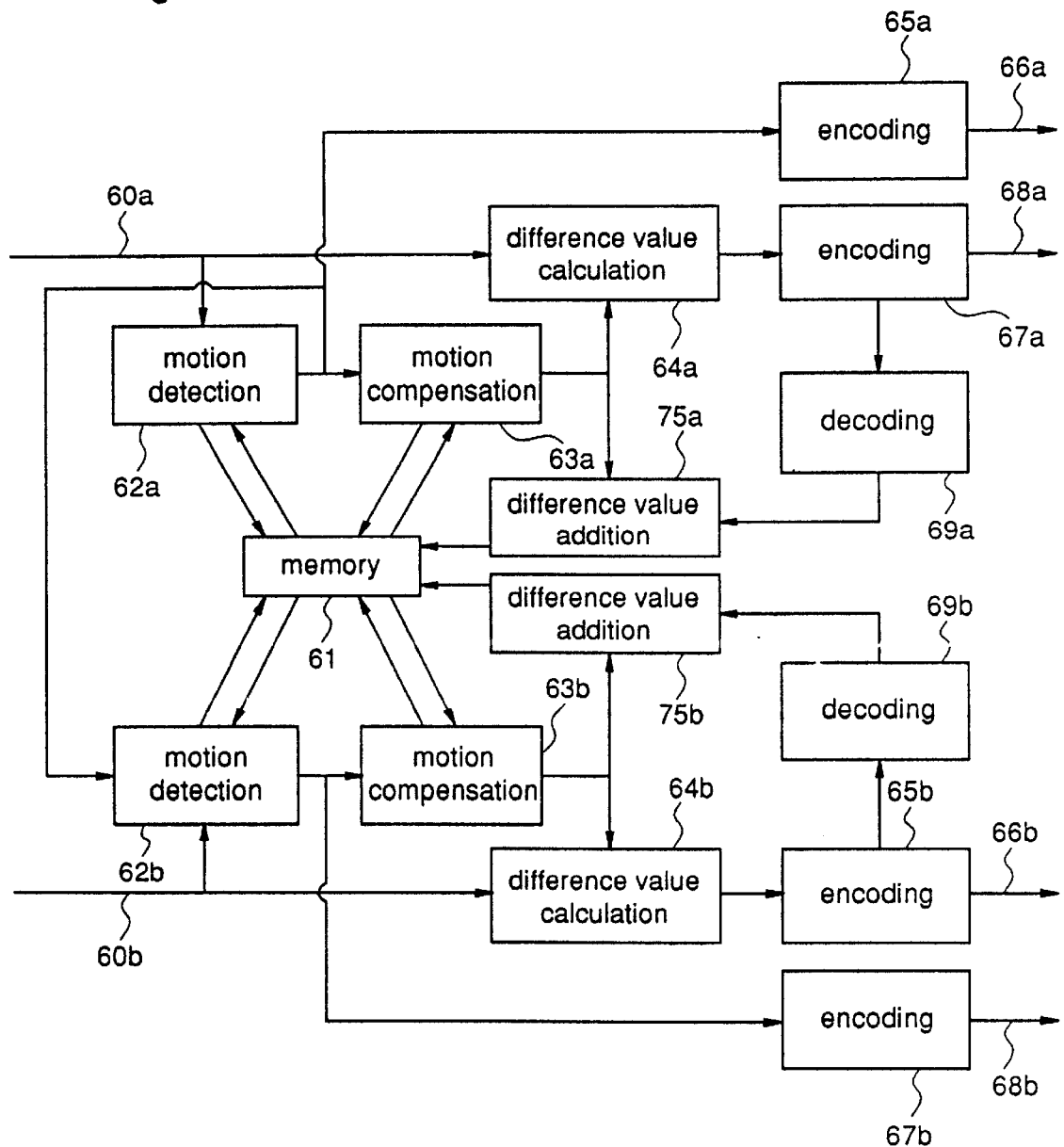
FIG. 18 is a block diagram showing the structure of an image encoding apparatus according to a 14th embodiment of this invention.

FIG. 18 is a block diagram showing the structure of the image encoding apparatus according to the 14th embodiment of this invention. In the figure, the numerals are the same as those in FIG. 17, and the description is similar to that in the 13 embodiment. In the image encoding apparatus according to the 14th embodiment, similar to the 9th embodiment, the motion detector 62a for the pixel value signal 60a outputs the motion vector of the obtained pixel value signal to the motion detector 62b for the transparency signal 60b, and the motion detector 62b performs the motion detection of the transparency signal in the vicinity of the motion vector of the input pixel value signal, which is the difference from the structure of the image encoding apparatus according to the 13th embodiment.

Also, the operation of the image encoding apparatus according to the 14th embodiment is similar to that of the 13 embodiment, except that the motion detector 62a performs the above-mentioned output and the motion detector 62b performs the above-mentioned detection.

As described above, in the image encoding apparatus according to the 14th embodiment, based on the structure of the 13th embodiment, the motion detector 62a for the pixel value signal 60a outputs the motion vector of the obtained pixel value signal to the motion detector 62b for the shape signal 60b, and the motion detector 62b performs the motion detection of the shape signal in the vicinity of the motion vector of the input pixel value signal, and thereby similar to the 9th embodiment, at the time of the motion detection of the shape signal, using the result of the motion detection of the pixel value signal, the calculation times of the motion detection can be reduced.

Note that, the possible structure in which the motion vector of the pixel value signal can be detected in the vicinity of the motion vector of the shape signal, is similar to that of the 9th embodiment, and it is similar to the 13th embodiment in which the encoded signal is obtained by the image encoding apparatus according to the 14th embodiment.

Embodiment 15

An image encoding apparatus according to a 15th embodiment, similarly to the 13th and 14th embodiments, receives an image signal consisting of a shape signal and a pixel value signal as an input signal, and referring to a reference image, encodes this input signal.

Figure 19:
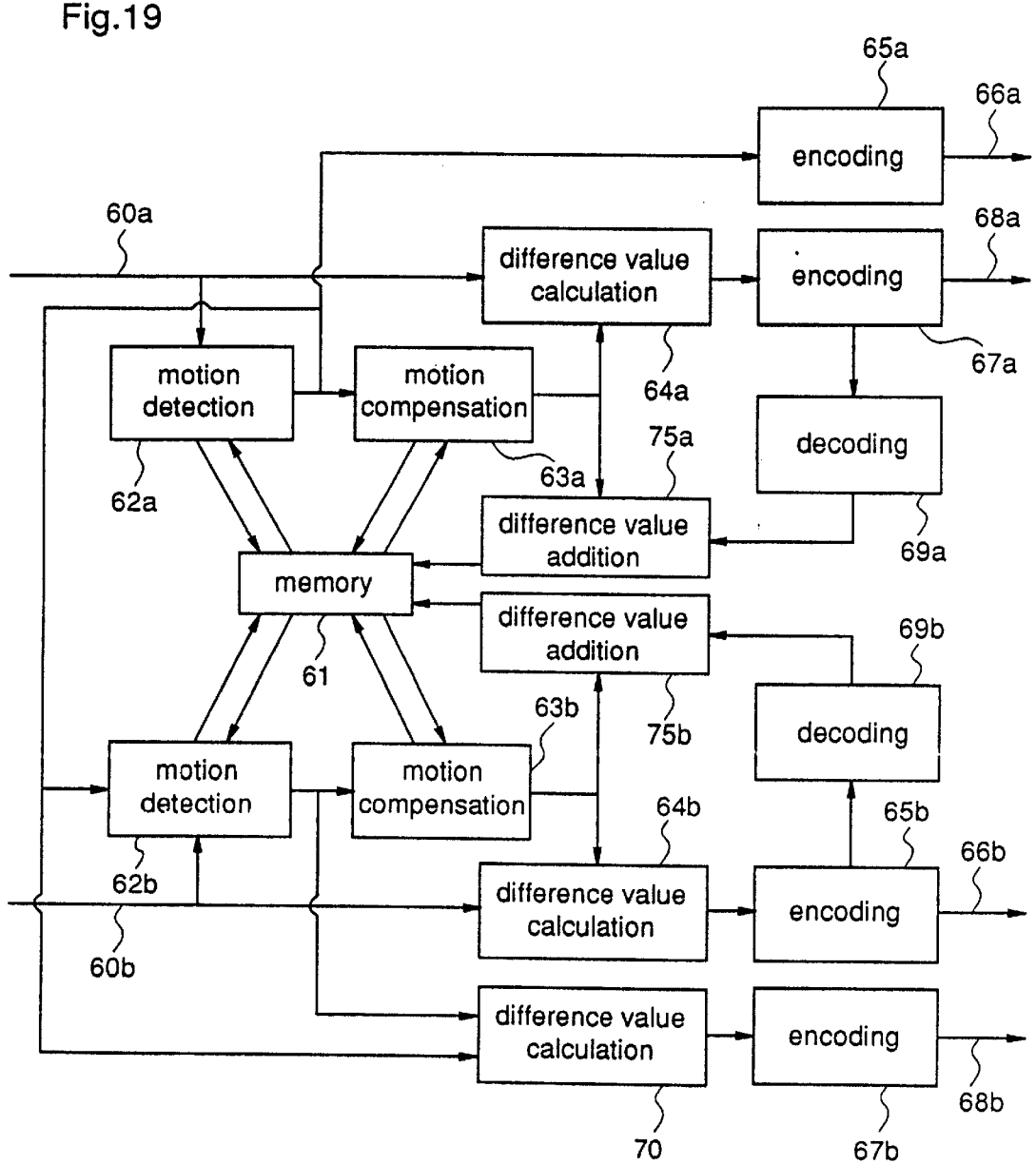
FIG. 19 is a block diagram showing the structure of an image encoding apparatus according to a 15th embodiment of this invention.

FIG. 19 is a block diagram showing the structure of the image encoding apparatus according to the 15th embodiment. In the figure, the difference calculator 70 of the motion vector is similar to that of the 10th embodiment shown in FIG. 13. And, the encoder 67b, similarly to that in the 10th embodiment, encodes the difference vector of the motion vector obtained by the difference value calculator 70. The other numerals indicate the same as those in FIG. 17, and the description is similar to that of the 13 embodiment.

Concerning the operation of the image encoding apparatus according to the 15th embodiment, the motion detectors 62a and 62b output the motion vectors to the difference value calculator 70, and the difference value calculator 70 obtains the above-mentioned difference vector to output to the encoder 67b, and the encoder 67b encodes the difference vector of the motion vector, which is similar to that of the 10th embodiment, while the other operations are similar to those of the 13th embodiment.

As described above, the image encoding apparatus according to the 15th embodiment is based on the structure of the image encoding apparatus according to the 13th embodiment and is added to the difference value calculator 70 of the motion vector, and thereby encodes the difference vector between the motion vector of the pixel value signal and the motion vector of the shape signal instead of encoding the motion vector of the shape signal. Accordingly, similar to the 10th embodiment, the performance of the variable-length encoding enables the further improvement of the encoding efficiency to be realized.

Note that the case of encoding the difference vector instead of encoding the motion vector of the pixel value signal is possible, which is similar to the 10th embodiment.

Also, the encoded signal output by the image encoding apparatus according to the 15th embodiment can be, similarly to that in the 10th embodiment, appropriately decoded by the image decoding apparatus according to the 12th embodiment.

Embodiment 16

An image encoding apparatus according to a 16th embodiment, similar to the 13th to 15th embodiments, receives an image signal consisting of a shape signal and a pixel value signal as an input signal, and referring to a reference image, encodes this input signal.

Figure 20:
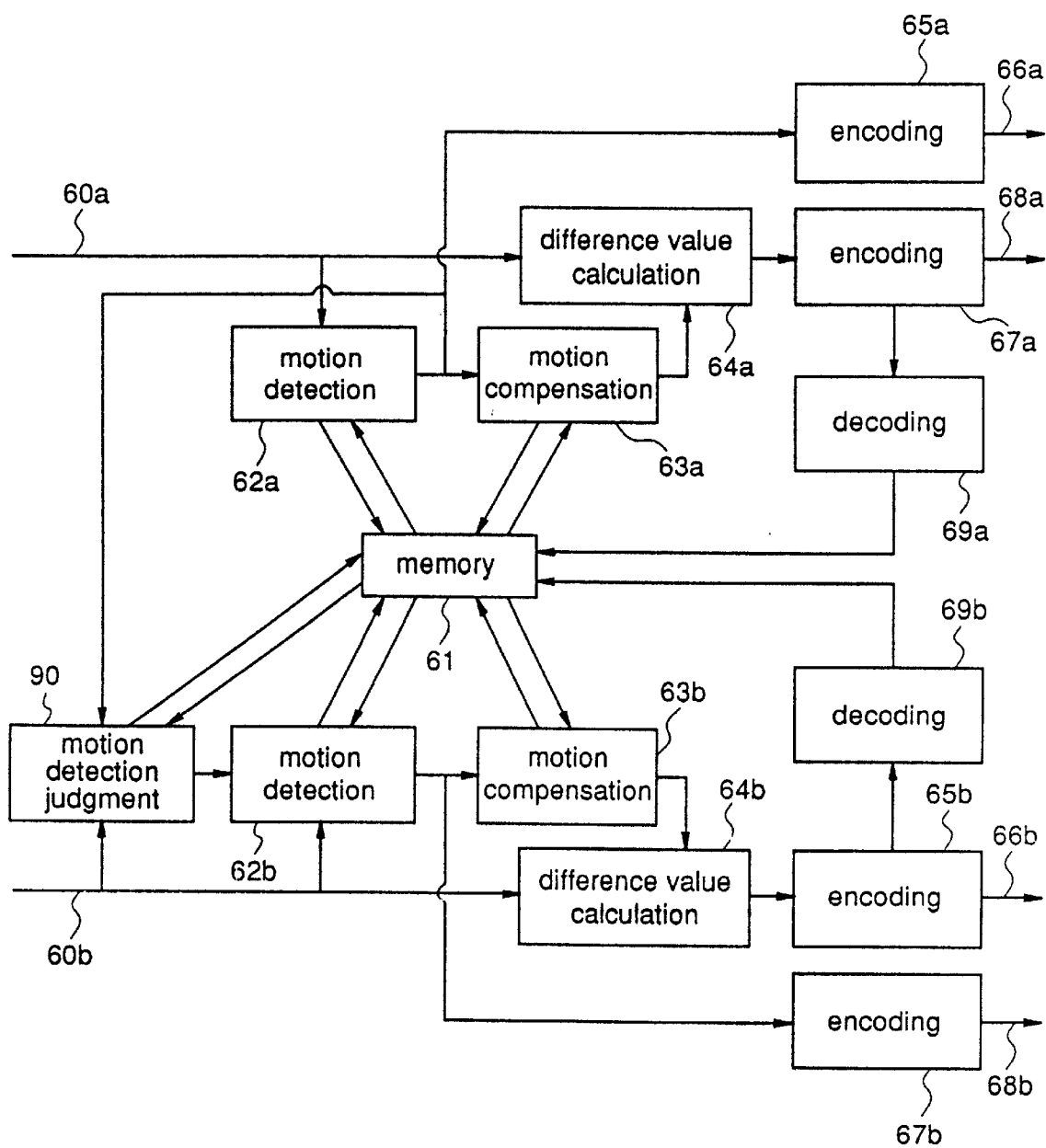
FIG. 20 is a block diagram showing the structure of an image encoding apparatus according to a 16th embodiment of this invention.

FIG. 20 is a block diagram showing the structure of the image encoding apparatus according to the 16th embodiment. In the figure, 90 indicates the motion detector judgment unit which receives the input shape signal 60b and the motion vectors of the pixel value signal output by the motion detector 62a, and judges the propriety of the motion compensation of the shape signal with the motion vector of the pixel value signal, and according to the judgment, outputs the instruction whether the motion detection will be performed or not, to the motion detector 62b.

The operation of the above-constructed image encoding apparatus according to the 16th embodiment is described. The processing of the pixel value signal 60a input to the image encoding apparatus according to the 16th embodiment, except for the point that the motion vector of the pixel value signal obtained in the motion detector 62a is also output to the motion detection judgment unit 90, is similar to the 13th embodiment, and thereby the encoded signal 66a of the motion vector of the pixel value signal and the encoded signal 68a of the difference value of the pixel value signal are obtained.

On the other hand, the input shape signal 60b is first input to the motion detection judgment unit 90. The motion detection judgment unit 90 performs the motion compensation of the input shape signal 60b using the motion vector of the input pixel value signal, and compares the motion-compensated shape signal with the input shape signal 60, and judges whether both the shape signals have agreement or not. Thereafter, if there exists agreement, the motion vector of the pixel value signal is output to the motion detector 61b, and the motion detector 61b does not perform the motion detection of the shape signal and the input motion vector of the pixel value signal is substituted for the motion vector of the shape signal. As opposed to this, if there does not exist agreement in the result of the comparison of the motion detection judgment 90, the motion detection judgment 90 outputs such an instruction to the motion detector 61b that the motion detector 61b performs the motion detection, and the motion vector is calculated by the motion detector 61b. For the shape signal, the remaining processes are similar to those of the 13th embodiment, and the encoded signals 66b and 68b are obtained.

As described above, the image encoding apparatus according to the 16th embodiment has the structure of the image encoding apparatus according to the 13th embodiment which is added to the motion detection judgment unit 90, and judges the propriety of the performance of the motion compensation of the input shape signal using the motion vector of the input pixel value signal, and if the result of the judgment is that it is possible, the motion detection for the input shape signal is not performed and thereby the omission of the calculation realizes the reduction of the processing load. If the result of the judgment is that it is impossible, the motion detection for the input shape signal is performed similarly to the 13th embodiment and thereby the encoding efficiency and picture quality of the encoded signal are not affected.

Note that, in the 16th embodiment, although the detection of the shape signal is not performed when the motion-compensated shape signal and the input shape signal have agreement, if the slight degradation of the encoding efficiency due to the increase in the motion compensation error is tolerable, it is also possible that the motion detection is not performed when the error due to the motion compensation in the judgment is equal to or smaller than the given value, and thereby a further reduction of the processing load can be realized.

Embodiment 17

Figure 21:
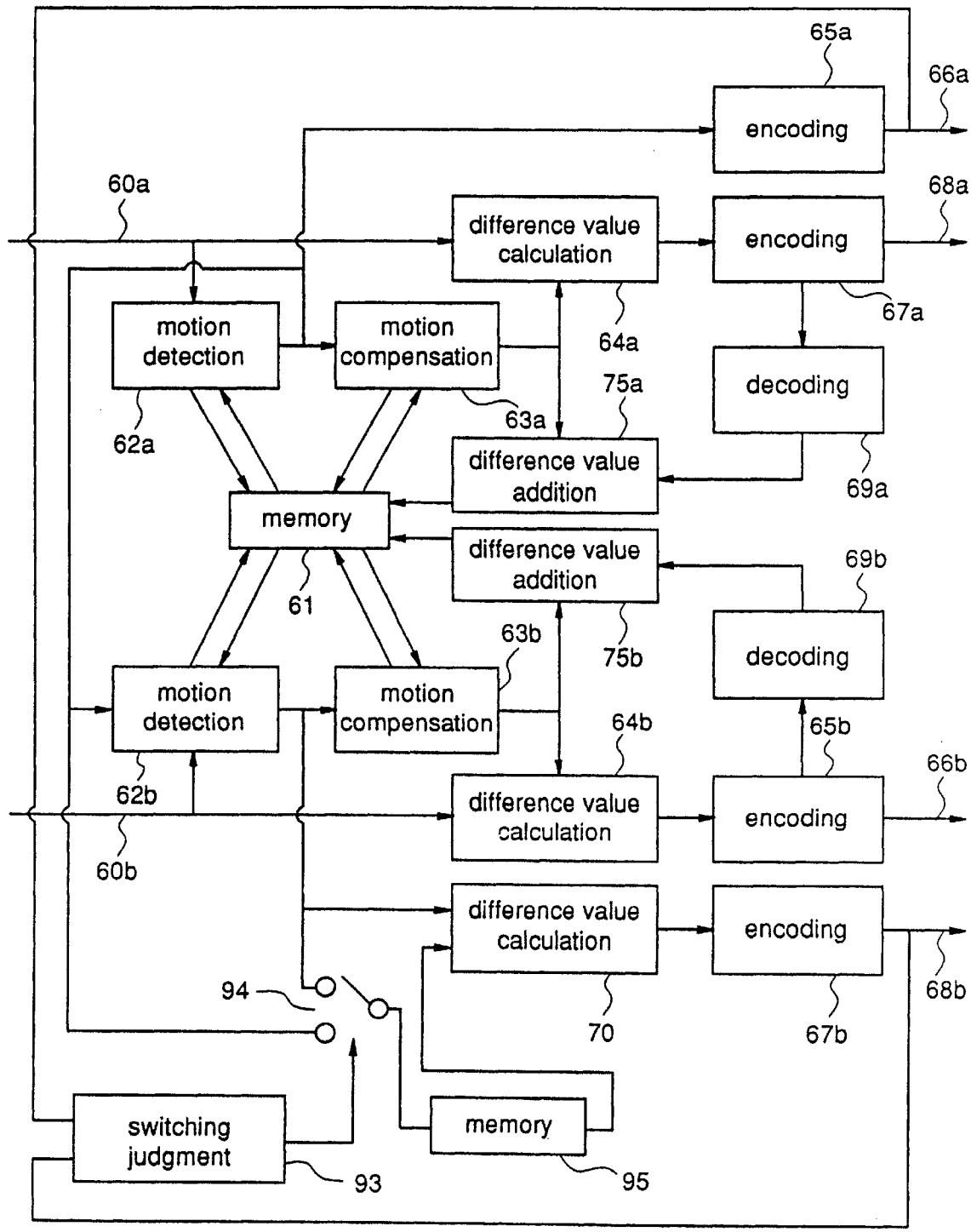
FIG. 21 is a block diagram showing the structure of an image encoding apparatus according to a 17th embodiment of this invention.

An image encoding apparatus according to a 17th embodiment, similar to the 13th to 16th embodiments, receives an image signal consisting of a shape signal and a pixel value signal as an input signal, and referring to a reference image, encodes this input signal. FIG. 21 is a block diagram showing the structure of the image encoding apparatus according to the 17th embodiment. In the figure, 93 indicates the switching judgment unit which receives the motion vectors of the pixel value signal and shape signal, and similarly to 16th embodiment, judges the propriety of the motion compensation of the shape signal using the motion vector of the pixel value signal, and according to the judgment, gives an instruction to the switching unit 94. The switching unit 94, according to the instruction of the switching judgment unit 93, switches the motion vector of the pixel value signal and the motion vector of the shape signal for the output to the difference value calculator 70. The memory 95 for the motion vector performs the temporal storage in order to input the motion vector output by the switching unit 94 to the difference value detector 70 after a delay. The other numerals are similar to those of FIG. 19, and the description is similar to that of the 15th embodiment.

The operation of the image encoding apparatus according to the 17th embodiment is similar to that of the 15th embodiment, except for that according to the judgment of the switching judgment unit 93, the two embodiments differ in the difference motion vector to be obtained by the difference value calculator 70, so the operation of that alone is described.

The switching judgment unit 93 receives and compares the encoded signal of the motion vector of the pixel value signal and the motion vector of the shape signal, both of which are of the immediately previous encoded input signal, and checks whether the motion vector of the shape signal of the immediately previous encoded input signal is already encoded or not. That is, by processing the immediately previous encoded input signal, it is checked whether the encoded signal of the difference motion vector obtained from the encoder 67b has been the difference vector between the motion vector of the pixel value signal and the motion vector of the shape signal, or the difference vector between the motion vectors of the shape signals. Thereafter, when the difference vector of the motion vectors of the shape signals has been encoded, by sending an instruction to the switching unit 94, the motion vector detected from the shape signal is input to the memory 95 for delay. Accordingly, in this case, the encoder 67b obtains the difference vector between the immediately previous encoded motion vector of the shape signal obtained from the memory 95 for delay and the motion vector detected from the input shape signal, and encodes the difference vector. On the other hand, when the difference vector between the motion vectors of the pixel value and shape signals of the immediately previous input signal has been encoded, by sending an instruction to the switching unit 94, similarly to the 15th embodiment, the difference vector of the motion vectors of both the signals is to be encoded.

As described above, the structure of the image encoding apparatus according to the 17th embodiment is based on the structure of the image encoding apparatus according to the 15th embodiment and is added to the switching judgment 93, the switching unit 94 and the memory 95 for delay, and thereby when the motion vector of the immediately previous shape signal is encoded, the difference vector between the motion vector and detected motion vector are obtained and encoded, and the encoding efficiency can be improved by utilizing the difference between the motion vectors of the shape signals which highly correlate.

Note that, in the 17th embodiment, although the judgment and the encoding of the difference vector are performed for the motion vector of the shape signal, the judgment and the encoding of the difference vector can be also performed for the motion vector of the pixel value signal, and similarly, an improvement of the encoding efficiency can be realized.

Embodiment 18

An image encoding apparatus according to an 18th embodiment of this invention receives image signals consisting of at least one of either the shape information or the transparency information, and the pixel information, as input image signals, and encodes the image signals according to the mode suitable for respective image signals.

Figure 22:
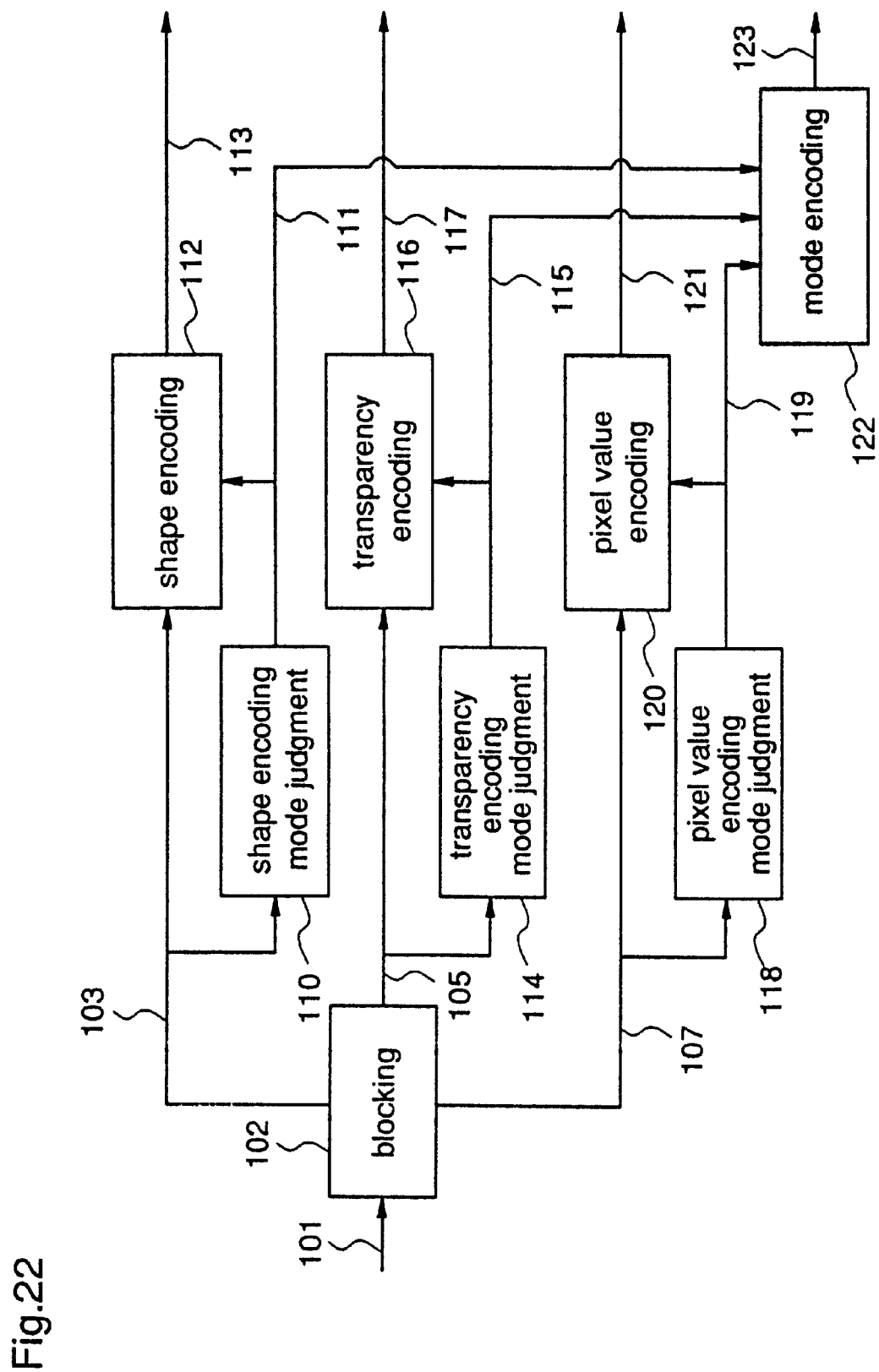
FIG. 22 is a block diagram showing the structure of an image encoding apparatus according to an 18th embodiment of this invention.

FIG. 22 is a block structure showing the structure of the image encoding apparatus according to the 18th embodiment. In the figure, 101 indicates the input image signal which consists of at least one of either the shape information or the transparency information, and the pixel information. 102 indicates the blocking unit which blocks the input image signal 101 and outputs the blocked shape signal 103, the blocked transparency signal 105 and the blocked pixel value signal 107. 110 indicates the shape encoding mode judgment unit, and 114 indicates the transparency encoding mode judgment unit, and 116 indicates the pixel value encoding mode judgment unit, which judges the respective encoding modes suitable for the shape signal 103, the transparency signal 105 and the pixel value signal 107, and outputs the shape encoding mode 111, the transparency encoding mode 115 and the pixel value encoding mode 119. 112 indicates the shape encoder, 116 indicates the transparency encoder and 120 indicates the pixel value encoder, all of which encode respective signals according to each judgment unit, and output the shape encoded signal 113, the transparency encoded signal 117 and the pixel value encoded signal 121, respectively. 122 indicates the mode encoder which collectively encodes all of the encoding modes 111, 115 and 119, and outputs the encoded mode signal 123.

The operation of the above-constructed image encoding apparatus according to the 18th embodiment is explained. Initially, the input image signal 101 consisting of the shape information, the transparency information and the pixel value information is input to the image encoding apparatus according to the 18th embodiment. Here, the transparency information and the shape information are explained referring to FIG. 53 used in the Prior Art section. The transparency information represents the ratio of each pixel to be synthesized when the image shown in FIG. 53(*a*) is combined with another image, and basically is multi-valued information such as what is shown in FIG. 53(*d*). The shape information is two-valued information such as what is shown in FIG. 53(*c*), which is two-valued transparency information with 0 and non-0 indicating that the object "exists/non-exists". Note that when the transparency information has only two of the perfect transparency and the perfect opacity, the information can be represented only by the shape signal as described above and thereby the transparency information is not required. Accordingly, in this case, only the shape information and the pixel value information are encoded or decoded.

The blocking unit 102 blocks the input image signal 101 by integrating a plurality of pixels based on the corresponding relation between the pixels of the shape information transparency information and the pixel value information, and outputs the blocked shape signal 103, the blocked transparency signal 105 and the blocked pixel value signal 107. The shape signal 103 is output to the shape encoding mode judgment unit 110 and the shape encoder 112, and the transparency signal 105 is output to the transparency encoding mode judgment unit 114 and the transparency encoder 116, and the pixel value signal 107 is output to the pixel value encoding mode judgment unit 118 and the pixel value encoder 120.

The shape encoding mode judgment unit 110, the transparency encoding mode judgment unit 114 and the pixel value encoding mode judgment unit 118 judge suitable encoding modes for the input shape signal 103 respectively, the transparency signal 105 and the pixel value signal 107 respectively, and output the shape encoding mode 111, the transparency encoding mode 115 and the pixel value encoding mode 119. Each encoding mode is output to each encoding mode unit, and to the mode encoding unit 122.

The shape encoder 112, the transparency encoder 116 and the pixel value encoder 120 output the respective input signals according to each of the input encoding modes, and output the shape encoded signal 113, the encoded transparency signal 117 and the encoded pixel value signal 121. On the other hand, the mode encoder 122 collectively encodes all of the input encoding modes, and outputs the encoded mode signal 123. The shape encoded signal 113, the encoded transparency signal 117, the encoded pixel value signal 121 and the encoded mode signal 123 are the encoded outputs of the image encoding apparatus according to the 18th embodiment.

As described above, the encoded outputs of the image encoding apparatus according to the 18th embodiment has the blocking unit 101 which blocks the input image signal and separates the input image signal into the shape signal, the transparency signal and the pixel value signal and outputs these signals, and the encoding mode judgment units 110, 114 and 118 which judge the respective encoding modes suitable for each signal, and the encoder 112, 116 and 120 which encode each signal according to each encoding mode, and the mode encoder 122 which collectively encodes all of the encoding modes, and thereby it is possible that the encoding is performed according to the mode suitable for each separated signal and all of the information related to the selected mode is collectively encoded. Since the shape information, the transparency information and the pixel value information often have mutual correlation, the same encoding mode is likely to be selected. Therefore, by performing the variable-length encoding wherein the codes given the same mode are to have the short code length, which results in the possible reduction of the bit number of the encoded signal.

Embodiment 19

An image encoding apparatus according to a 19th embodiment of this invention receives image signals consisting of at least one of either the shape information or the transparency information, and the pixel information, as input image signals, and encodes the image signals according to the respective modes suitable for each image signal.

Figure 23:
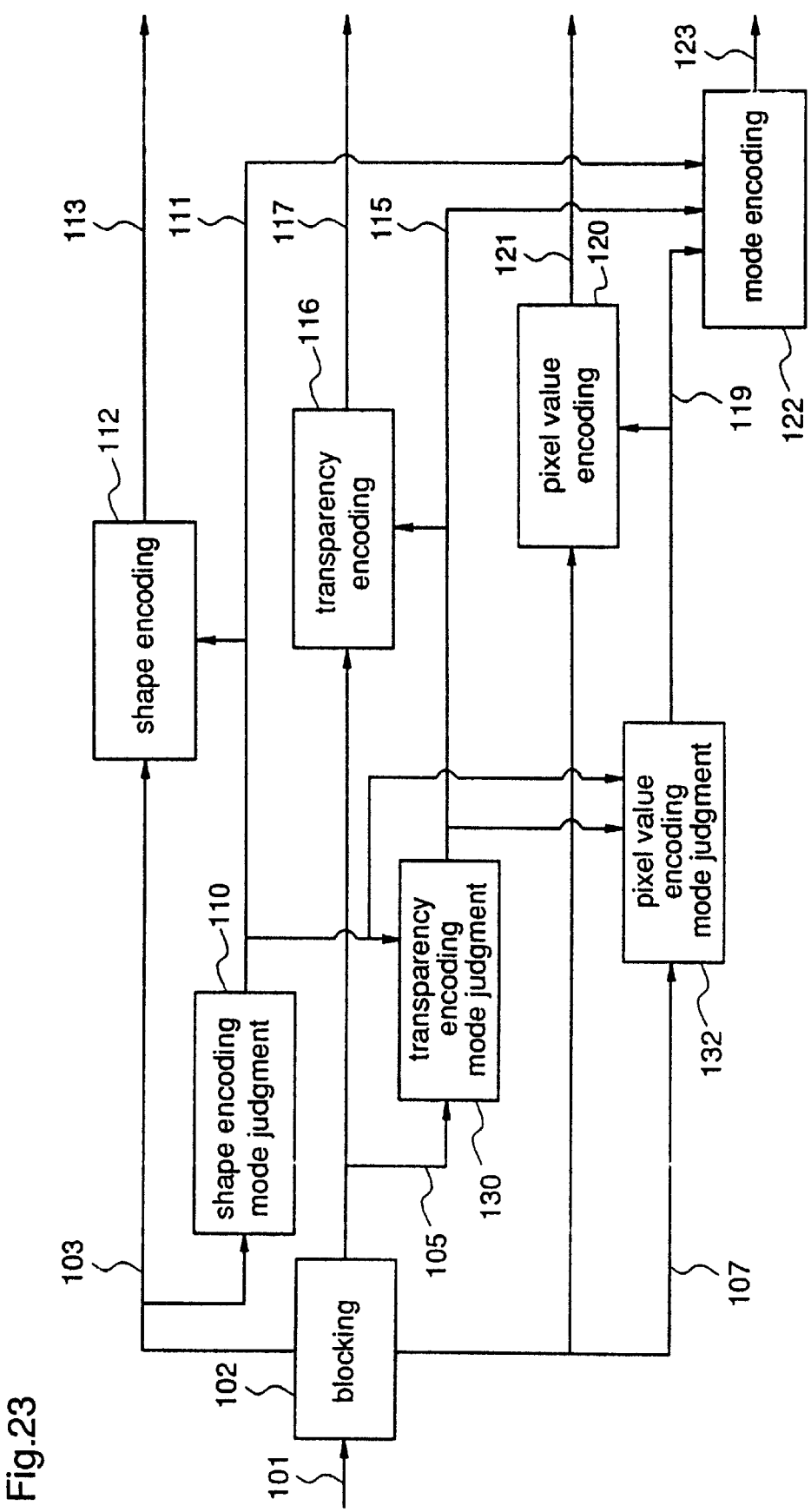
FIG. 23 is a block diagram showing the structure of an image encoding apparatus according to a 19th embodiment of this invention.

FIG. 23 is a block structure showing the structure of the image encoding apparatus according to the 19th embodiment. In the figure, the shape encoding mode judgment unit 110 judges the encoding mode suitable for the shape signal 103, and outputs the result of the judgment as the encoding mode to the shape encoder 112 and the mode encoder 122, and also to the transparency encoding mode judgment 130 and the pixel value encoding mode judgment unit 132. Thereafter, the transparency encoding mode judgment 130 carries out judgment, referring to the input shape encoding mode 111, and outputs the result of the judgment as the encoding mode to the transparency encoder 116 and the mode encoder 122, and also to the pixel value encoding mode judgment unit 132. The pixel value encoding mode judgment unit 132 carries out judgment, referring to the input shape encoding mode 111 and the transparency encoding mode 115.

The operation of the image encoding apparatus according to the 19th embodiment is similar to that of the 18th embodiment except the judgments of the respective mode judgment units, and similarly, outputs the shape encoded signal 111, the encoded transparency signal 117, the encoded pixel value signal 121 and the encoded mode signal 123.

As described above, the image encoding apparatus according to the 19th embodiment has the transparency encoding mode judgment unit 130 which judges the encoding mode of the transparency signal with reference to the shape encoding mode, and the pixel value encoding mode judgment unit 132 which judges the encoding mode of the pixel value signal with reference to both the shape encoding mode and the transparency encoding mode, and thereby the selected modes are likely to be the same. Accordingly, in the mode encoder 122 in which a shorter code is given in the case that the modes are the same, the efficiency of the variable-length encoding can improve more than in the 18th embodiment and can reduce the bit number of the encoded mode signal, which is the obtained result.

Embodiment 20

An image encoding apparatus according to a 20th embodiment improves the encoding efficiency of the encoded mode signal, similarly to that of the 19th embodiment.

Figure 24:
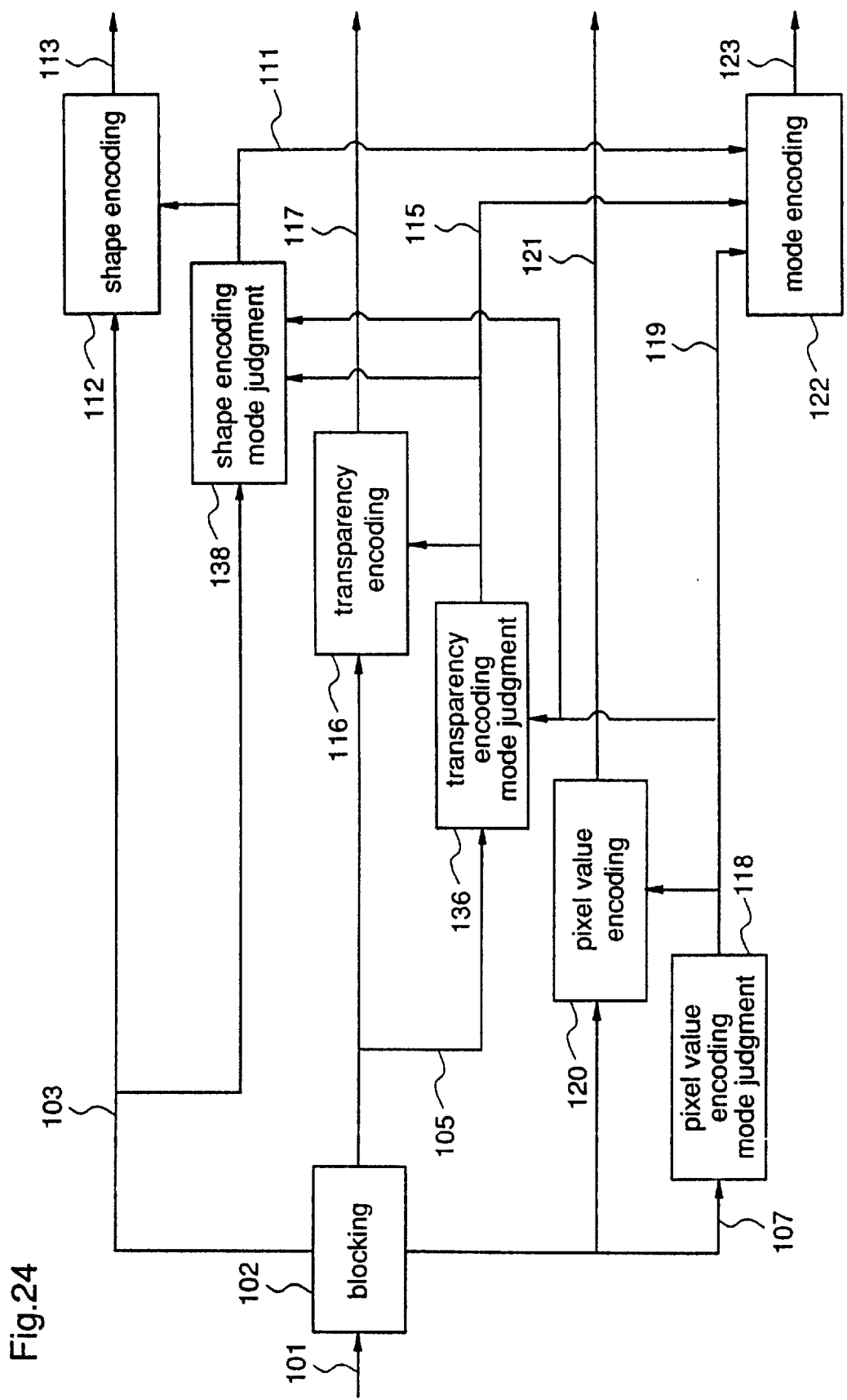
FIG. 24 is a block diagram showing the structure of an image encoding apparatus according to a 20th embodiment of this invention.

FIG. 24 is a block structure showing the structure of the image encoding apparatus according to the 20th embodiment. In the figure, the pixel value encoding mode judgment unit 118 judges the encoding mode suitable for the pixel value signal 107, and outputs the result of the judgment as the encoding mode to the pixel value encoder 120 and the mode encoder 122, and also to the transparency encoding mode judgment 136 and the shape encoding mode judgment unit 138. Thereafter, the transparency encoding mode judgment 136 carries out judgment, referring to the input pixel value encoding mode 119, and outputs the result of the judgment as the encoding mode to the transparency encoder 116 and the mode encoder 122, and also to the shape encoding mode judgment unit 138. The shape encoding mode judgment unit 138 carries out judgment, referring to the input pixel value encoding mode 119 and the transparency encoding mode 115.

The operation of the image encoding apparatus according to the 20th embodiment is similar to that of the 18th embodiment except the judgments of the respective mode judgment units, and similarly, outputs the shape encoded signal 113, the encoded transparency signal 117, the encoded pixel value signal 121 and the encoded mode signal 123.

As described above, the image encoding apparatus according to the 20th embodiment has the transparency encoding mode judgment unit 136 which judges the encoding mode of the transparency signal with reference to the pixel value encoding mode, and the shape encoding mode judgment unit 138 which judges the encoding mode of the shape signal with reference to both the pixel value encoding mode and the transparency encoding mode, and thereby the selected modes are likely to be the same. Accordingly, in the mode encoder 122 in which shorter codes are given in the case that the modes are the same, the efficiency of the variable-length encoding can improve more than in the 18th embodiment and can reduce the bit number of the encoded mode signal, which is the obtained result.

Embodiment 21

An image decoding apparatus according to a 21st embodiment of this invention appropriately encodes the encoded signal encoded by the image encoding apparatus according to the 18th embodiment.

Figure 25:
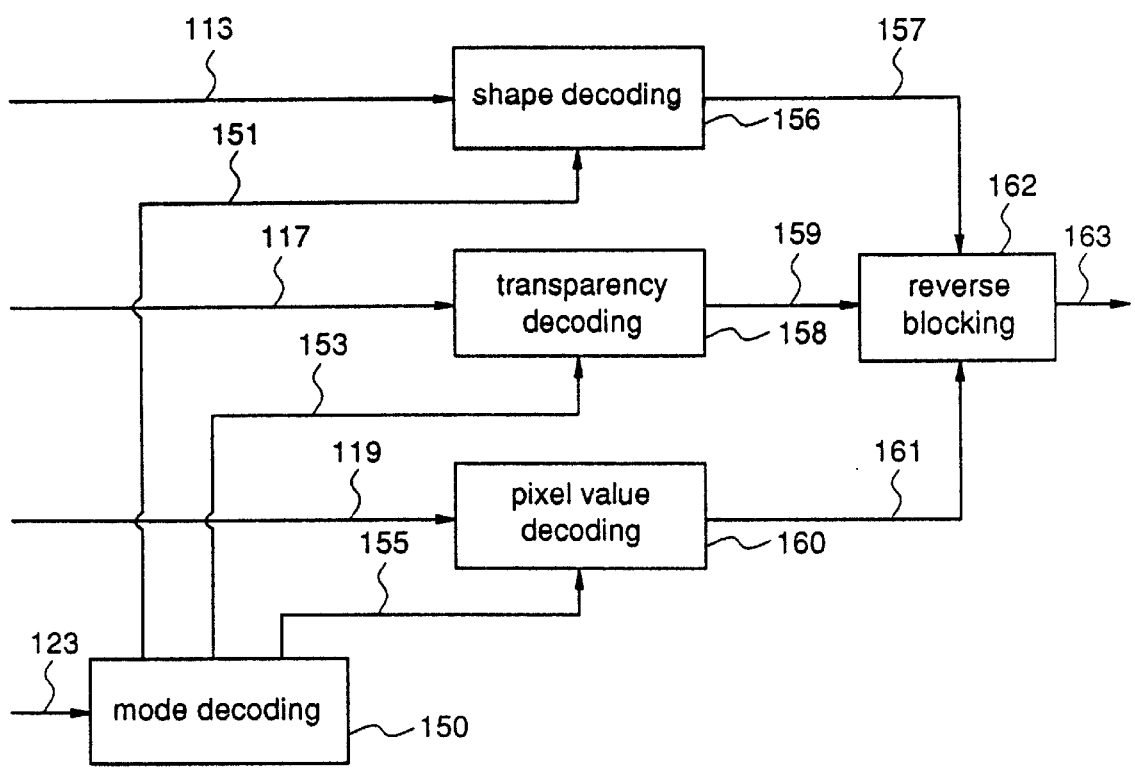
FIG. 25 is a block diagram showing the structure of an image decoding apparatus according to a 21st embodiment of this invention.

FIG. 25 is a block structure showing the structure of the image decoding apparatus according to the 21st embodiment. In the figure, input signals 113, 117, 119 and 123 are the shape encoded signal 113, the encoded transparency signal 117, the encoded pixel value signal 119 and the encoded mode signal 123, respectively, all of which are output by the image encoding apparatus according to the 18th embodiment. 150 indicates the mode decoder which decodes the encoded mode signal 123, and outputs the shape encoding mode 151, the transparency encoding mode 153, and the pixel value encoding mode 155. 156 indicates the shape decoder, 158 indicates the transparency decoder and 160 indicates the pixel value decoder, which encode the shape encoded signal 113, the encoded transparency signal 117 and the. encoded pixel value signal 119, respectively, according to the encoding modes input from the mode decoder 150, and output the decoded shape signal 157, the decoded transparency signal 159 and the decoded pixel value signal 161, respectively. 162 indicates the reverse blocking unit which receives and integrates the decoded shape signal 157, the decoded transparency signal 159 and the decoded pixel value signal 161, and outputs the decoded image signal 163.

The operation of the above-constructed image decoding apparatus according to the 21st embodiment is described. The image decoding apparatus according to the 21st embodiment receives the shape encoded signal 113, the encoded transparency signal 117, the encoded pixel value signal 119 and the encoded mode signal 123, to be output into the shape decoder 156, the transparency decoder 158, the pixel value decoder 160 and the mode decoder 150, respectively.

The mode decoder 150 decodes the encoded mode signal 123, and outputs the shape encoding mode 151, the transparency encoding mode 153, and the pixel value encoding mode 155 into the shape decoder 156, the transparency decoder 158 and the pixel value decoder 160, respectively. The shape decoder 156, the transparency decoder 158 and the pixel value decoder 160 decode the input encoded signals according to the input encoding mode respectively, and output the decoded shape signal 157, the decoded transparency signal 159 and the decoded pixel value signal 161 into the reverse blocking unit 162. The reverse blocking unit 162 integrates the input decoded signals and outputs the decoded image signal 163.

As described above, the image decoding apparatus according to the 21st embodiment has the mode decoder 150, the shape decoder 156, the transparency decoder 158, the pixel value decoder 160 and the reverse blocking unit 162, and thereby appropriately decodes the encoded signal obtained by the image encoding apparatus according to the 18th embodiment, and performs the integration, and can obtain the decoded image signal 163.

Note that, in the image decoding apparatus according to the 21st embodiment, although the encoded signal obtained by the image encoding apparatus according to the 18th embodiment, the encoded signals obtained by the image encoding apparatuses according to the 19th and 20th embodiments can be also appropriately decoded.

Embodiment 22

An image encoding apparatus according to a 22nd embodiment of this invention performs encoding of an input signal, switching the intra-/inter-frame encodings adaptable to the input signal.

Figure 26:
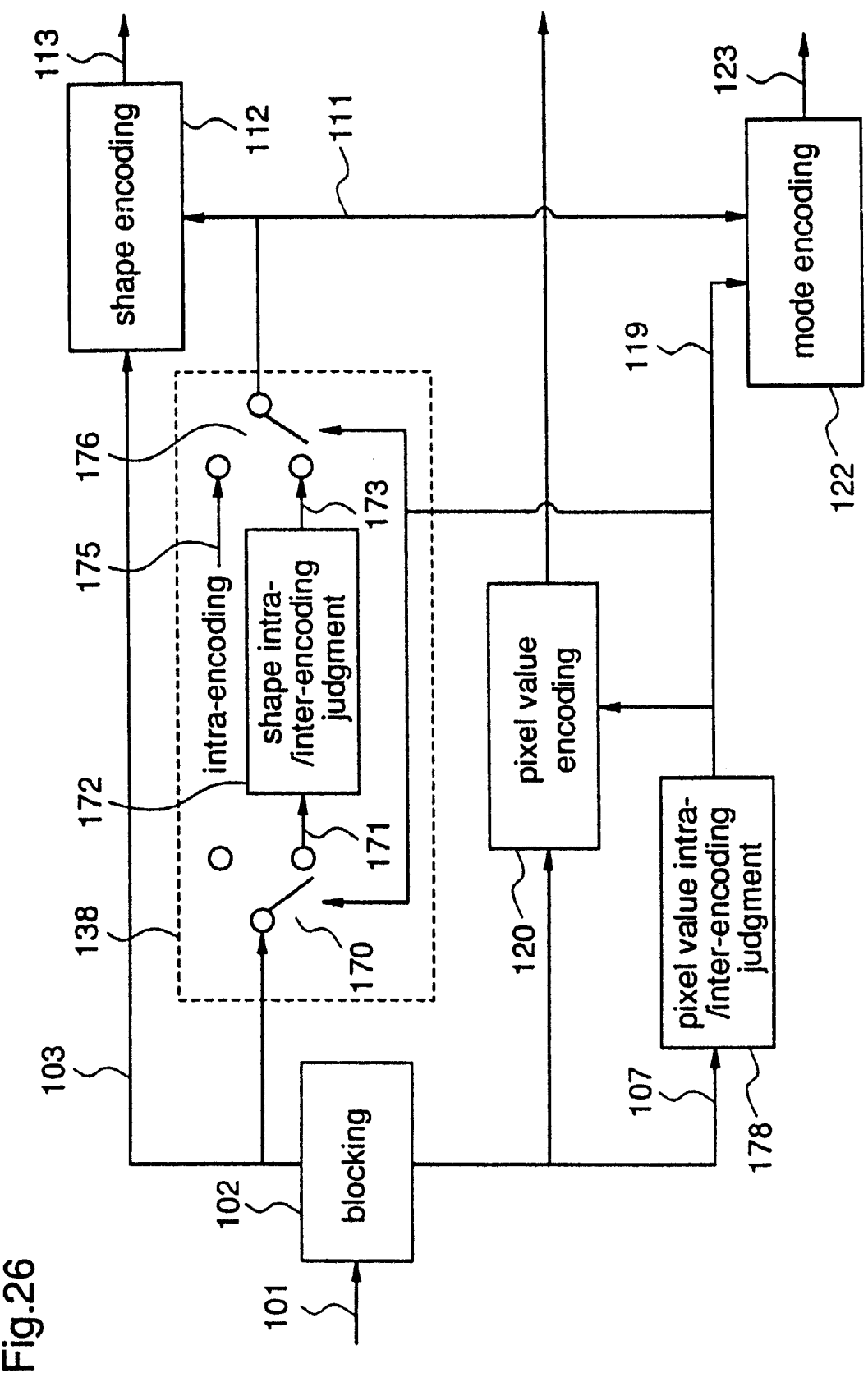
FIG. 26 is a block diagram showing the structure of an image encoding apparatus according to a 22nd embodiment of this invention.

FIG. 26 is a block structure showing the structure of the image encoding apparatus according to the 22nd embodiment. In the figure, 178 indicates an intra-/inter-frame encoding judgment unit of the pixel encoding which judges the intra- or inter- for the encoding mode of the pixel value signal, and outputs the encoding mode 119 of the pixel value signal. 138 indicates the shape encoding mode judgment unit which corresponds to the shape encoding mode judgment unit in the 20th embodiment indicated by 138 in FIG. 24. 170 and 176 indicate the switches which are switched according to the output of the judgment unit 178 and decide the encoding mode of the shape signal. 172 indicates the intra-/inter-frame encoding judgment unit which judges the intra- or inter- for the encoding mode of the shape signal, and outputs the encoding mode 173 of the shape signal. The other numerals are similar to those in FIG. 22, and the description is similar to that of the 18th embodiment.

A description is given of the above-constructed image encoding apparatus according to the 22nd embodiment. Initially, the input image signal 101 is input to the image encoding apparatus according to the 22nd embodiment, and then the blocking unit 102, similarly to the 18th embodiment, performs the blocking and the signal separation, and outputs the pixel value signal and the shape signal.

When the separated pixel value signal 107 is input to the intra-/inter-frame encoding judgment unit of the pixel value encoding, the judgment unit 178 judges whether the encoding is performed by the intra-frame encoding or inter-frame encoding, and outputs the result of the judgment as the pixel value encoding mode indicating "intra" or "inter" to the pixel value encoder 120, the mode encoder 122 and the shape encoding mode judgment 138.

In the shape encoding mode judgment unit 138, the switch 170 and 176 are switched according to the pixel value encoding mode 119. The switching is performed in such a manner that the judgment unit 172 does not receive the input when the pixel value encoding mode indicates "intra", while the judgment unit 178 receives the input when the pixel value encoding mode indicates "inter". Accordingly, when the pixel value encoding mode 119 indicates the intra-frame encoding, the shape judgment mode 111 indicating the intra-frame encoding is output from the judgment unit 138.

On the other hand, when the pixel value encoding mode 119 indicates the inter-frame encoding, the intra-/inter-frame encoding judgment unit 172 judges whether the encoding of the particular shape signal is performed by the intra-frame encoding or the inter-frame encoding for the shape signal 105, and outputs the result of the judgment as the shape encoding mode 111.

In either of the cases, the shape encoding mode 111 is output to the shape encoder 112 and the mode encoder 122. And, the operations of the pixel value encoder 120, the shape encoder 112 and the mode encoder 122 are similar to those of the 18th embodiment, all of which output respective encoded signals.

As will be apparent from the above-described operation, in the image encoding apparatus according to the 22nd embodiment, when the pixel value signal is intra-frame encoded, the shape signal is always intra-frame encoded. In general, since when the pixel values do not have agreement, the shapes do not have agreement, either, and therefore when the pixel value signal should be intra-frame encoded; that is, the pixel value signal has a small temporal correlation, even if the number of the encoding mode for encoding, the shape signal is restricted similarly to the 22nd embodiment, the encoding efficiency in encoding the shape signal is scarcely degraded.

Also, there is the case that the pixel values to be synthesized will change though the shape signal in the synthesis is constant such as like a fixed picture(synthesized picture) and the like, and in this case, even if the inter-frame encoding is selected according to the pixel value signal, the inter-frame encoding for the shape signal is not always appropriate. In the image encoding apparatus according to the 22nd embodiment, when the inter-frame encoding is selected for the pixel value signal, which of the intra-/inter-frame encodings to be selected is judged and thereby it is also possible to select the intra-frame encoding for the shape signal, and therefore it is possible to prevent the encoding efficiency from seriously degrading due to the inappropriate inter-frame encoding for encoding the shape signal.

Also, when at least either the shape signal or the pixel value signal is inter-frame encoded, a lot of additional information is required for the motion compensation and so on to be carried out in the inter-frame encoding. In the image encoding apparatus according to the 22nd embodiment, there is no case that only the shape signal is inter-frame encoded, so that when the intra-frame encoding is selected for the pixel value signal, the bit number can be saved. Generally, the above-mentioned additional information has the smaller bit number than when the pixel value signal is intra-frame encoded, but if compared to the bit number required for intra-frame encoding the shape signal, the bit number is of an amount that can not be ignored and this has a big effect.

As described above, the image encoding apparatus according to the 22nd embodiment has the intra-/inter-frame encoding judgment unit 178 for the pixel value signal and the shape encoding mode judgment unit 138 containing the intra-/inter-frame encoding judgment unit 172 for the shape signal, and thereby the intra-frame encodes the encoding mode of the shape signal when the encoding mode of the pixel value signal is the intra-frame encoding, while judges and selects the encoding mode for the shape signal when the encoding mode of the pixel value signal is the inter-frame encoding, which causes the correlation between the encoding mode 119 for the pixel value signal and the encoding mode 111 for the shape signal to be higher and thereby realizes the reduction of the bit number of the encoded mode signal, and makes it possible that the bit number of the additional information for the motion compensation is reduced as a result of the prevention of the choice for carrying out inter-frame encoding.

Embodiment 23

An image encoding apparatus according to a 23rd embodiment of this invention performs the encoding of the input signal, switching the number of the motion vectors in encoding adapting to the input signal.

Figure 27:
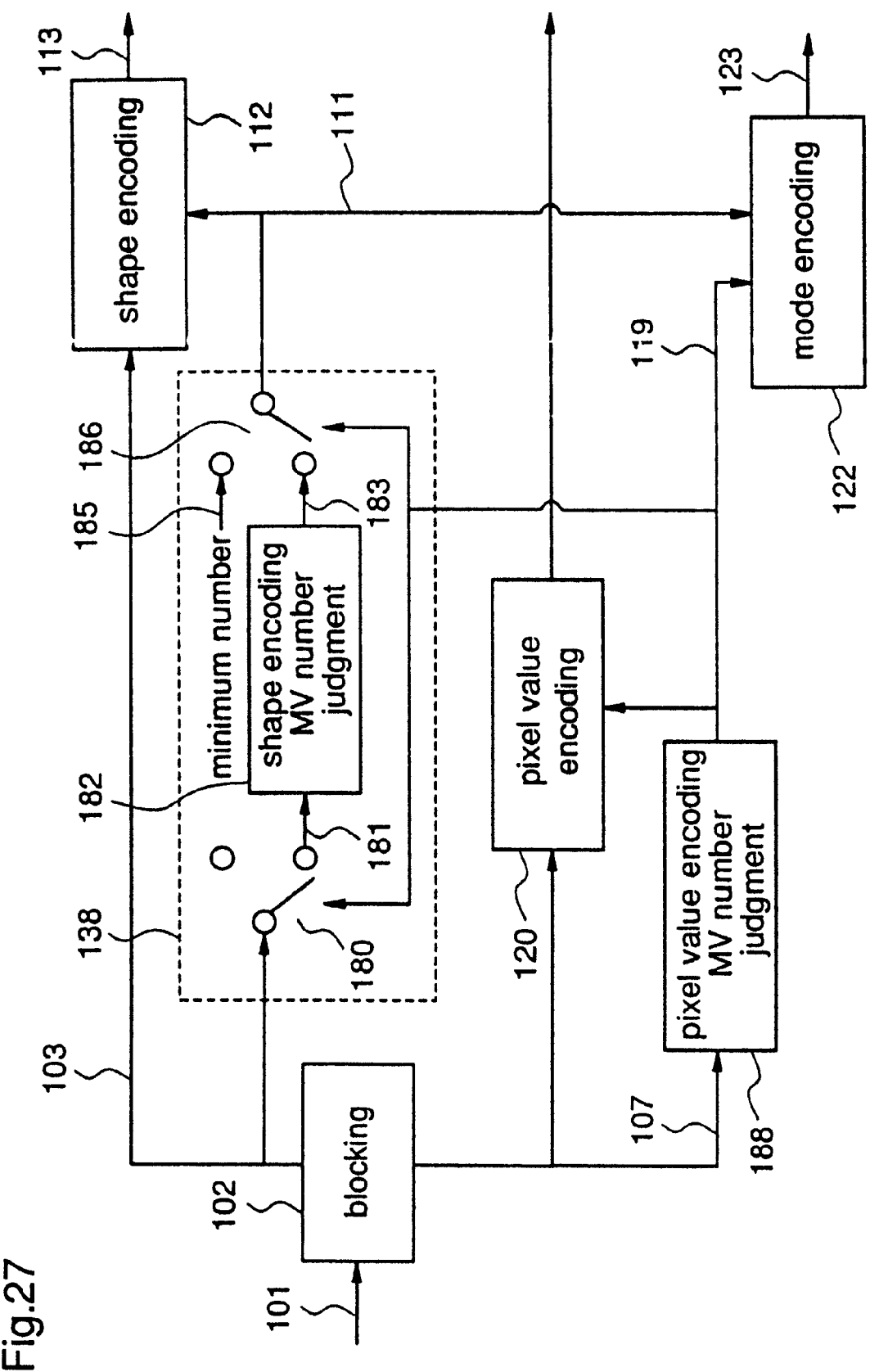
FIG. 27 is a block diagram showing the structure of an image encoding apparatus according to a 23rd embodiment of this invention.

FIG. 27 is a block structure showing the structure of the image encoding apparatus according to the 23rd embodiment. In the figure, 188 indicates the motion vector number judgment unit for encoding the pixel value, which judges what number of motion vectors should be and outputs the encoding mode 119 for the pixel value signal. 138 indicates the shape encoding mode judgment unit which corresponds to the shape encoding mode judgment unit according to the 20th embodiment indicated by 138 in FIG. 24. 180 and 186 are switches which switch according to the output of the judgment unit 188 and determine the encoding mode for the shape signal. 182 indicates the motion vector number judgment unit for encoding the shape, which judges what number of motion vectors should be and outputs the encoding mode 183 for the shape signal according to the result of the judgment. The other encodings are similar to those in FIG. 22, and the description is similar to that for the 18th embodiment.

The description is given of the image encoding apparatus according to the 23rd embodiment as constructed above. Initially, the image encoding apparatus according to the 23rd embodiment receives the input image signal 101, and the blocking unit 102, similar to the 18th embodiment, performs the blocking and separation of the signal and outputs the pixel value signal and the shape signal.

The motion vector number judgment unit 188 for encoding the pixel value receives the separated pixel value signal 107, and then judges the signal to be encoded for what number of the motion vectors for the pixel value signal 107 is, and then outputs the result of the judgment as the pixel value encoding mode 119 to the pixel value encoder 120, the mode encoder 122 and the shape encoding mode judgment 138.

Figure 28:
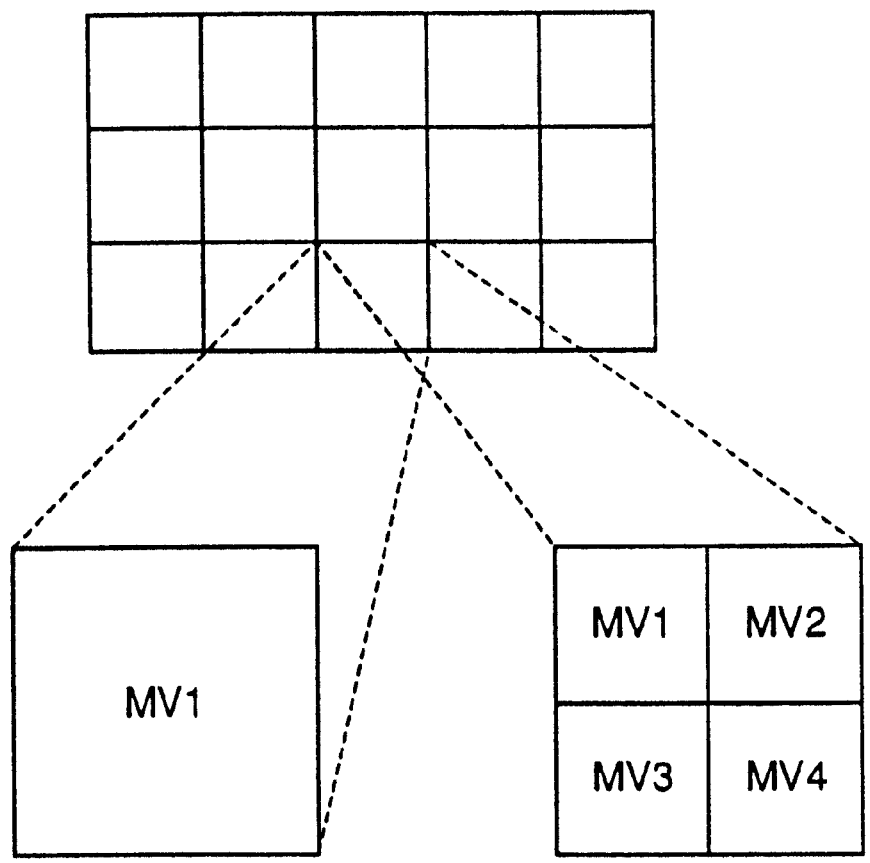
FIG. 28 is a block diagram showing how the number of motion vectors is selected in an image encoding apparatus according to a 23rd embodiment of this invention.
Figure 29:
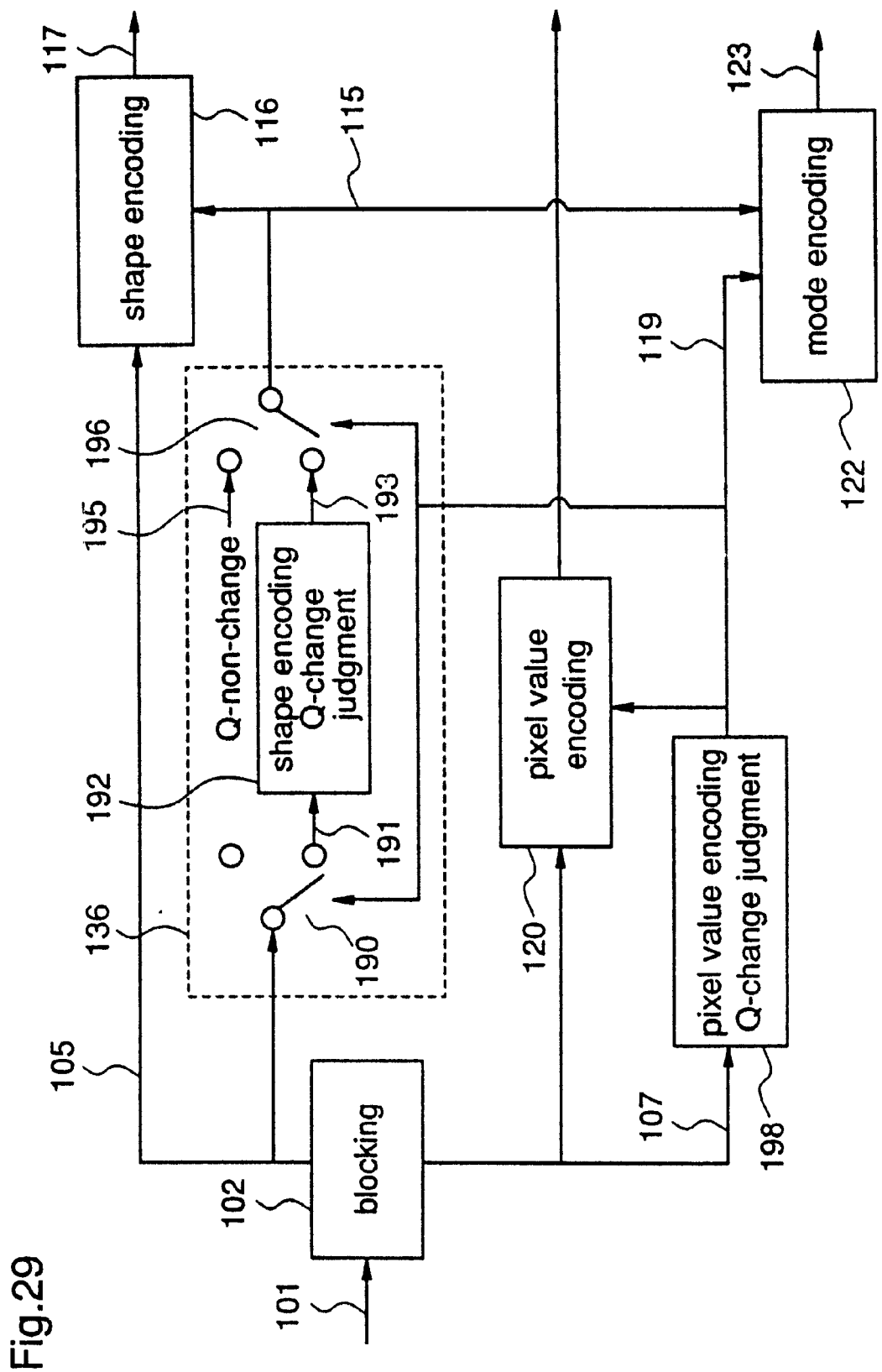
FIG. 29 is a block diagram showing the structure of an image encoding apparatus according to a 24th embodiment of this invention.

FIG. 28 is a drawing for explaining the number of the motion vectors. Since the motion is complicated in the vicinity of the contour of an object, it is very difficult to sufficiently reduce the motion compensation error by employing one motion vector(MV) per block. In this case, it is known that it is desirable to divide the block, and then give the divided blocks to the motion vectors, and this changing of the number of the motion vectors adaptively according to the nature of the image improves the encoding efficiency. Accordingly, the image encoding apparatus according to the 23rd embodiment adaptively switches the motion compensation with the use of one motion vector(MV1) per block as shown in the figure and the motion compensation with the use of a total of 4 pieces of motion vectors(MV1,MV2, MV3,MV4) which are given respectively to one of the divided blocks which the particular block is divided into. Therefore, the judgment unit 188 judge whether the number of the motion vectors is 1 piece or 4 pieces, and outputs "1" or "4" as the encoding mode for encoding the pixel value.

In the shape encoding mode unit 138, the switches 180 and 186 are switched according to the pixel value encoding mode. The switching is performed so that the judgment unit 182 can't receive the input when the pixel value encoding mode indicates "1", while the judgment unit 182 can receive the input when the pixel value encoding mode indicates "4". Accordingly, when the pixel value encoding mode 119 is "1", the minimum number "1" of the motion vectors as the shape judgment mode 111 is output.

On the other hand, when the pixel value encoding mode 119 indicates "4", the motion vector number judgment unit 182 judges whether the number of the motion vectors should be 1 piece or 4 pieces for the shape signal 105, and outputs the result of the judgment as the shape encoding mode 111.

In either of the cases, the shape encoding mode 111 is output to the shape encoder 112 and the mode encoder 122. And, the operations of the pixel value encoder 120, the shape encoder 112 and the mode encoder 122 are similar to those of the 18th embodiment, and the respective encoded signals are output.

As a result of the above-described operation, in the image encoding apparatus according to the 23rd embodiment, when the pixel value signal is encoded using the minimum number of the motion vectors, the shape signal is always encoded using the minimum number of the motion vectors. As the number of the motion vectors is increased, the information required for encoding the motion vectors adversely becomes larger. In this case, by the reduction of the number of the motion vectors for encoding the shape signal, an increase of the load is prevented.

As described above, the image encoding apparatus according to the 23rd embodiment has the motion vector number judgment unit 188 for encoding the pixel value and shape encoding mode judgment unit 138 containing the motion vector number judgment unit 182 for encoding the shape. Thereby when the encoding mode for the pixel value signal uses the minimum number of motion vectors the encoding mode for the shape signal uses the minimum number. And when the encoding mode for the pixel value signal uses a lot of motion vectors the encoding mode for the shape signal is judged and then selected. This causes the correlation between the encoding mode 119 for the pixel value signal and the encoding mode 111 for the shape signal and makes it possible that the bit number of the encoded mode signal is reduced, and which causes the prevention of the selection when the number of the motion vectors is increased and thereby makes it possible that the bit number is prevented from increasing due to the increase in the additional information.

Embodiment 24

An image encoding apparatus according to a 24th embodiment of this invention performs encoding of the input signal, switching the changing and non-changing of the quantizing step adapting to the input signal.

FIG. 27 is a block structure showing the structure of the image encoding apparatus according to the 24th embodiment. In the figure, 198 indicates the quantizing step change/non-change judgment unit for encoding the pixel value which judges whether the quantizing step is performed or not for the encoding mode for the pixel value signal, and outputs the encoding mode 119 for the pixel value signal. 138 indicates the shape encoding mode judgment unit which corresponds to the shape encoding mode judgment unit according to the 20th embodiment indicated by 138 in FIG. 24. 190 and 196 indicate the switches which are switched according to the output of the judgment 198 and determine the encoding mode for the shape signal. 192 indicates the quantizing step change/non-change judgment unit for encoding the shape which judges whether or not the quantizing step is performed for the encoding mode for the shape signal, and outputs the encoding mode 113 for the shape signal depending on the result of the judgment. The other encodings are similar to those in FIG. 22, and the description is similar to that for the 18th embodiment.

The description is given of the image encoding apparatus according to the 24th embodiment as constructed above. Initially, the image encoding apparatus according to the 24th embodiment receives the input image signal 101, and the blocking unit 102, similar to the 18th embodiment, performs the blocking and separation of the signal and outputs the pixel value signal and the shape signal.

The quantizing step change/non-change judgment unit 198 receives the separated pixel value signal 107, and then judges whether or not the quantizing step is performed for the pixel value signal 107, and then outputs the result of the judgment as the pixel value encoding mode 119 to the pixel value encoder 120, the mode encoder 122 and the shape encoding mode judgment 138.

In the shape encoding mode unit 138, the switches 190 and 196 are switched according to the pixel value encoding mode. The switching is performed so that the judgment unit 192 can't receive the input when the pixel value encoding mode indicates "non-change", while the judgment unit 192 can receive the input when the pixel value encoding mode indicates "change". Accordingly, when the pixel value encoding mode 119 indicates that the quantizing step is not changed, the shape judgment mode 111 indicating "non-change" is output.

On the other hand, when the pixel value encoding mode 119 indicates that the quantizing step is changed, the judgment unit 192 judges whether or not the quantizing step is performed for the shape signal 105, and outputs the result of the judgment as the shape encoding mode 111.

In either of the cases, the shape encoding mode 111 is output to the shape encoder 112 and the mode encoder 122. And, the operations of the pixel value encoder 120, the shape encoder 112 and the mode encoder 122 are similar to those of the 18th embodiment, and the respective encoded signals are output.

Since the value of the quantizing step is directly related to the compression rate, namely the transmission rate of encoded signals, generally, in order that the transmission rate or recording rate of the encoded signal into which the image is encoded should be constant, the quantizing step is coarsely controlled if the transmission rate is equal to or larger than the given value, while the quantizing step is finely controlled if the transmission rate is less than the given value. And, since the value of the quantizing step also directly influences the picture quality of the encoded signal, when the image is one in which there exist step-like changes of the pixel values, as the degradation of the picture quality in the amplitude direction is difficult to be visually detected, it is possible to make the compression rate higher by making the quantizing step larger. In this case, the changing of the quantizing step is usually performed according to the change of the pixel value.

When control of the changing of the quantizing step as described above is performed, the information indicating "the quantizing step has been changed" is added to each block and encoded along with the image data. However, it is often that the change of the quantizing step should be performed in such a manner that the pixel value signal and the shape signal are simultaneously changed, so that when the quantizing step for the pixel value signal is not changed, even if the change of the quantizing step for the shape signal is prevented, the degradation of the picture quality caused by the restriction is small, meanwhile the additional information indicating the change of the quantizing step is reduced to a large extent.

As described above, the image encoding apparatus according to the 24th embodiment has the quantizing step change/non-change judgment unit 198 for encoding the pixel value, and the shape encoding mode judgment unit 138 containing the quantizing step change/non-change judgment unit 192 for encoding the shape, and thereby when the encoding mode for the pixel value signal is "quantizing step non-change", the encoding mode for the shape signal is "quantizing step non-change", while when the encoding mode for the pixel value signal is "quantizing step change", the encoding mode for the shape signal is judged and selected, which causes the correlation between the encoding mode 119 for the pixel value signal and the encoding mode 111 for the shape signal, and makes it possible for the bit number of the encoded mode signal to be reduced, and which causes the prevention of the selection of the changing the quantizing step and thereby makes it possible that the increase in the additional information due to the change of the quantizing step is prevented and the bit number is reduced.

Note that, although the structures of the image encoding apparatuses according to the 22nd to 24th embodiments are based on the 20th embodiment shown in FIG. 24, it is also possible for them to be based on the 19th embodiment shown in FIG. 23, and also, the correlation of the encoding modes becomes higher and the additional information is prevented from increasing, which realizes the reduction of the bit number. Also, it is possible to base it on the 18th embodiment shown in FIG. 20, and the bit number is reduced, realizing the encodings suitable for the respective signals.

Also, the encoded signals obtained by the image encoding apparatuses according to the 22nd to 24th embodiments can be appropriately decoded by the image decoding apparatus according to the 21st embodiment.

Also, although in the 18th to 21st embodiments the input image signal consists of the transparency information and the shape information in addition to the pixel value information and is separated into the pixel value signal, the transparency signal and the shape signal, in the 22nd to 24th embodiments the input image signal is separated into the pixel value signal and the shape signal. Concerning this, when also in the 22nd to 24th embodiments the transparency information and the shape information have agreement, it is possible to use only the shape information, while when there is not agreement, if the transparency information is made the shape signal, or the transparency information which is a multi-valued signal is processed along with the pixel value information in the blocking unit, the shape signal and the pixel value signals are obtained.

Embodiment 25

An image encoding apparatus according to a 25th embodiment of this invention receives a two-dimensional image signal as an input signal and performs the prediction and detection of change pixels.

Figure 30:
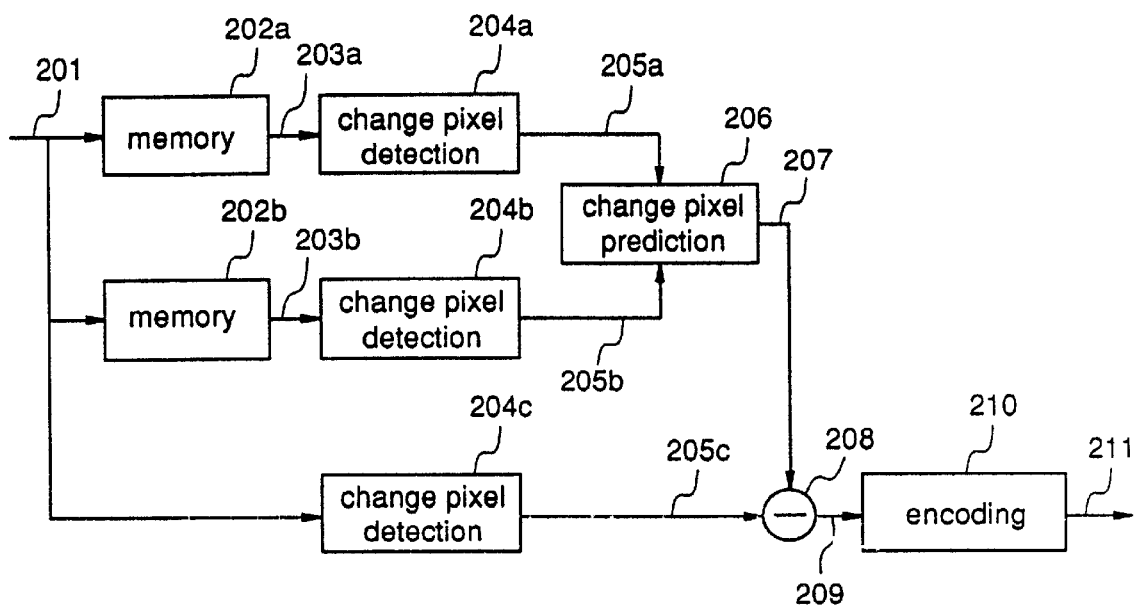
FIG. 30 is a block diagram showing the structure of an image encoding apparatus according to a 25th embodiment of this invention.

FIG. 30 is a block structure showing the structure of the image encoding apparatus according to the 25th embodiment. In the figure, 201 indicates the input signal which is input to the image encoding apparatus as a two-valued image signal. 204c indicates the 1st change pixel detector which detects the pixel changing the pixel value for the input signal 201 and outputs the result as the detected 1st change pixel 205c. 202a and 202b are the memories which temporarily store the input signals and output the signals as the reference signals 203a and 203b with a delay. 204a and 204b indicate the change pixel detectors which detect the pixels changing the pixel values for the reference signals 203a and 203b and output the results as the detected 2nd change signal 203a and the detected 3rd change pixel 203b. 206 indicates the change pixel predictor which predicts the change pixel which will be output by the 1st change pixel detector 204c based on the detected change pixels 203a and 203b, and outputs the predicted change pixel 207. 208 indicates the subtractor which obtains the difference between the 1st change pixel 205c and the predicted change pixel 207 and thereby outputs the difference as the prediction error 209. 210 indicates the encoder which encodes the prediction error 209 and outputs the encoded signal 211.

The operation of the image encoding apparatus according to the 25th embodiment as constructed above is explained.

Figure 31:
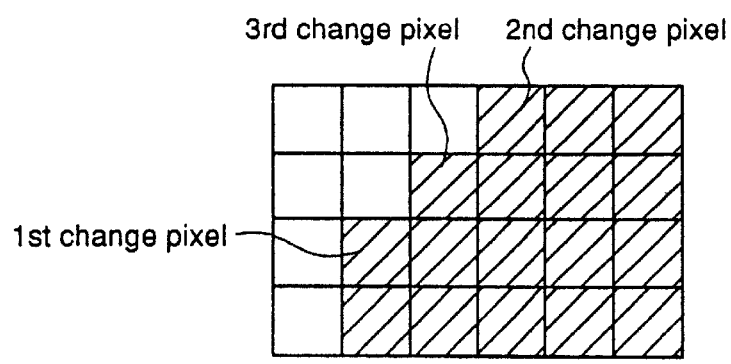
FIG. 31 is a drawing for explaining the operating principle of an image encoding apparatus according to a 26th embodiment of this invention.

FIG. 31 is a drawing for explaining the operating principle of the encoding performed by the image encoding apparatus according to the 25th embodiment. Here for the simplicity of the description, such a procedure is described of the process performed pixel by pixel. In FIG. 31, the scanning is carried out from the top left moving to the right, while the encoding proceeds to the bottom right direction. The pixel value of each pixel has two values which represent true and false values (two values) by the presence of the slant lines. In addition, here, the encoding has been accomplished on the 1st line and the 2nd line, and the 3rd line(on which the 1st change pixel exists) is to be encoded.

The change pixel, in the above-described scanning, means a first pixel that changes the pixel value, and the change pixels on the already scanned lines(scanning lines) designate the 2nd change pixel and the 3rd change pixel, and the 1st change pixel on the scanning line not encoded yet designates the 1st change pixel. Accordingly, the 1st change pixel is predicted from the 2nd and 3rd change pixels, and if the difference value(prediction error) between the predicted 1st change pixel and the real 1st change pixel is calculated, the prediction error is distributed concentrating in the neighborhood of 0, and thereby the efficient encoding with the small bit number using the variable-length encoding and the like is possible.

In FIG. 30, the input signal 201 is first input to the apparatus. As the input signal 201, the ordinary color signal (pixel value signal), or the shape signal representing the shape of an object or the synthesis rate of an object can be used. The input signal 201 is input and temporarily stored in the memories 202a and 202b. On the other hand, the input signal 201 is also input to the 1st change pixel detector 204c, and the change pixel detector 204c detects the pixel changing the two-valued pixel value. This is the 1st change pixel in. FIG. 31. In FIG. 30, the 1st change pixel 205c is input to the subtractor 208.

On the other hand, the memory 202a outputs the temporarily stored input signal 201 as the reference signal 203a to the change pixel detector 204a with a 2 line delay, and the change pixel detector 204a detects the 2nd change pixel 205a in FIG. 31. Similarly, the memory 202b outputs the temporarily stored input signal 201 as the reference signal 203b to the change pixel detector 204b with a 1 line delay, and the change pixel detector 204b detects the 3rd change pixel in FIG. 31. In FIG. 30, the change pixels 205a and 205b are input to the change pixel predictor 207.

An image generally has correlation in the horizontal and vertical directions, and the 1st to 2nd change pixels are often positioned on an almost straight line. The change pixel predictor 206, based on this, performs prediction of the input change pixel, and outputs the obtained predicted change pixel 207 to the subtractor 208. The subtractor 208 obtains the difference between the input 1st change pixel 205c and the predicted change pixel 207, and thereby outputs the difference as the prediction error 209 to the encoder 210, and the encoder 210 encodes the prediction error 209 and outputs the encoded signal 211. The prediction error which is the difference in value of the predicted change pixel and the detected 1st change pixel is distributed concentrating in the neighborhood of 0, and therefore if this is encoded, using the variable-length encoding which gives a small bit number to the near 0 value, the efficient encoding can be performed with the small bit number.

As described above, the image encoding apparatus according to the 25th embodiment has the memories 202a to 202b, the change pixel detectors 204a to 204c, the change pixel predictor 207, the subtractor 208 and the encoder 210, and thereby, based on the change pixel detected from the reference signal which is the delayed input signal, predicts the change pixel of the particular input signal, and encodes the error of the prediction, which makes it possible to improve the encoding efficiency.

Embodiment 26

An image encoding apparatus according to a 26th embodiment of this invention receives a two-dimensional image signal consisting of a plurality of pixels as an input signal, and predicts and detects change pixels, and differs from the 25th embodiment in the method of obtaining change pixels for the use of prediction.

Figure 32:
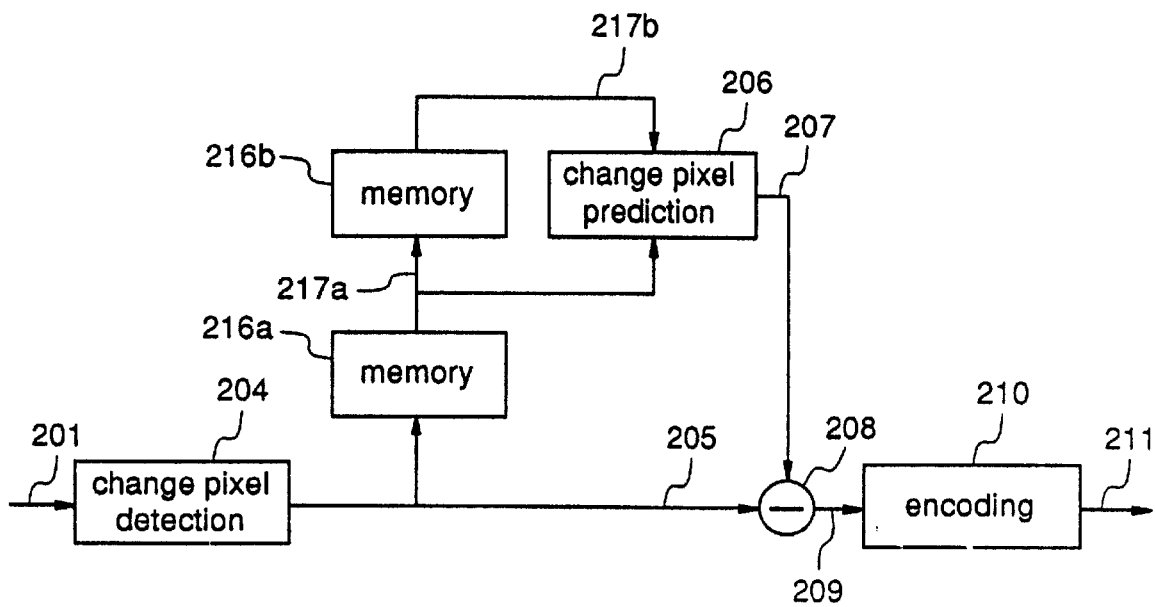
FIG. 32 is a block diagram showing the structure of an image encoding apparatus according to a 26th embodiment of this invention.

FIG. 32 is a block diagram showing the structure of the image encoding apparatus according to the 26th embodiment. In the figure, 201 indicates the input signal which is input to the image encoding apparatus as a two-valued image signal. 204 indicates the change pixel detector which detects the pixel changing the pixel value for the input signal 201 and outputs the result as the detected change pixel 205. 216a and 216b are memories which delay the input signal by the temporary store. 216a delays the detected change pixel 205 and outputs the reference signals 217a, and 216b delays the reference signal 217a and outputs the reference signals 217b. 206 indicates the change pixel predictor which predicts change pixels based on the reference change pixels 217a and 217b, and outputs the predicted change pixel 207. The subtractor 208 and the encoder 210 are the same as those of the 25th embodiment.

The operation of the image encoding apparatus according to the 26th embodiment as constructed above is explained. The input signal 201, similar to the 25th embodiment, is input to the image encoding apparatus according to the 26th embodiment, and the pixel changing the two-valued pixel value is detected by the change pixel detector 204, and the detected change pixel 205 is output to the memory 216a and the subtractor 208. The detected change pixel 205 input to the memory 216a is delayed by one line and then output as the reference change pixel 217a to the change pixel predictor 206 and the memory 216b. The reference change pixel 217a input to the memory 216b is further delayed by one line, and then output as the reference change pixel 217b to the change pixel predictor 206. By handling the reference change pixels 217a and 217b as the 2nd and 3rd change pixel in the 25th embodiment, it is possible for the change pixel predictor 206 to perform the prediction similar to that of the 25th embodiment, and thereby the predicted change pixel 207 is obtained. The remaining processes are similar to those of the 25th embodiment.

As described above, the image encoding apparatus according to the 26th embodiment has the memories 216a to 216b, the change pixel detector 204, the change pixel predictor 207, the subtractor 208 and the encoder 210, and thereby obtains the reference change pixel by delaying the change pixel detected from the input signal in the memory, and based on the reference change pixel, predicts the change pixel in the particular input signal, and encodes the error of the prediction, which makes it possible to improve the encoding efficiency.

Embodiment 27

An image encoding apparatus according to a 27th embodiment of this invention receives a two-dimensional image signal consisting of a plurality of pixels as an input signal, and predicts and detects change pixels, and differs from the 25th embodiment in the method of obtaining change pixels with the use of prediction.

The image encoding apparatus according to the 27th embodiment has astructure similar to that of the 25th embodiment, and thereby is described in FIG. 30. In the image encoding apparatus according to the 25th embodiment, as described using FIG. 31, for the scanning line to be encoded, the change pixels on the scanning lines of the previous and previous 2 lines are used for the prediction. In the image encoding apparatus according to the 27th embodiment, the prediction is performed based on the change pixel on the scanning line several lines before.

Figure 33:
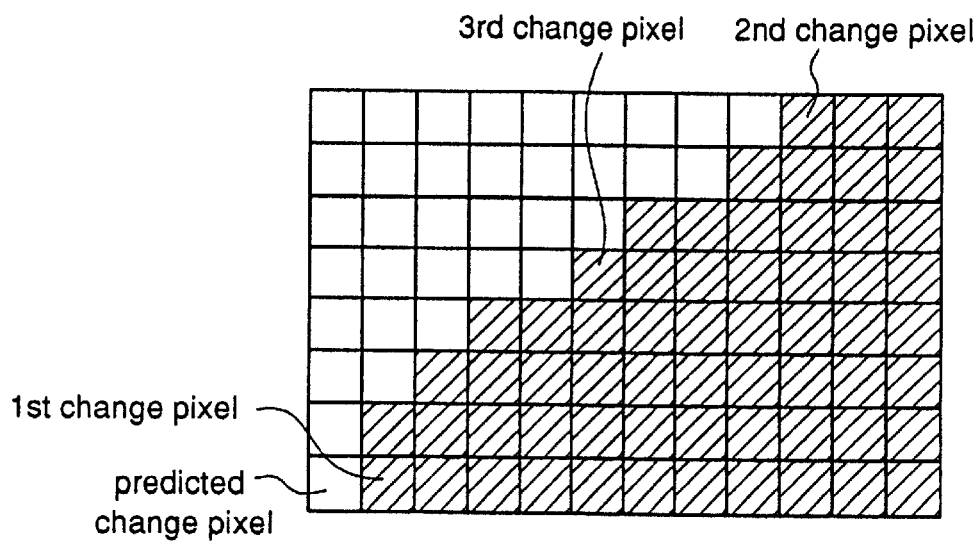
FIG. 33 is a drawing for explaining the operating principle of an image encoding apparatus according to a 27th embodiment of this invention.

FIG. 33 is a drawing for explaining the operating principle of the encoding performed by the image encoding apparatus according to the 27th embodiment. For the scanning line positioned at the bottom to be encoded, based on the 2nd and 3rd change pixels detected on the scanning lines 7 lines before and 4 lines before, if it is predicted that the first change pixel should exist on the straight line, the predicted pixel shown in the figure is obtained. Using the prediction error between the predicted change pixel and the first change pixel detected on the particular scanning line from the input signal, the information "one pixel right from the predicted change pixel" is encoded, and thereby the improvement of the encoding efficiency is realized similar to the 25th embodiment.

The operation of the image encoding apparatus according to the 27th embodiment is similar to that of the image encoding apparatus according to the 25th embodiment, except that the delay times caused by the temporary store in the memories 202a and 202b are different from those of the 25th embodiment. Also, concerning the prediction of the change pixel predictor 206, the change pixel can be predicted by the following calculation. The 2nd change pixel is regarded as the x-th pixel on the m-th line, and the 3rd change pixel is regarded as the y-th pixel on the n-th scanning line, and the predicted point of the 1st change pixel is regarded as the z-th pixel on the k-th line, and if it is assumed that the 3 points are positioned on a straight line, the following relationship is established, x−y:z−y=m−n:k−n, resulting in z−y=(x−y)*(n−k)/(m−n). Accordingly, z=y−(x−y)*(n−k)/(m−n), and thereby the 1st change pixel is positioned at the y−(x−y)*(n−k)/(m−n)-th pixel on the k-th line.

As described above, in the image encoding apparatus according to the 27th embodiment, by the same structure of the image encoding apparatus according to the 25th embodiment, there is provision for the delay times with the use of the memories 202a and 202b to be changed, obtaining a similar result.

Embodiment 28

An image encoding apparatus according to a 28th embodiment of this invention receives a two-dimensional image signal consisting of a plurality of pixels as an input signal, and predicts and detects change pixels, and differs from the 25th embodiment in the method of obtaining change pixels for the use of prediction.

The image encoding apparatus according to the 28th embodiment has the structure similar to that of the 25th embodiment shown in FIG. 30, and has the decoder which decodes the encoded signal 211, and outputs the already encoded and decoded signal which is output by this decoder to either of the memories. In the image encoding apparatus according to the 25th embodiment, as described using FIG. 31, for the scanning line to be encoded, change pixels on scanning lines which are positioned at 1 line above and 2 lines above are used for the prediction, but in the image encoding apparatus according to the 28th embodiment, change pixels on the already encoded and decoded scanning line being positioned below are used for the prediction.

Figure 34:
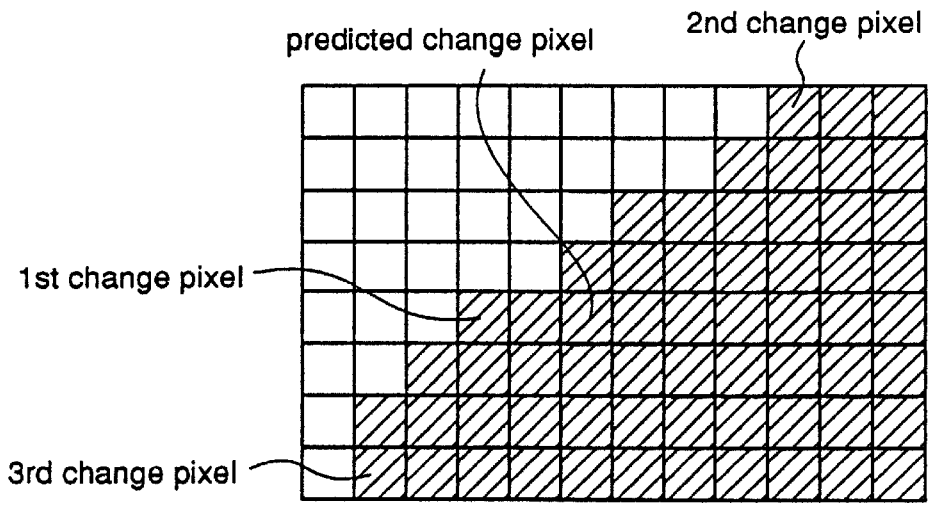
FIG. 34 is a drawing for explaining the operating principle of an image encoding apparatus according to a 28th embodiment of this invention.

FIG. 34 is a drawing for explaining the operating principle of the encoding performed by the image encoding apparatus according to the 28th embodiment. For the scanning line to be encoded(in the figure, the line on which the 1st change pixel exists), based on the 2nd and 3rd change pixels detected on scanning lines 4 lines above and 3 lines below, if it is predicted that the 1st change pixel should be on a straight line, the predicted change pixel shown in the figure is obtained. By encoding the information "2 pixels right from the predicted change pixel" using the prediction error between this predicted change pixel and the 1st change pixel detected on the particular scanning line from the input signal, an improvement of the encoding efficiency is realized similar to the 25th and 27th embodiments.

The image encoding apparatus according to the 28th embodiment differs from that according to the 25th embodiment only both in a delay time caused by the temporary store in both of the memories 202a and 202b, and in that the encoded signal 211 output by the encoder 210 is encoded and the result is input to either of the memories, and the corresponding change pixel detector detects change pixels from this encoded and decoded signal.

As described above, the image encoding apparatus according to the 28th embodiment obtains a similar result, because of the structure which is of the image encoding apparatus according to the 25th embodiment which is added to the channel in which the encoded signal is decoded and is made the reference image.

Embodiment 29

An image encoding apparatus according to a 29th embodiment of this invention receives a two-dimensional image signal consisting of a plurality of pixels as an input signal, and predicts and detects change pixels, and similarly to the 26th embodiment, delays the detected change pixel to be used for the prediction.

Figure 35:
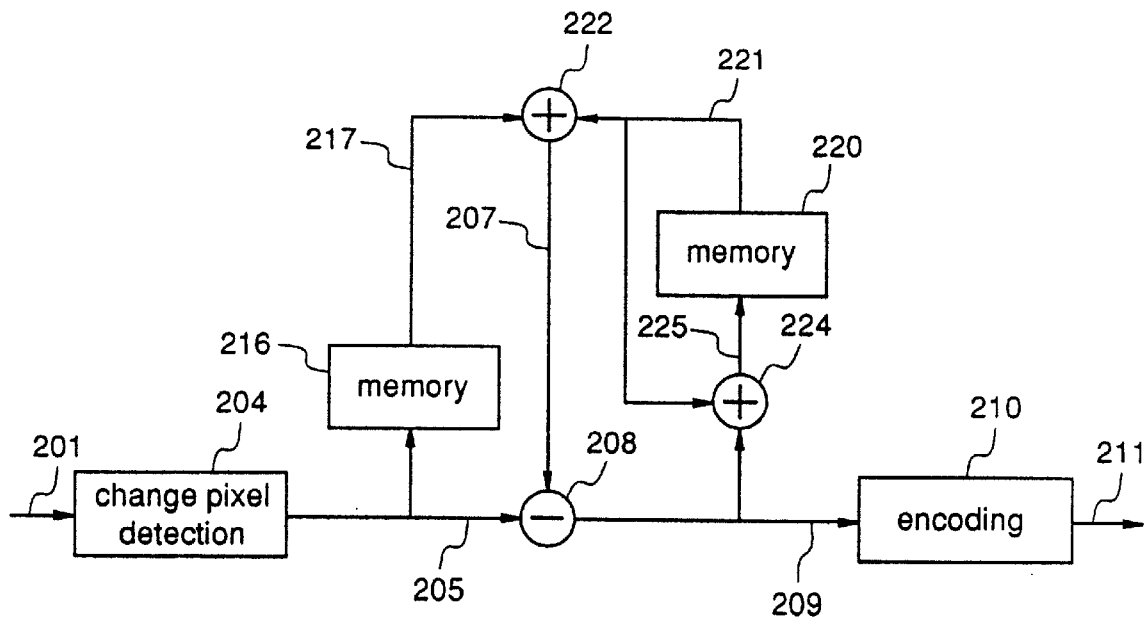
FIG. 35 is a block diagram showing the structure of an image encoding apparatus according to a 29th embodiment of this invention.

FIG. 35 is a block diagram showing the structure of the image encoding apparatus according to the 29th embodiment. In the figure, 216 and 220 indicate memories which temporarily store the input change pixels in order to delay the pixels. The memory 216 delays the detected change pixel 205 and outputs the delayed change pixel 217, and the memory 220 delays the prediction error 209 and outputs the delayed prediction error 221. 222 and 224 indicate adders, and the adder 222 adds the delayed change pixel 217 and the delayed prediction error 221, and the adder 224 adds the prediction error 209 and the delayed prediction error 221. The other numerals are the same as those in FIG. 32, the description is similar to that for the 26th embodiment.

Figure 36:
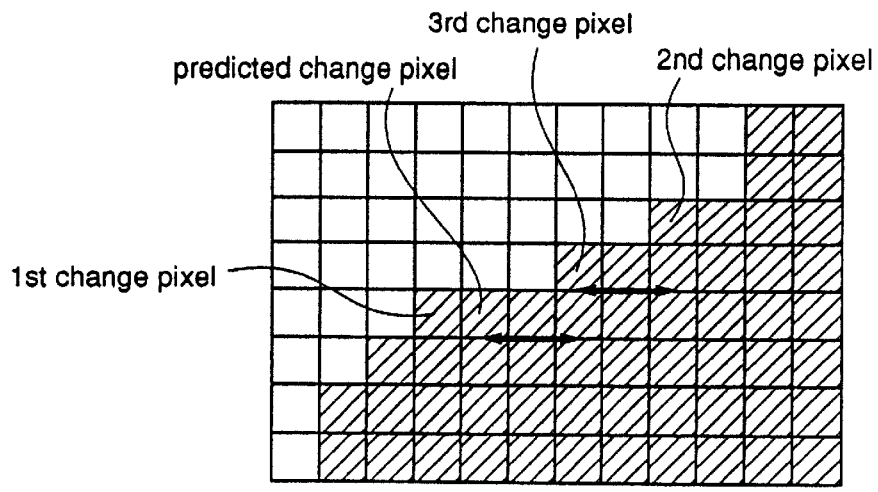
FIG. 36 is a drawing for explaining the operating principle of an image encoding apparatus according to a 29th embodiment of this invention.

The operation of the image encoding apparatus according to the 29th embodiment as constructed above is explained. FIG. 36 is a drawing for explaining the operating principle of the encoding performed by the image encoding apparatus according to the 29th embodiment. In the image encoding apparatus according to the 26th embodiment, by delaying the detected 1st change pixel, the 2nd and 3rd change pixels are obtained. As opposed to this, in the image encoding apparatus according to the 29th embodiment, the difference between the 2nd change pixel and the 3rd change pixel is added to the 3rd change pixel, and the result is used as the predicted value of the 1st change pixel. As shown in the figure, the difference between the 2nd change pixel and the 3rd change pixel is "to 2 pixels left", and this "to 2 pixels left" is added to the 3rd change pixel, and thereby on the scanning line on which the encoding is performed (in the figure, the line on which the 1st change pixel exists), the predicted change pixel of the same figure is obtained. On the other hand, on the scanning line to be currently encoded, the 1st change pixel is detected, and the difference between this detected 1st change pixel and above-mentioned predicted change pixel, "to 1 pixel left", is encoded, resulting in realizing the same effect as the 26th embodiment.

In FIG. 35, the input signal 201 is input to the image encoding apparatus according to the 29th embodiment, the position where the two-valued pixel value changes is detected by the change pixel detector 204, and the 1st change pixel 205 is output to the memory 216 and the subtractor 208. In the memory 216, the delayed change pixel 217 delayed by 1 line is the 3rd change pixel in FIG. 36. The delayed change pixel 217 is input to the adder 222, and is added to the delayed prediction error 221 corresponding to the difference between the 2nd and 3rd change pixels in FIG. 36, and the obtained predicted change pixel 207 is output to the subtractor 208.

The subtractor 208 outputs the difference between the detected change pixel 204 and the predicted change pixel 207 as the prediction error 209, and the prediction error 209 is encoded in the encoder 210, and the encoded signal 211 is output.

The prediction error 209 is also added, in the adder 224, with the delayed prediction error 221. The delayed prediction error 221 obtained as a result of this corresponds to the difference between the 2nd and 3rd change pixels, and is delayed by being temporarily stored in the memory 220 and will be used in the next encoding. That is, in FIG. 36, on the next line (one line below), the above-mentioned "to 2 pixels left" which is the delayed error 221 and the above-mentioned "to 1 pixel left" which is the prediction error 209 are added to become "to 3 pixels left" which is used as the predicted value.

As described above, the image encoding apparatus according to the 29th embodiment has the memories 216 and 220, the change pixel detector 204, the adders 216 and 220, the subtractor 208, and the encoder 210, and thereby carries out the delaying and addition processes for the change pixel detected from the input signal and the prediction error, resulting an improvement of the encoding efficiency similar to the 26th embodiment.

Note that any of the image encoding apparatuses according to the 25th to 29th embodiments can receive the input block by block and process the input for the respective blocks.

Embodiment 30

An image decoding apparatus according to a 30th embodiment of this invention decodes the encoded signal output by the encoding apparatus according to the 25th embodiment to obtain a two-dimensional image signal consisting of a plurality of pixels.

Figure 37:
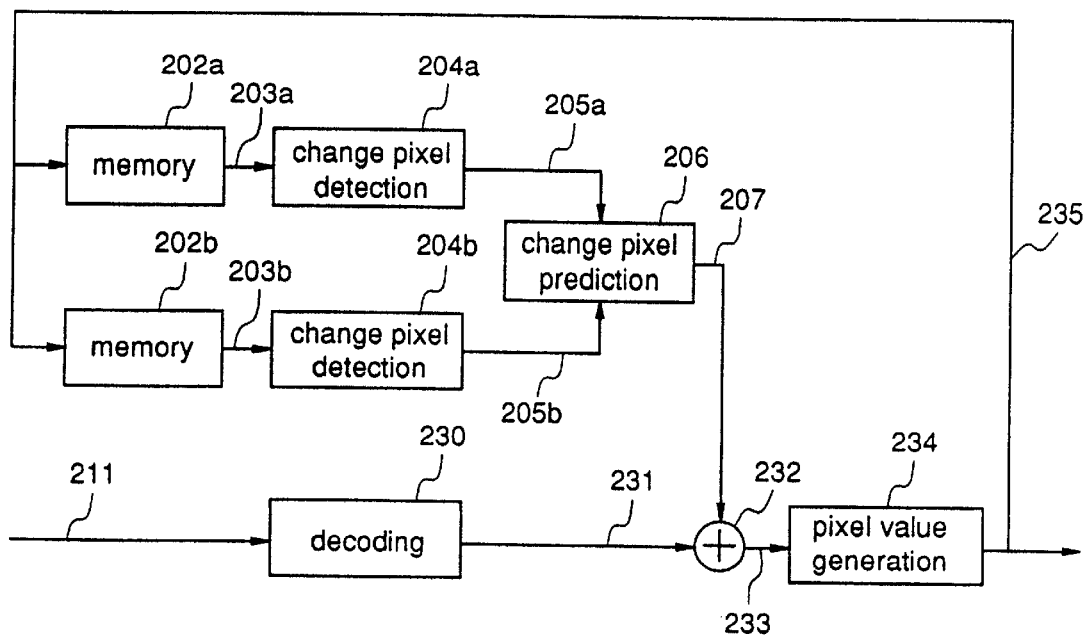
FIG. 37 is a block diagram showing the structure of an image decoding apparatus according to a 30th embodiment of this invention.

FIG. 37 is a block diagram showing the structure of the image decoding apparatus according to the 30th embodiment. In the figure, 211 indicates the input signal which is the encoded signal (211 in FIG. 30) of the prediction error output by the image encoding apparatus according to the 25th embodiment. 230 indicates the decoder which decodes the encoded signal 211 and outputs the decoded prediction error 231. 232 indicates the adder which processes the decoded prediction error 231 and the predicted change pixel 207 by addition, and outputs the obtained decoded change pixel 233. 234 indicates the pixel value generator which generates the decoded image signal 235 and outputs the same, assuming the pixel which is positioned between the decoded change pixel 233 and the immediately previous decoded change pixel has the given pixel value, namely the pixel value which makes the pixel not a change pixel. The other numerals are similar to those in FIG. 30, and the description is similar to that in the 25th embodiment.

The description is given of the operation of the image encoding apparatus according to the 30th embodiment as constructed above. The encoded signal 211 is input, and then the encoded signal 211 into which the prediction error is encoded is decoded in the decoder 230, and the decoded prediction error 231 obtained as a result of this is output to the adder 232.

On the other hand, the immediately previous decoded image signal 235 is input to the memories 202a and 202b, and similarly to the 25th embodiment, is subjected to the prediction of the change pixel, and the predicted change pixel 207 is output from the change pixel predictor 206 to the adder 232. The adder 232 adds the input decoded prediction error 231 to the predicted change pixel 207, and obtains the decoded change pixel 233 and outputs the same to the pixel value generator 234. The pixel value generator 234 generates the decoded image signal 235 and outputs the same, assuming the pixel which is positioned between the decoded change pixel 233 and the immediately previous decoded change pixel should have the given pixel value, namely the pixel value which makes the pixel not a change pixel.

As described above, the image decoding apparatus according to the 30th embodiment has the memories 202a and 202b, the change pixel detectors 204a and 204b, the change pixel predictor 207, the decoder 230, the adder 232, and the pixel value generator 234, and thereby obtains the decoded change pixel using the predicted change pixel and the decoded prediction error, and based on this, obtains the decoded image signal 235, whereby the encoded signal by the 25th embodiment can be appropriately decoded.

Note that, in the 30th embodiment, although the encoded signal encoded by the image encoding apparatus according to the 25th embodiment is decoded, the encoded signal which is encoded by the image encoding apparatuses according to the 27th and 28th embodiments is also similarly decoded.

Embodiment 31

An image decoding apparatus according to a 31st embodiment of this invention decodes the encoded signal output by the encoding apparatus according to the 26th embodiment to obtain a two dimensional image signal consisting of a plurality of pixels.

Figure 38:
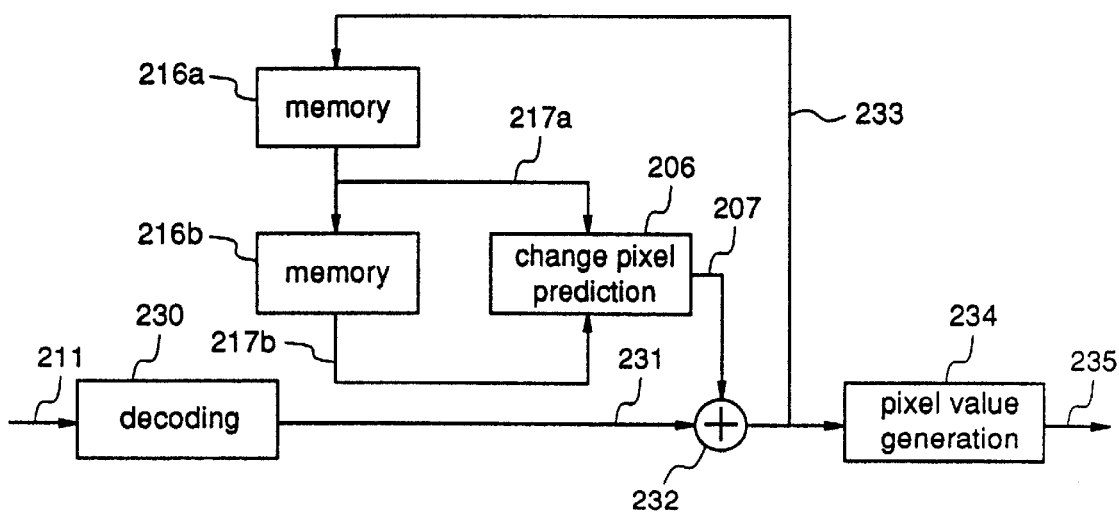
FIG. 38 is a block diagram showing the structure of an image decoding apparatus according to a 31st embodiment of this invention.

FIG. 38 is a block diagram showing the structure of the image decoding apparatus according to the 31st embodiment. In the figure, the decoder 230, the adder 232 and the pixel value generator 234 are similar to those in FIG. 37, and the others are similar to those in FIG. 32, and the description is similar to those for the 30th and 26th embodiments.

The description is given of the operation of the image decoding apparatus according to the 31st embodiment as constructed above. The input signal 211 is input, and then this encoded signal 211 into which the prediction error is encoded is decoded in the decoder 230, and the decoded prediction error 231 obtained as a result of this is output to the adder 232. On the other hand, the immediately previous decoded image signal 233 is input to the memory 216a, and similarly to the 26th embodiment, is subjected to the prediction of the change pixel, and the predicted change pixel 207 is output from the change pixel predictor 206 to the adder 232. The remaining processes are similar to those in the 30th embodiment.

As described above, the image decoding apparatus according to the 31st embodiment has the memories 216a to 216b, the change pixel predictor 207, the decoder 230, the adder 232, and the pixel value generator 234, and thereby obtains the decoded change pixel using the predicted change pixel and decoded prediction error, and based on this, obtains the decoded image signal 235, whereby the encoded input signal by the 26th embodiment can be appropriately decoded.

Embodiment 32

An image decoding apparatus according to a 32nd embodiment of this invention decodes the encoded input signal output by the encoding apparatus according to the 29th embodiment to obtain a two-dimensional image signal consisting of a plurality of pixels.

Figure 39:
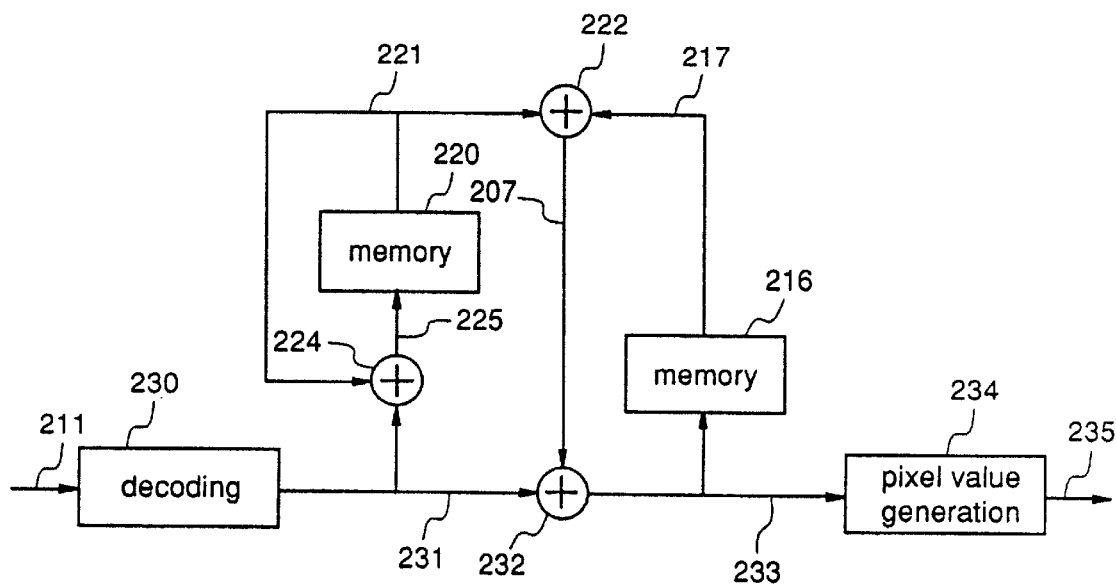
FIG. 39 is a block diagram showing the structure of an image decoding apparatus according to a 32nd embodiment of this invention.

FIG. 39 is a block diagram showing the structure of the image decoding apparatus according to the 32nd embodiment. In the figure, the decoder 230, the adder 232 and the pixel value generator 234 are similar to those in FIG. 37, and the others are similar to those in FIG. 35, and the description is similar to those for the 30th and 29th embodiments.

The description is given of the operation of the image decoding apparatus according to the 32nd embodiment as constructed above. The input signal 211 is input, and then this encoded input signal 211 into which the prediction error is encoded is decoded in the decoder 230, and the decoded prediction error 231 obtained as a result of this is output to the adder 232. On the other hand, the immediately previous decoded image signal 233 is input to the memory 216, and similar to the 29th embodiment, is subjected to the prediction of the change pixel, and the predicted change pixel 207 is output from the adder 222 to the adder 232. The remaining processes are similar to those in the 30th embodiment.

As described above, the image decoding apparatus according to the 31st embodiment has the memories 216 and 220, the adders 224, 222 and 232, the decoder 230, and the pixel value generator 234, and thereby obtains the decoded change pixel using the predicted change pixel and the decoded prediction error, and based on this, obtains the decoded image signal 235, whereby the encoded input signal by the 29th embodiment can be appropriately decoded.

Note that, when the encoding has been performed block by block in any of the image encoding apparatuses according to the 25th to 29th embodiments, in the image encoding apparatuses according to the 30th to 32nd embodiments, by receiving and processing the encoded signal block by block, the appropriate processing can be performed.

Embodiment 33

An image encoding apparatus according to a 33rd embodiment of this invention switches the prediction error and the result of encoding the pixel number and outputs the same.

Figure 40:
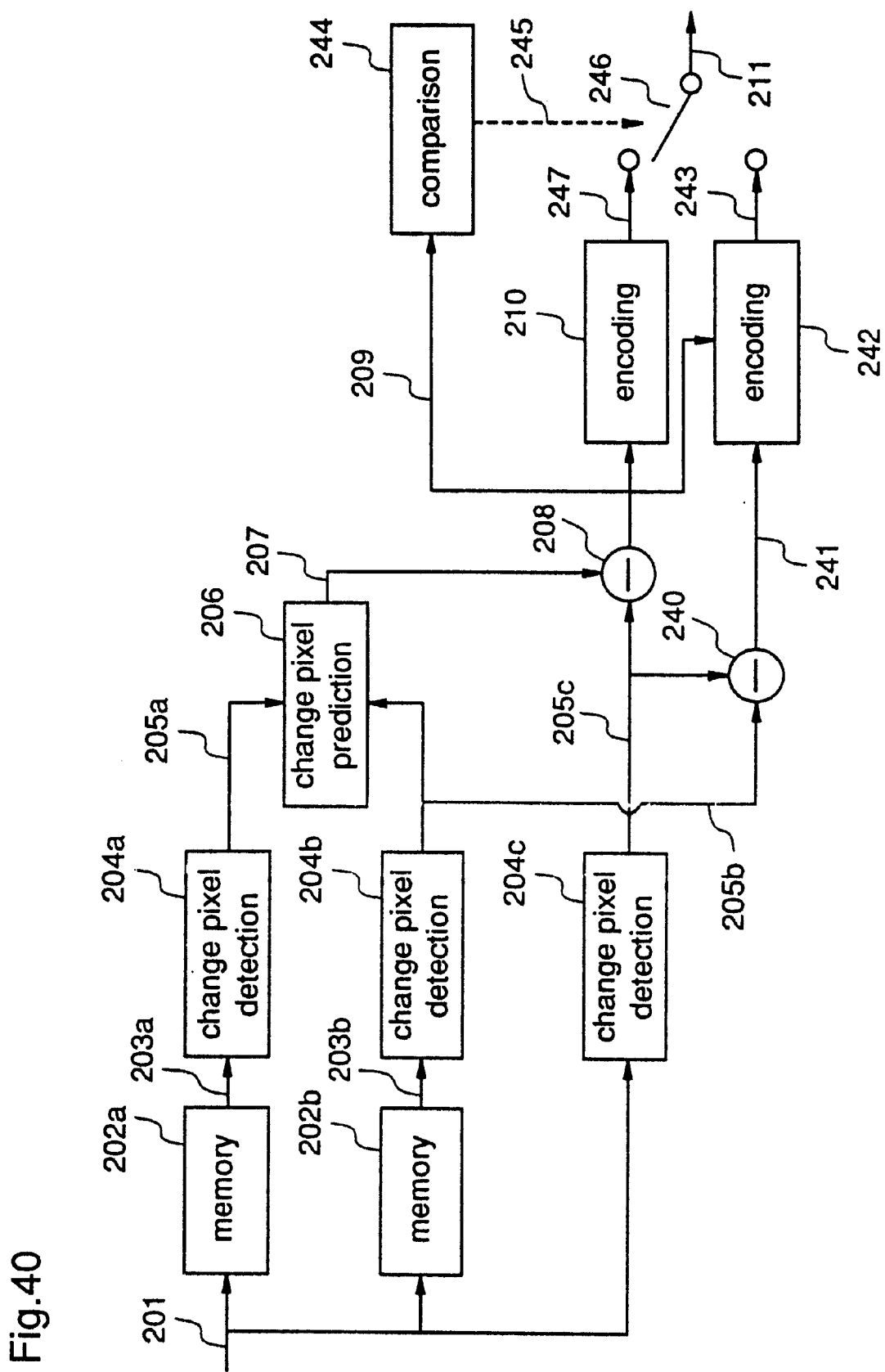
FIG. 40 is a block diagram showing the structure of an image encoding apparatus according to a 33rd embodiment of this invention.

FIG. 40 is a block diagram showing the structure of the image encoding apparatus according to the 33rd embodiment. In the figure, 240 indicates the subtractor which obtains the difference 241 between the detected change pixels 205b and 205c. 242 indicates the encoder which encodes the difference 41 and outputs the encoded signal 243. 244 indicates the comparator which compares the prediction error 209 and the given value, and according to the result, controls the switching of the switch 246. 246 indicates the switch which switches the encoded signals 247 and 243, either of which is to be the output encoded signal 211 of the image encoding apparatus, according to the 33rd embodiment by the control of the comparator 244. The other numerals indicate the same as those in FIG. 30, and the description is the same as that in the 25th embodiment. The image encoding apparatus according to the 25th embodiment performs the encoding of the prediction error, but it performs the encoding on the assumption that the prediction error is small, so that when the prediction error is large, the encoding efficiency is reduced. In this case, the encoding efficiency is better when the change pixel itself (position) is encoded than when the prediction error is encoded. Accordingly, the image encoding apparatus according to the 33rd embodiment can perform encoding of the prediction error and encoding the pixel number indicating the position of the change pixel. Also, by encoding the change pixel itself (position), even when the number of the change pixels is changed, and the prediction becomes difficult or impossible, and the encoding of the prediction error becomes difficult or impossible, the encoding can be still performed.

The operation of the image encoding apparatus according to the 33rd embodiment as constructed above is explained.

Figure 41:
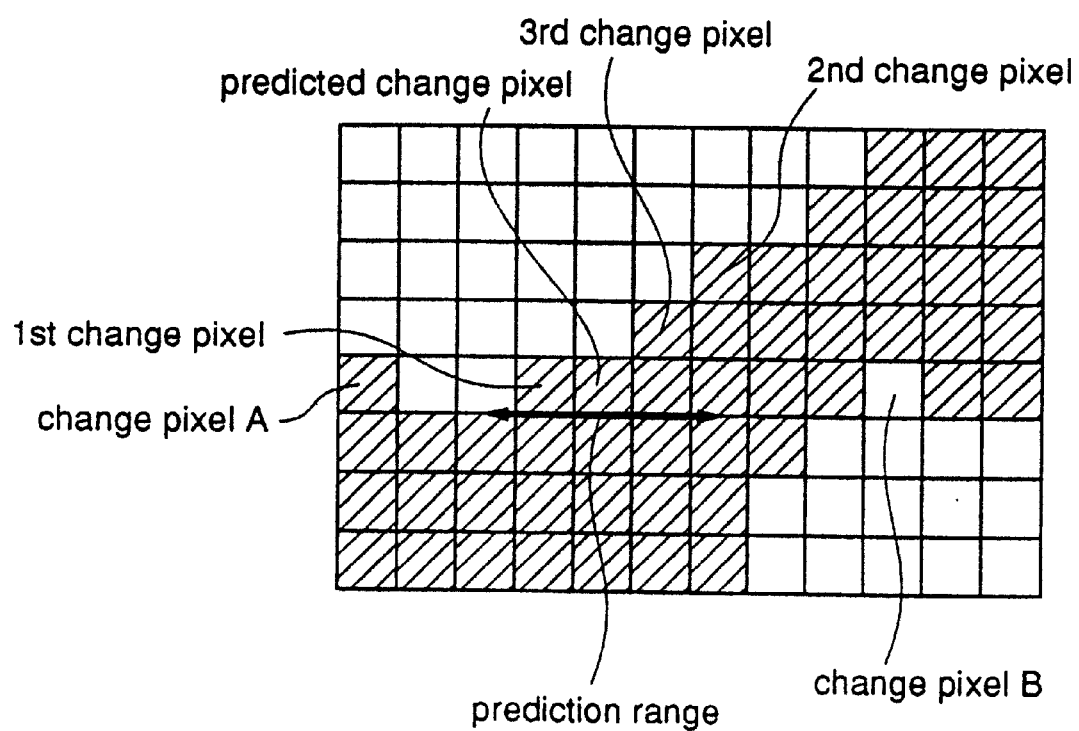
FIG. 41 is a drawing for explaining the operating principle of an image encoding apparatus according to a 33rd embodiment of this invention.

FIG. 41 is a drawing for explaining the operating principle of the encoding performed by the image encoding apparatus according to the 33rd embodiment. The prediction of the 1st change pixel from the 2nd and 3rd change pixels is similar to the case of the 25th embodiment. In the 33rd embodiment, the prediction range centering on the predicted change pixel is set up according to the previously given value. Thereafter, according to whether or not the detected 1st change pixel is within the prediction range, the switching of the encoding is carried out, and thereby the prediction error is encoded when it is within the prediction range, while the 1st change pixel is encoded when it is not within the prediction range.

Also, in the 33rd embodiment, since the 3rd change pixel is the already encoded and decoded one, in order to encode the 1st change pixel, the difference between the orders of the scanning of the 3rd change pixel and the 1st change pixel, namely the number of the pixels existing therebetween, should be encoded. Further, since a pixel among the pixels therebetween which is positioned within the above-mentioned prediction range is encoded by the prediction error, it is possible to remove the pixel. Accordingly, in order to encode the 1st change pixel, the above-mentioned difference of the change pixels except the pixels within the prediction range should be encoded.

For example, the procedure will be described in the case that the change pixel A and the change pixel B in the same figure are outside of the prediction range and these points are detected as the 1st change pixel. Similar to the description for the 25th embodiment, supposing that the scanning direction is top left bottom right, the 1st change pixel is 3*12+6=42th, and the change pixel A is 4*12+1=49th, and the change pixel B is 4*12*10=58th. As there is no prediction range between the 3rd change pixel and the change pixel A, the number 49−2=7 of the pixels between the two as the change pixel A, namely the information indicating the position of A, is encoded. As opposed to this, in the case of the change pixel B, as the prediction range is included between the 3rd change pixel and the change pixel B, the 5 pixels existing within this prediction range are removed, and 58−42−5=11 as the change pixel B, namely the information indicating the position of B, is encoded.

After the input signal 201 is input to the image encoding apparatus according to the 33rd embodiment and from the delay performed by the memories 202a and 202b for obtaining the prediction error 209 performed by the subtractor 208, the process is carried out similar to the 25th embodiment, and the encoded signal 247 of the prediction error is obtained by the encoder 210. Although this encoded signal is the output encoded signal in the 25th embodiment, in the 33rd embodiment, the encoded signal 247 is output to the switch 246. Also, the prediction error 209 is output to the encoder 242 and the comparator 244.

On the other hand, the 3rd change pixel 205b detected by the change pixel detector 204b and the 1st change pixel 105c detected by the change pixel detector 204c are output to the subtractor 240, and the number 241 of the pixels existing between the two is obtained and output to the encoder 242 as the difference. The encoder 242 obtains the pixel number encoded signal except for the pixels existing within the prediction range, from the input difference 241 and the prediction error 243, and outputs the obtained signal to the switch 246.

The comparator 244 judges whether the input prediction error is within the prediction range or not, and when it is within the prediction range, outputs the prediction error encoded signal 247 as the output 211 in the switch 246, when it is not within the prediction range, outputs the pixel number encoded signal 243 as the output 211 in the switch 246, which is controlled according to the signal 245.

As described above, based on the image encoding apparatus according to the 25th embodiment, the structure of the image encoding apparatus according to the 33rd embodiment is made up of the subtractor 240, the encoder 242 for the pixel number, the comparator 244 and the switch 246, and thereby when the prediction error is within the given range, the encoded signal of the prediction error is the output encoded signal, while when the prediction error is outside of the range, the pixel number encoded signal is the output encoded signal, so that when the prediction error is large, even if the prediction of the change pixel is impossible due to the change of the number of the change pixels, the reduction of the encoding efficiency is prevented and the encoding can be appropriately performed.

Embodiment 34

An image decoding apparatus according to a 34th embodiment of this invention decodes the encoded signal output by the encoding apparatus according to the 33rd embodiment to obtain a two-dimensional image signal consisting of a plurality of pixels.

Figure 42:
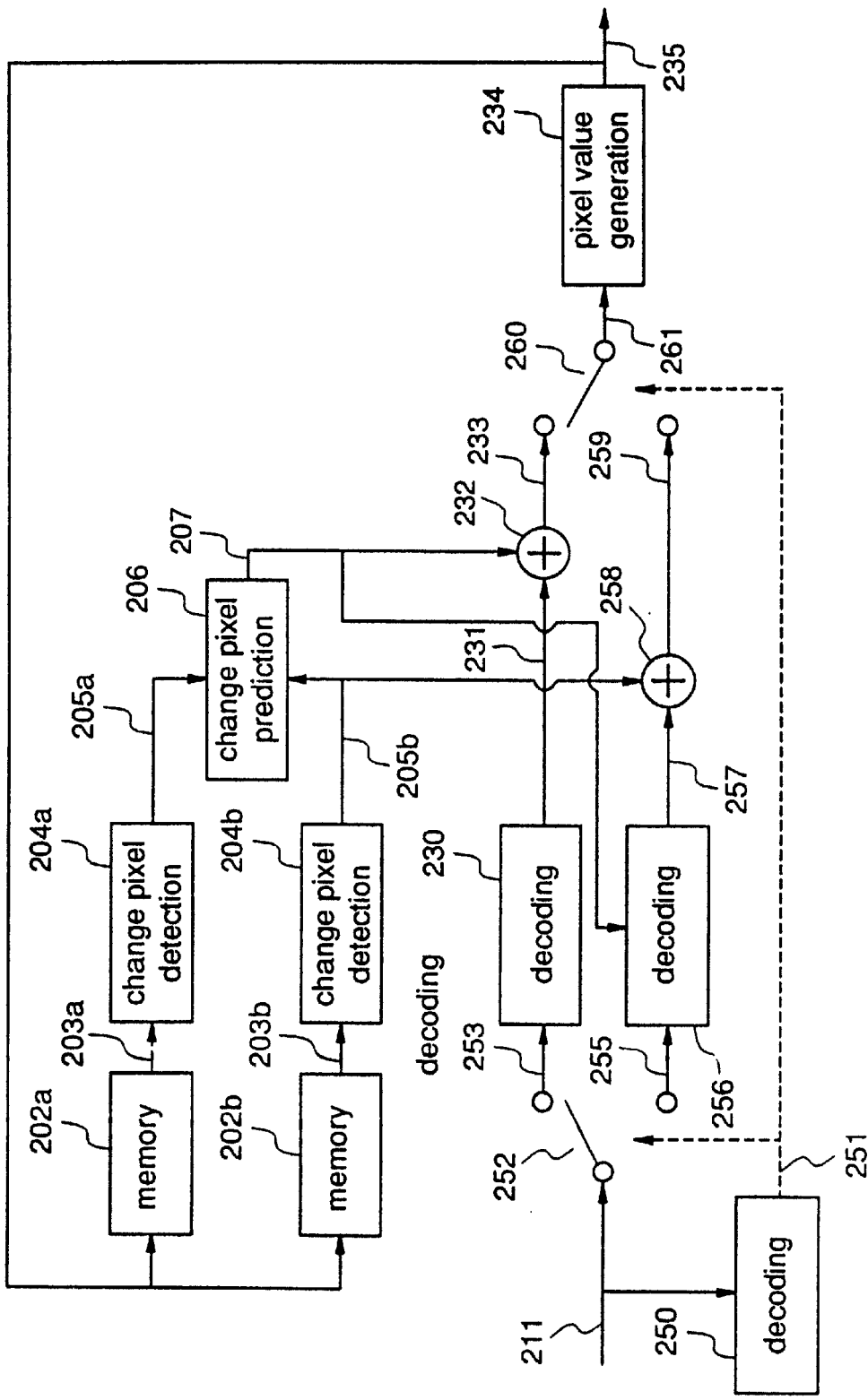
FIG. 42 is a block diagram showing the structure of an image decoding apparatus according to a 34th embodiment of this invention.

FIG. 42 is a block diagram showing the structure of the image decoding apparatus according to the 34th embodiment. In the figure, 50 indicates the mode decoder which judges whether the input signal is the signal into which the prediction error is encoded or the signal into which the position(pixel number) of the change pixel is encoded, and outputs the encoded mode 251. 256 indicates the pixel number decoder which encodes the input signal 255 and outputs the encoded pixel number 257. 258 indicates the adder which processes the predicted change pixel 205b and encoded pixel number 257 by addition, and outputs the decoded change pixel 259. 252 and 260 indicate the switches which switch the input signal and output signal corresponding to the encoding mode output by the mode encoder 250. The others are similar to those in FIG. 30, and the description is similar to that for the 25th embodiment.

The description is given of the operation of the image decoding apparatus according to the 34th embodiment as constructed above. The encoded signal 211 is input, and then initially, the mode encoder 250 judges whether the input signal is the signal into which the prediction error is encoded or the signal into which the pixel number is encoded, and according to the result of the judgment, outputs the encoding mode, "prediction error" or "pixel number", which controls the switches 252 and 260.

The operation where the prediction error has been encoded is similar to that in the 30th embodiment. On the other hand, when the pixel number is encoded, by switching of the switch 252, the input signal 211 is encoded by the encoder 256, and the pixel number, the difference of the change pixels, is encoded, and the decoded pixel number 257 is output to the adder 258. In the adder 258, the decoded pixel number 257 is added to the predicted change pixel whose prediction is based on the immediately previous decoded image signal 235, and thereby the decoded change pixel 259 is obtained. In any case, based on the decoded change pixel 261, the decoded image signal 235 is output similar to the 30th embodiment.

As described above, based on the image decoding apparatus according to the 30th embodiment, the structure of the image decoding apparatus according to the 34th embodiment is made up of the mode decoder 250, the adder 258, the decoder 256 for the pixel number, and the switches 252 and 260, and thereby the switches 252 and 260 are switched corresponding to the encoding mode obtained by the mode decoder 250, and the appropriate decoding is selectively performed, whereby the encoded signal encoded in the 33rd embodiment can be appropriately decoded.

Embodiment 35

An image encoding apparatus and an image decoding apparatus according to a 35th embodiment can change the prediction range according to image signals.

The image encoding apparatus and image decoding apparatus according to the 35th embodiment have the same structures as those of the 33rd and 34th embodiments.

Figure 43:
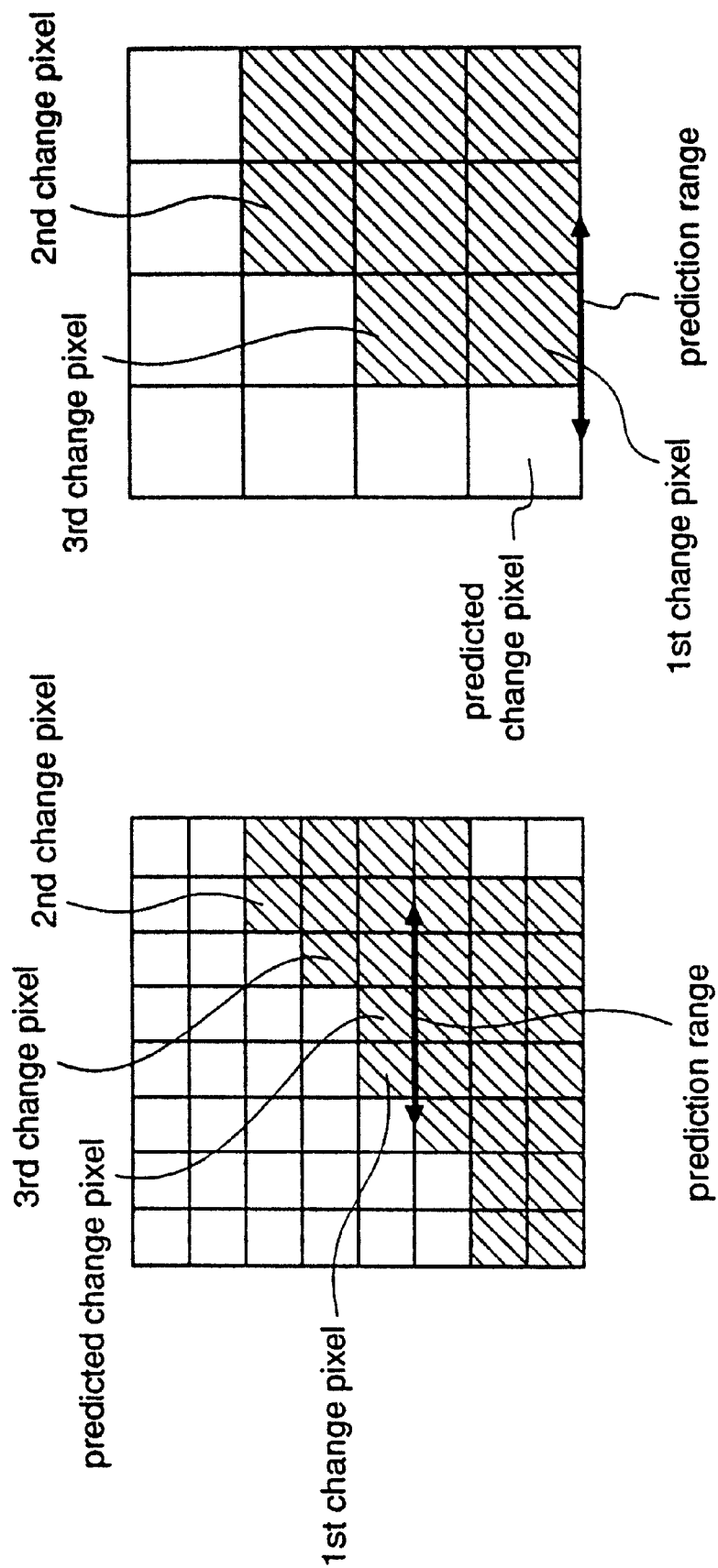
FIG. 43 is a drawing for explaining the prediction area in an image encoding apparatus and an image decoding apparatus according to a 35th embodiment of this invention.

FIG. 43 is a drawing for explaining the operating principle of the encoding or decoding according to the 35th embodiment. In the left side of the figure, the case is shown where the input image consists of 8×8 pixels, and on the right side of the figure there is shown same example which is sub-sampled into ½ and is therefore composed of 4×4. The pixel number of what is sub-sampled is ½, while the distances between pixels double. Accordingly, in the case of what is sub-sampled, by making the prediction range be the range corresponding to ½ of the original prediction range, almost the same special positions are searched. For example, if the range used is ±2 pixels being the same as that of the original on the left side as the prediction range for what is sub-sampled on the right side, the range is beyond the pixel number on a line, and therefore, the mode switching is not appropriately performed in the 33rd and 34th embodiments. As opposed to this, in the case of what is sub-sampled on the right side as shown in the figure, if the prediction range is ½, the mode switching will be appropriately performed, resulting in realizing the improvement of the encoding efficiency performed by the same embodiments.

As described above, the image encoding apparatus and image decoding apparatus according to the 35th embodiment are the image encoding apparatus according to the 33rd embodiment and the image decoding apparatus according to the 34th embodiment wherein the size of the prediction range can be changed according to the size of the image signal, whereby the encoding efficiency can be improved by performing the appropriate switching, even when the sub-sampling is performed.

Embodiment 36

An image encoding apparatus according to a 36th embodiment of this invention encodes shape signals representing the shapes of objects, and extracts a significant area from an image signal and performs efficient encoding.

Figure 44:
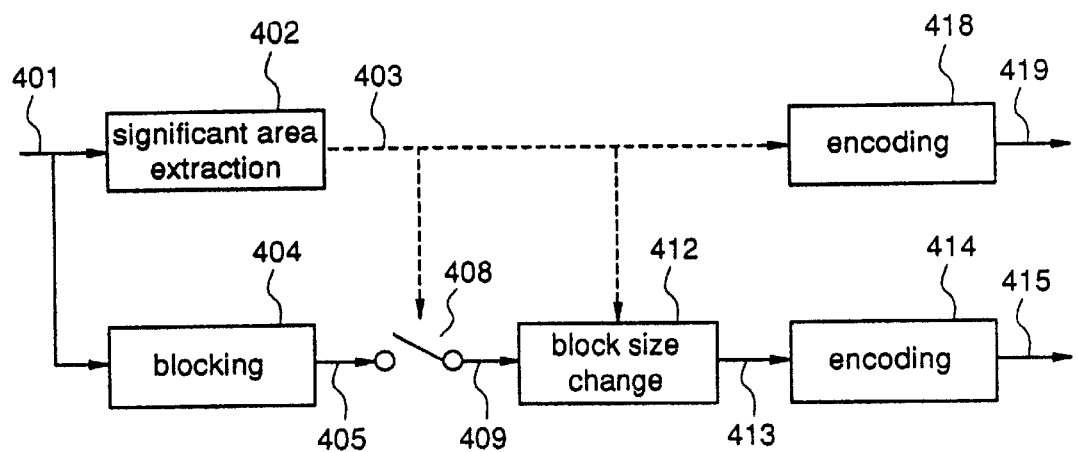
FIG. 44 is a block diagram showing the structure of an image encoding apparatus according to a 36th embodiment of this invention.

FIG. 44 is a block diagram showing the structure of the image encoding apparatus according to the 36th embodiment. In the figure, 401 indicates the two-dimensional shape signal as the input signal. 402 indicates a significant area extractor which extracts a significant area from the input shape signal 401 and outputs a significant area signal 403. 404 indicates the blocking unit which blocks the input shape signal 401 and outputs a blocked shape signal 405. 408 indicates the switch which performs switching according to the significant area signal 403. 412 indicates a block size changer which changes the block size according to the significant area signal 403 and outputs the changed blocked shape signal 413. 418 and 414 indicate encoders which encode the significant area signal 403 and the blocked shape signal 413, and outputs the encoded signals 419 and 415, respectively.

The operation of the image encoding apparatus according to the 36th embodiment as constructed above, is described. The input signal 401, the two-dimensional shape signal, is input to the image encoding apparatus according to the 36th embodiment, and is then input to the significant area extractor 402 and the blocking unit 404. The significant area extractor 402 detects the range of the significant area, and outputs the significant area signal 403 to the switch 408, the block size changer 412 and the encoder 418.

Figure 45:
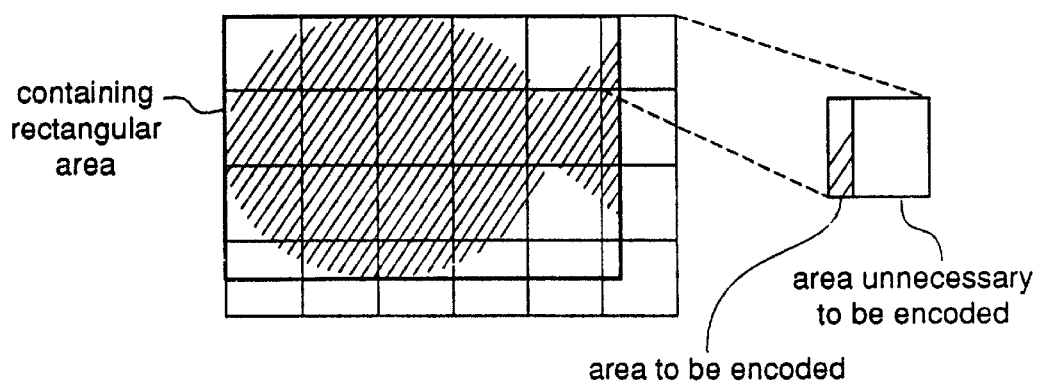
FIG. 45 is a drawing for explaining the operating principle of an image encoding apparatus according to a 36th embodiment of this invention.

FIG. 45 is a drawing for explaining the operating principle of the encoding performed by the image encoding apparatus according to the 36th embodiment. The part indicated by slant lines means the interior pixel of the object, namely the pixel in which the significant signal exists, and a minimum rectangle containing the slant-lined part, namely the rectangle indicated by the bold line in the figure, corresponds to the range of the significant area.

The blocking unit 405 blocks the input shape signal and outputs the blocked shape signal to the switch 408. Here, the switch 408 will be ON-state when the blocked shape signal 405 corresponds to the range of the significant area indicated by the significant area signal 403. That is, if it is outside of the significant area, the blocked shape signal is not subjected to the encoding process.

When the switch is ON, the blocked shape signal 405 is input to the block size changer 412, and the size is changed to the minimum block containing the significant area according to the significant area signal 403 input to the block size changer 412, and the changed shape signal 413 is output to the encoder 414 and is encoded and is regarded as the encoded signal 415 of the shape signal. On the other hand, the significant area signal indicating the significant area range is also encoded in the encoder 418, and the encoded signal 419 is output.

As described above, the image encoding apparatus according to the 36th embodiment has the significant area detector 102 and the block size changer 412, and thereby detects the significant area range, and changes the block size of the shape signal in order to encode the shape signal only within the interior range of the significant area, whereby the outside of the significant area is no longer encoded and the encode efficiency of the shape signal is improved.

Embodiment 37

An image encoding apparatus according to a 37th embodiment of this invention decodes the encoded signal output by the image encoding apparatus according to the 36th embodiment, and obtains a two-dimensional shape signal.

Figure 46:
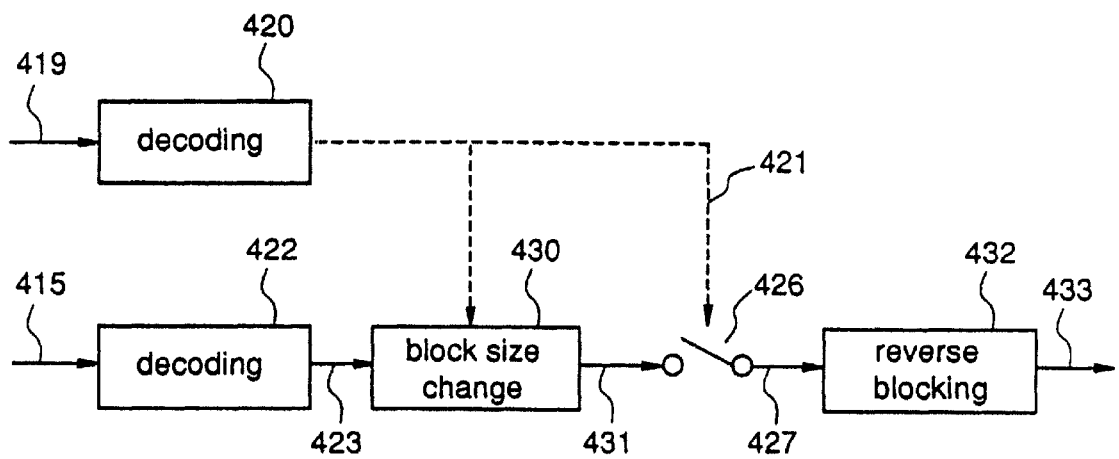
FIG. 46 is a block diagram showing the structure of an image decoding apparatus according to a 37th embodiment of this invention.

FIG. 46 is a block diagram showing the structure of the image encoding apparatus according to the 37th embodiment. In the figure, 419 and 415 indicate the encoded signal output by the image encoding apparatus according to the 36th embodiment. 420 indicates the decoder for the significant area signal which decodes the input signal and outputs a decoded significant area signal 421. 422 indicates the encoder for the shape signal which decodes the input signal and outputs a minimum blocked shape encoded signal 423. 430 indicates a block size changer which changes the block size according to the decoded significant area signal 423 and outputs the decoded blocked shape signal 431. 426 indicates the switch which performs switching according to the significant area signal 421. 432 indicates the reverse blocking unit which integrates the blocked shape signal 427 and outputs the decoded shape signal 433.

The operation of the image decoding apparatus according to the 37th embodiment as constructed above, is described. The encoded signals 419 and 415 are input to the decoders 420 and 422, respectively, and are decoded. The decoder 419 outputs the decoded significant area signal 421 to the block size changer 430 and the switch 426. On the other hand, the decoder 422 outputs the minimum blocked shape signal 423 which is the minimum block containing the significant area range, to the block size changer 430. The block size changer 430 changes the block size to the given size based on the input decoded significant area signal, and outputs the changed blocked shape signal 431 to the switch 426. The switch 426 will become ON only when input is a signal containing the significant area range indicated by the significant area signal 421, or otherwise outputs the value which indicates the outside of the significant area range. The reverse blocking unit 432 integrates the input blocked shape signal and the signal indicating the outside of the significant area range, and outputs the two-dimensional shape signal as the decoded signal 433.

As described above, the image decoding apparatus according to the 37th embodiment has the decoders 420 and 422, and the block size changer 430, the switch 426 and the reverse blocking unit 432, and thereby encodes the significant area range, and based on it, decodes the shape signal, whereby the encoded signal encoded in the 36th embodiment can be appropriately decoded.

Embodiment 38

An image encoding apparatus according to a 38th embodiment of this invention encodes according to the prediction probability and thereby realizes a good hierarchical encoding.

Figure 47:
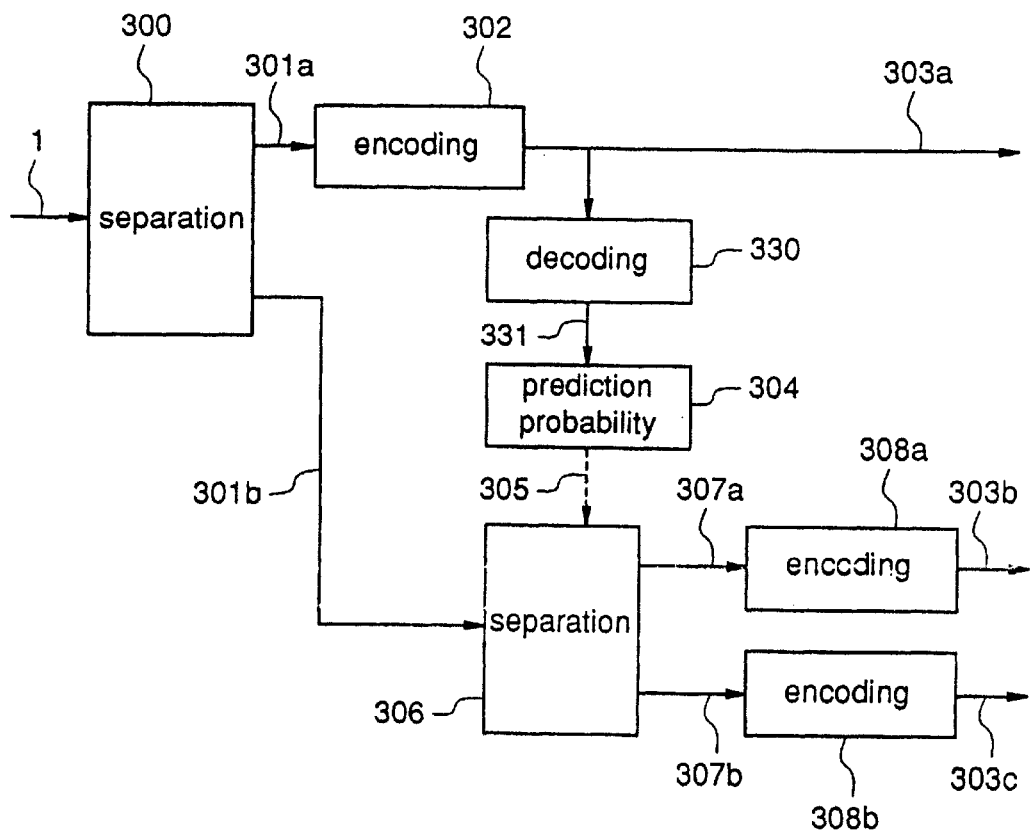
FIG. 47 is a block diagram showing the structure of an image decoding apparatus according to a 38th embodiment of this invention.

FIG. 47 is a block diagram showing the structure of the image encoding apparatus according to the 38th embodiment. In the figure, 1 indicates the input image signal. 300 indicates a separator which separates the input image signal 1 into the two image signals 301*a* and 301*b* to be output. 302, 308*a* and 308*b* indicate the encoders, all of which encode the input signals and output the encoded signals. 330 indicates the decoder which decodes the encoded signal 303*a* and outputs the decoded image signal 331. 304 indicates a prediction probability calculator which predicts the pixel value of the image signal 301*b* based on the input image signal 331, calculates the prediction probability of the prediction, and outputs the probability value 305. 306 indicates a 2nd separator which separates, according to the input probability value 305, the image signal 301*b* into the image signals 307*a* and 307*b* to be output.

Figure 48:
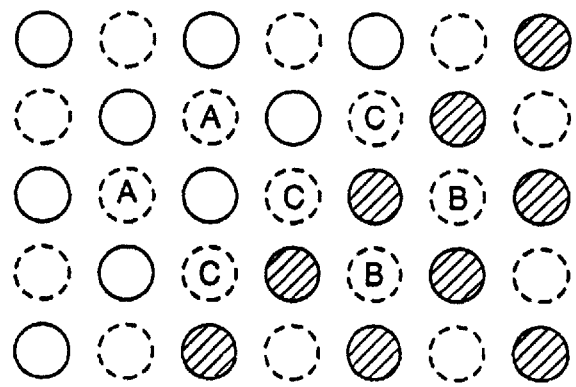
FIGS. 48(*a*)–48(*b*) are drawings which explain the operation principles of an image encoding apparatus according to a 38th embodiment of this invention.
Figure 48:
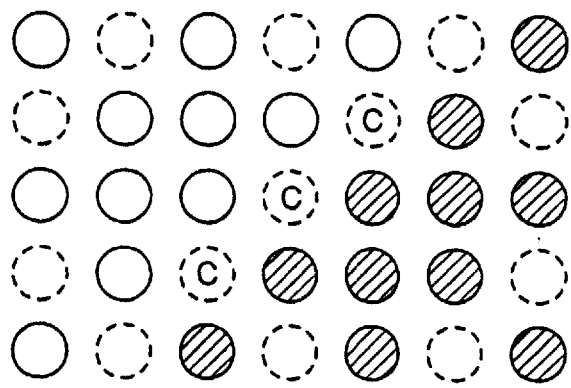

The operation of the image encoding apparatus according to the 38th embodiment as constructed above, is described. The input signal 1 is input to the image encoding apparatus according to the 38th embodiment, and initially in the separator, is separated into the image signals 301*a* and 301*b*. The signal 301*a* is selected with priority and is input to the encoder 302, while the signal 301*b* is output to the 2nd separator. FIG. 48 is a drawing for explaining the operating principle of the encoding performed by the image encoding apparatus according to the 38 embodiment. In FIG. 48(*a*), the pixel indicated by the solid-lined circle corresponds to the image signal 301*a,* and the pixel indicated by the dashed-lined circle corresponds to the image signal 301*b*. Further, FIG. 48 is the model of the two-valued image signal, and the slant line indicates the true value, and the circle in which there is no slant line indicates the false value. The encoder 302 encodes the image signal 301*a* having high priority, and outputs the obtained encoded signal 303*a* as the encoded output and outputs to the decoder 330.

The decoded signal which is subjected to the decoding process by the decoder 330, is input to the. prediction probability calculator 304. The prediction probability calculator 304 predicts the pixel value of the image signal having the low priority based on the decoded image signal having the high priority, and calculates the prediction probability. In FIG. 48(*a*), concerning A, the 4 adjacent directions have the false values, and concerning B, the 4 adjacent directions have the true values, and as opposed to this, concerning C, the 2 adjacent directions have the true values and the 2 adjacent directions have the false values. As a result, the prediction that A has the false value and B has the true value, has a high probability, while concerning C, the probability that the prediction comes true is low no matter whether it is predicted that C has the true value or the false value. Therefore, if C is encoded with priority rather than A and B shown in FIG. 48(*a*), C will be decoded as shown in FIG. 48(*b*) and the picture quality is less degraded when A and B are reproduced based on the prediction, and thereby the desired gradation encoding can be performed.

Accordingly, based on the probability value 305 output by the prediction probability calculator 304, the 2nd separator 306 separates the input image signal 301*b* into that which has the high probability 305 as the image signal 307*a* and the others as the image signal 307*b*, which are output to the encoders 308*a* and 308*b*, respectively. The encoders encode the input image signal and output the encoded signals 303*b* and 303*c*, respectively. If the encoded signals 303*a* to 303*c* output as described above have the higher priority in the order to be transmitted or recorded, in decoding, according to that order, the encoded signal having the higher priority is first decoded, whereby even when the decoding process comes to an end halfway during the decoding process, the decoded image in which the picture quality is less degraded can be obtained.

As described above, the image encoding apparatus according to the 38th embodiment is made up of the separators 300 and 306, and the encoders 302, 308*a* and 308*b*, and the decoder 330, and the prediction probability calculator 304, and thereby the encoding of the pixel having the low prediction probability is given priority, and in this way the hierarchical encoding causing less picture quality deterioration without any additional information can be realized.

Embodiment 39

An image decoding apparatus according to a 39th embodiment of this invention decodes the encoded signal output by the image encoding apparatus according to the 38th embodiment.

Figure 49:
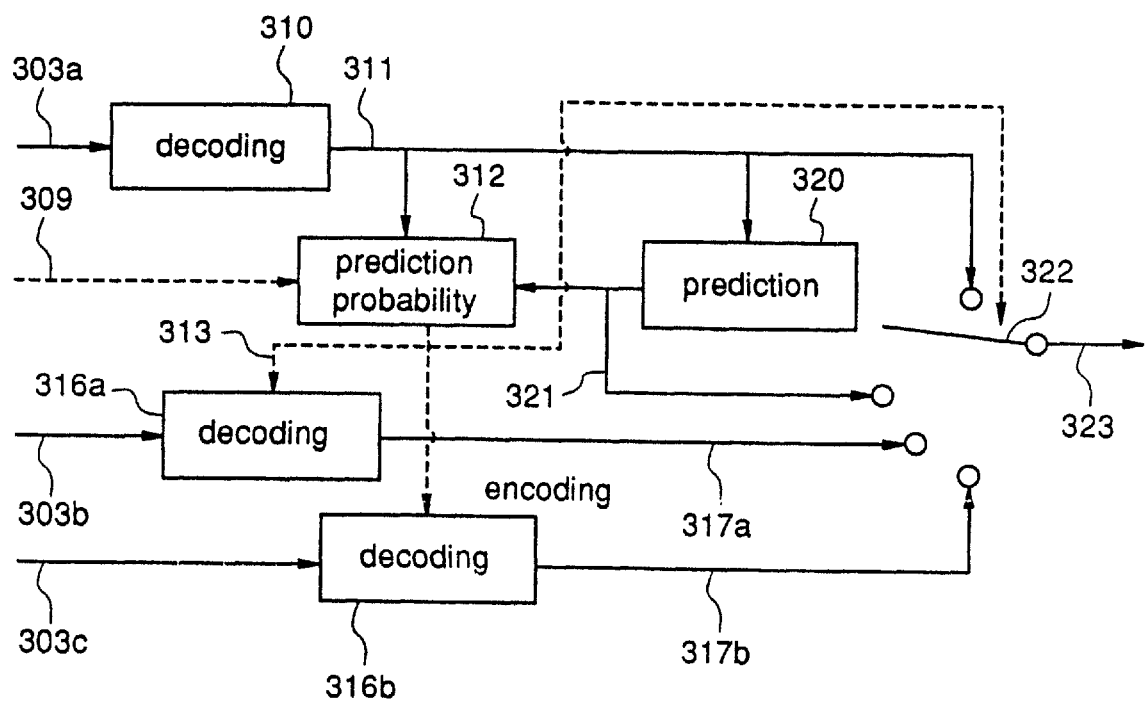
FIG. 49 is a block diagram showing the structure of an image decoding apparatus according to a 39th embodiment of this invention.

FIG. 49 is a block diagram showing the structure of the image decoding apparatus according to the 39th embodiment. In the figure, 303*a* to 303*c* indicate the encoded signals output by the image encoding apparatus according to the 38th embodiment, which are decoded by 310, 316*a* and 316*b* encoders to be output as decoded signals 311, 317*a* and 317*b*. 320 indicates the predictor which predicts the image signal based on the image signal 311, and outputs the predicted image signal 321. 312 indicates the prediction probability calculator which calculates the prediction probability for the input predicted image signal 331, and outputs the probability value 313. 322 indicates the switch which performs switching according to the probability value 313.

The operation of the image decoding apparatus according to the 39th embodiment as constructed above, is described. The input signals 303*a* to 303*c* are input to the decoders 310, 316*a* and 316*b* to be decoded. The signal 303*a* is decoded, and the decoded image signal 311 becomes the output decoded signal and is also input to the prediction probability calculator 312 and the predictor 320.

The predictor 320 predicts the pixel value of the image signal 321 having a low priority from the decoded image signal 311. The prediction probability calculator 312 calculates the prediction probability of the predicted image signal 321, and judges whether the respective pixels should be decoded by the decoder 316*a* or 316*b*. Further, the prediction probability calculator 312 judges, referring to the priority order 309 input from the outside, whether or not the encoded signal having the low priority order has been transmitted or recorded. If it is decided that it is not to be transmitted or recorded, in order that the pixel value of the pixel not encoded yet outputs the predicted image signal 321 as the decoded signal 323, the changing of the switch 322 is controlled. Further, concerning the decoded pixel, one of the image signal 311, 317*a* and 317*b* is selected at the switch 322 and is regarded as the decoded signal 323 output by the apparatus.

As described above, the image decoding apparatus according to the 39th embodiment has the decoder 310, 316*a* and 316*b*, and the prediction probability calculator 312 and the predictor 320, and thereby performs decoding according to the prediction probability and the priority order, whereby the encoded signal encoded by the image encoding apparatus according to the 38th embodiment can be appropriately decoded.

Embodiment 40

An image encoding program recording medium and an image decoding program recording medium realize the image encoding apparatuses and the image decoding apparatuses according to the 1st to 39th embodiments.

Figure 50:
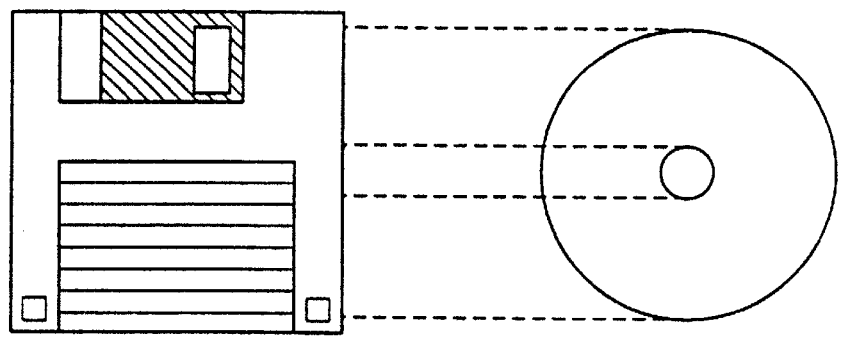
FIG. 50 is a drawing showing a floppy disk as an example of recording media for a image encoding program and a image decoding program according to a 40th embodiment of this invention.
Figure 51:
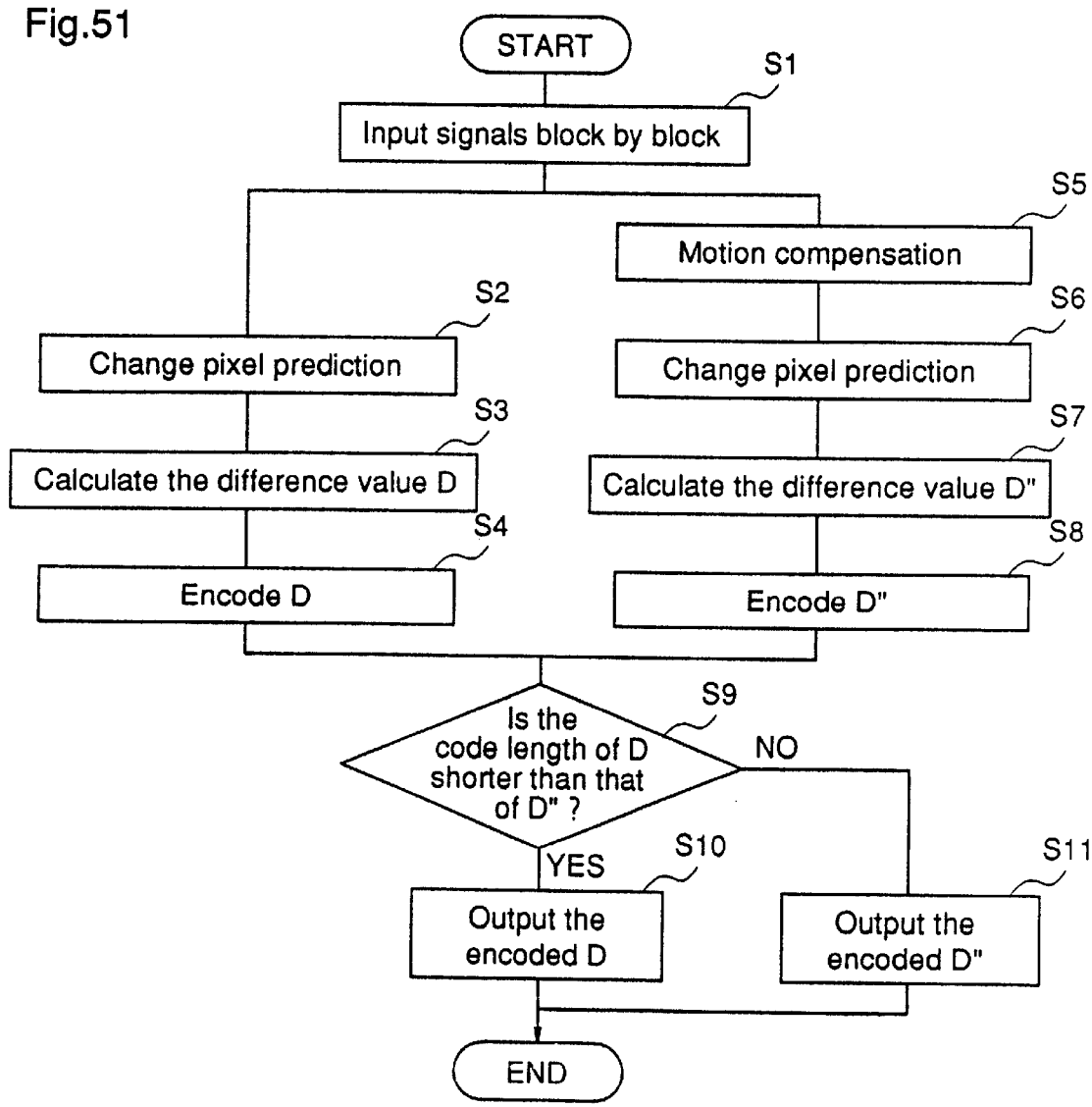
FIG. 51 is a flowchart showing the processing procedure of an image encoding program of a 40th embodiment of this invention.
Figure 52:
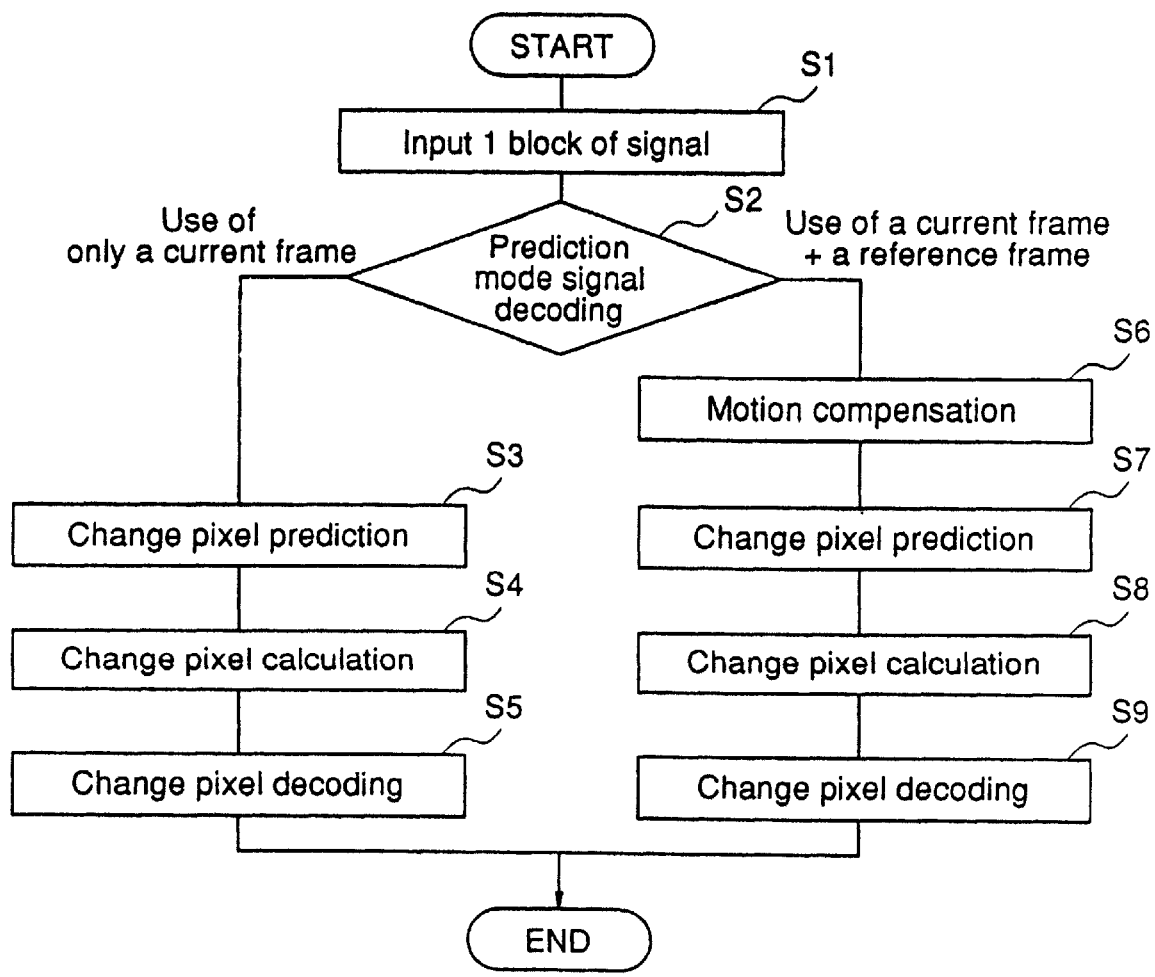
FIG. 52 is a flowchart showing the processing procedure of an image decoding program of a 40th embodiment of this invention.

FIG. 50 shows a floppy disk which is an example of a recording medium which records the program, and FIG. 51 is a flowchart showing the procedure of the recorded image encoding program, and FIG. 52 is a flowchart showing the procedure of the recorded image decoding program.

The image encoding program shown in FIG. 51 which is recorded in the floppy disk shown in FIG. 50, is executed on a personal computer or a work station or the like, and thereby realizes the image encoding apparatus according to the 2nd embodiment.

Similarly, the image decoding program shown in FIG. 52 which is recorded on the floppy disk shown in FIG. 50, is executed on a personal computer or a work station or the like, and thereby realizes the image decoding apparatus according to the 3rd embodiment. This case is, in the same embodiment, one in which the selection is performed by the switch after the change pixel encoding process as described using FIG. 6.

As described above, the program recording media according to the 40th embodiment record the image encoding program or the image decoding program, and thereby on a computer system such as an ordinary personal computer and the like, the image encoding apparatus or the image decoding apparatus according to this invention can be realized.

Note that, in the 40th embodiment, although the image encoding apparatus according to the 2nd embodiment and the image decoding apparatus according to the 3rd embodiment are recorded, the apparatuses according to the other embodiments can be similarly realized.

Further, in the 40th embodiment, although the floppy disk is presented as a recording medium, an IC card, a CD-ROM, an optical disc and a cassette tape or the like can be similarly employed, if it is a medium which can record the programs.

Application Possibility in Industry

As described above, it is by this invention, not by the MMR encoding in the prior art technique, that a large improvement in the compression rate can be realized in the loss-less reverse encoding by permitting visually unimportant deterioration of the picture quality.

Further, by this invention, compared to the MMR in the prior art technique which is an encoding useing correlations only within a frame and in the horizontal direction, the encoding can be performed using the inter-frame correlation and the correlation in the vertical direction, thereby an improvement of the encoding efficiency can be realized.

Further, by this invention, although the MMR or MMMR in the prior art technique can not realize it, the encoded data from which the image can be hierarchically reproduced by decoding part of the bit stream, are realized without reducing the encoding efficiency, and the encoding method which enables the effective hierarchical image reproduction is provided.

Further, by this invention, when the image consisting of the shape information and the pixel value information is encoded by the motion compensation, the motion vector for each piece of information is used, whereby if the motion compensation is performed using the same motion vector similar to the encoding in the prior art technique, the situation where the appropriate encoding can not be carried out is avoided. Moreover, by utilizing motion correlation, the improvement in the encoding efficiency can be realized.

Further, by this invention, when the image consisting of shape information and pixel value information is encoded, adaptively switching the intra-frame encoding and the inter-frame encoding, this switching according to the property of each piece of information can be performed, and the appropriate and efficient encoding can be realized. Similarly, according to the property of each piece of information, it is possible to adaptively change the number of motion vectors or adaptively switch the change or not-change of the quantizing step.

As described above, this invention provides the image encoding apparatus, the image encoding method and the image encoding program recording medium, all of which can efficiently encode image signals, and provides the image decoding apparatus, the image decoding method and the image decoding program recording medium, all of which can appropriately decode the above-mentioned encoded signal which is encoded efficiently.

What is claimed is:

1. A method for transmitting a coded image signal obtained by coding an image signal including shape information and pixel value information, comprising:

transmitting coded identifying information for identifying respective coding modes for shape information and for pixel value information, said shape information and said pixel value information being blocked to correspond to an area as a coding processing unit, said coded identifying information being included in a coded image signal, wherein said coding modes for shape information and for the pixel value information are selected from among a plurality of prescribed coding modes.

2. The method of claim 1, wherein said coded image signal includes a coded pixel value signal obtained by coding blocked pixel value information under one coding mode, and a coded shape signal obtained by coding blocked shape information under another coding mode.

* * * * *

UNITED STATES PATENT AND TRADEMARK OFFICE
CERTIFICATE OF CORRECTION

PATENT NO.     : 6,597,814 B2                                                                Page 1 of 1
DATED          : July 22, 2003
INVENTOR(S)    : Shinya Kadono It is certified that error appears in the above-identified patent and that said Letters Patent is hereby corrected as shown below:

<u>Title page,</u>
Item [63], Related U.S. Application Data, change "Continuation of application No. 09/000,077, filed on Mar. 9, 1998, now Pat. No. 6,188,796." to
-- Continuation of application No. 09/000,077, filed on Mar. 9, 1998, based upon PCT/JP97/01634 filed May 15, 1997, now Pat. No. 6,188,796. --

Signed and Sealed this

Twenty-third Day of December, 2003

JAMES E. ROGAN
*Director of the United States Patent and Trademark Office*